(12) United States Patent
Zhang et al.

(10) Patent No.: US 9,525,861 B2
(45) Date of Patent: Dec. 20, 2016

(54) DISPARITY VECTOR PREDICTION IN VIDEO CODING

(71) Applicant: QUALCOMM Incorporated, San Diego, CA (US)

(72) Inventors: Li Zhang, San Diego, CA (US); Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 13/798,997

(22) Filed: Mar. 13, 2013

(65) Prior Publication Data
US 2013/0242046 A1    Sep. 19, 2013

Related U.S. Application Data

(60) Provisional application No. 61/610,961, filed on Mar. 14, 2012, provisional application No. 61/621,929, (Continued)

(51) Int. Cl.
*H04N 19/00*    (2014.01)
*H04N 13/00*    (2006.01)
(Continued)

(52) U.S. Cl.
CPC ........ *H04N 13/0048* (2013.01); *H04N 19/139* (2014.11); *H04N 19/513* (2014.11); *H04N 19/52* (2014.11); *H04N 19/597* (2014.11)

(58) Field of Classification Search
CPC .. H04N 13/0048; H04N 19/513; H04N 19/52; H04N 19/176; H04N 19/573; H04N 13/0022; H04N 19/105; H04N 19/139;H04N 19/593; H04N 19/11; H04N 19/137; H04N 19/172; H04N 19/46; H04N 19/51; H04N 19/527; H04N 19/55
(Continued)

(56) References Cited

U.S. PATENT DOCUMENTS

2005/0046702 A1*  3/2005  Katayama et al. ........ 348/222.1
2005/0206785 A1*  9/2005  Swan et al. .................... 348/448
(Continued)

FOREIGN PATENT DOCUMENTS

WO    2008007913 A1    1/2008
WO    2012007038 A1    1/2012
WO    2012096164 A1    7/2012

OTHER PUBLICATIONS

Zheng, et al., "Non-CE13: Simplification and improvement of additional merge candidate", JCT-VC Meeting; MPEG Meeting; Nov. 21-30, 2011; Geneva; (Joint Collaborative Team on Video Coding of ISO / IEC JTC1/SC29/WG11 and ITU-T SG.16); URL:http://wftp3.itu.int/av-arch/jctvc-site/, No. JCTVC-G683, XP030110667, 8 pp.
(Continued)

*Primary Examiner* — Jeffery Williams
(74) *Attorney, Agent, or Firm* — Shumaker & Sieffert, P.A.

(57) ABSTRACT

Techniques are described for determining a disparity vector for a current block based on disparity motion vectors of one or more spatially and temporally neighboring regions to a current block to be predicted. The spatially and temporally neighboring regions include one or a plurality of blocks, and the disparity motion vector represents a single vector in one reference picture list for the plurality of blocks within the spatially or temporally neighboring region. The determined disparity vector could be used to coding tools which utilize the information between different views such as merge
(Continued)

mode, advanced motion vector prediction (AMVP) mode, inter-view motion prediction, and inter-view residual prediction.

59 Claims, 13 Drawing Sheets

Related U.S. Application Data filed on Apr. 9, 2012, provisional application No. 61/623,041, filed on Apr. 11, 2012, provisional application No. 61/658,754, filed on Jun. 12, 2012, provisional application No. 61/682,221, filed on Aug. 11, 2012, provisional application No. 61/682,224, filed on Aug. 11, 2012.

(51) Int. Cl.
```
H04N 19/597    (2014.01)
H04N 19/52     (2014.01)
H04N 19/139    (2014.01)
H04N 19/513    (2014.01)
```
(58) Field of Classification Search
USPC ........ 348/43, 218.1, 222.1, 448; 375/240.13, 375/240.16, 240.24
See application file for complete search history.

(56) References Cited

U.S. PATENT DOCUMENTS

| | | | |
|---|---|---|---|
| 2007/0064800 A1 | 3/2007 | Ha | |
| 2007/0071107 A1* | 3/2007 | Ha | 375/240.24 |
| 2008/0159407 A1* | 7/2008 | Yang et al. | 375/240.25 |
| 2008/0285654 A1 | 11/2008 | Cai et al. | |
| 2009/0190669 A1 | 7/2009 | Park et al. | |
| 2009/0290643 A1 | 11/2009 | Yang | |
| 2010/0046846 A1* | 2/2010 | Brown | 382/233 |
| 2010/0091858 A1* | 4/2010 | Yang | 375/240.13 |
| 2010/0135391 A1 | 6/2010 | Tian et al. | |
| 2011/0044550 A1 | 2/2011 | Tian et al. | |
| 2011/0216833 A1 | 9/2011 | Chen et al. | |
| 2012/0062756 A1* | 3/2012 | Tian et al. | 348/218.1 |
| 2012/0147137 A1 | 6/2012 | Jeon et al. | |
| 2012/0189060 A1 | 7/2012 | Lee et al. | |
| 2012/0269271 A1 | 10/2012 | Chen et al. | |
| 2013/0003848 A1 | 1/2013 | Sugio et al. | |
| 2013/0243092 A1 | 9/2013 | Sugio et al. | |
| 2013/0265388 A1 | 10/2013 | Zhang et al. | |
| 2013/0336405 A1 | 12/2013 | Chen et al. | |
| 2014/0341292 A1 | 11/2014 | Schwarz et al. | |
| 2015/0098509 A1 | 4/2015 | Sung et al. | |

OTHER PUBLICATIONS

"Test Model under Consideration for HEVC based 3D video coding", MPEG Meeting; San Jose, CA; (Motion Picture Expert Group or ISO/IEC JTC1/SC29/WG11), No. N12559, Feb. 11, 2012, XP030019033, 45 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Chen et al., "AHG12: Hooks for temporal motion vector prediction and weighted prediction in HEVC multiview/3DV extension", 9. JCT-VC Meeting; 100. MPEG Meeting; Apr. 27-May 7, 2012; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-I0353, XP030112116, 7 pp.

Hannuksela, et al., "Suggestion for a depth-enhanced multiview video coding extension to H.264, Annex A: Nokia 3DV Test Model (3DV-TM) Codec Description and Simulation Results", VCEG Meeting; MPEG Meeting; Feb. 3-10, 2012; Torino; (Video Coding Experts Group of ITU-T SG.15), No. VCEG-AR14, XP03O003858, 14 pp.

International Search Report and Written Opinion—PCT/US2013/031339—ISA/EPO—Jun. 3, 2013, 17 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Nam et al., "Advanced motion and disparity prediction for 3D video coding", MPEG Meeting; Nov. 28, 2011-Dec. 2, 2011; Geneva; (Motion Picture Expert Group or ISO/IEC JTC1/SC29/WG11), No. m22560, XP030051123, 6 pp.

Ryu, et al., "Adaptive competition for motion vector prediction in multi-view video coding", 3DTV Conference: The True Vision-Capture, Transmission and Display of 3D Video (3DTV-CON), IEEE, May 16, 2011, XP031993767, DOI: 1 0.11 09/3DTV.2011. 5877197, ISBN: 978-1-61284-161-8, 4 pp.

Schwarz, et al., "Inter-View Prediction of Motion Data in Multiview Video Coding," May 7-9, 2012 Picture Coding Symposium, IEEE, pp. 101-104.

Senoh, et al., "Disparity vector prediction CE plan for MVC/CE4", MPEG Meeting; Apr. 3, 2006-Apr. 7, 2006; Montreux; (Motion Pictureexpert Group or ISO / IEC JTC1/SC29/WG11), No. M13166, XP030041835, ISSN: 0000-0239, 6 pp.

Takahashi, et al., "Descriptions of 3D Video Coding Proposal (HEVC-Compatible Category) by Sony", MPEG Meeting; Nov. 28, 2011-Dec. 2, 2011 Geneva; (Motion Picture Expert Group or ISO/IEC JTC1/SC29/WG11), No. m22566, XP030051129, 36 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand, T., et al., "WD3: Working Draft 3 of High-Efficiency Video Coding," Document JCTVC-E603, 5th Meeting: Geneva, CH, Mar. 16-23, 2011, pp. 193.

Wiegand et al., "WD1: Working Draft 1 of High-Efficiency Video Coding", JCTVC-C403, 3rd Meeting: Guangzhou, CN, Oct. 7-15, 2010, 137 pp.

Yea, et al., "Description of 3D Video Coding Technology Proposed by LG Electronics", MPEG Meeting; Nov. 28, 2011-Dec. 2, 2011; Geneva; (Motion Picture Expert Group or ISO/IEC JTC1/SC29/WG11),, No. m22577, XP030051140, 22 pp.

Zhang, et al., "3D-CE5.h related: Disparity vector derivation for multiview video and 3DV", MPEG Meeting; Apr. 30, 2012-May 4, 2012; Geneva; (Motion Picture Expert Group or ISO/IEC JTC1/SC29/WG11), No. m24937, XP030053280, 6 pp.

Second Written Opinion from International Application No. PCT/US2013/031339, dated Mar. 18, 2014, 10 pp.

Schwarz, et al., "Description of 3D Video Technology Proposal by Fraunhofer HHI (HEVC compatible; configuration A)," Nov. 2011, ISO/IEC JTC1/SC29/WG 11 MPEG2011/M22570, 46 pp.

Schwarz, et al. "Description of 3D Video Technology Proposal by Fraunhofer HHI (HEVC compatible; configuration B)," Nov. 2011, ISO/IEC JTC1/SC29/WG11 MPEG2011/M22571, 46 pp.

(56) References Cited

OTHER PUBLICATIONS

Tech, "Draft of 3D-HEVC Test Model Description," Stockholm, SE, Jul. 16-20, 2012, Document: JCT3V-A1005_d0, 83 pp.
Bartnik, et al., "HEVC Extension for Multiview Video Coding and Multiview Video plus Depth Coding", ITU—Telecommunications Standardization Sector Study Group 16 Question 6 Video Coding Experts Group (VCEG), 44nd Meeting: San Jose, CA, USA, Feb. 3-10, 2012, Document VCEG-AR13, 42 pp.
ITU-T H.265, Series H: Audiovisual and Multimedia Systems, Infrastructure of audiovisual services—Coding of moving video, High efficiency video coding, The International Telecommunication Union, Apr. 2013, 317 pp.
Schwarz, et al., "Description of 3D Video Coding Technology Proposal by Fraunhofer HHI (MVC compatible)," MPEG Meeting ISO/IEC JTC1/SC29/WG11, Doc. MPEG111M22569, Geneva, Switzerland, Nov./Dec. 2011, pp. 37.
Stefanoski, et al., "Description of 3D Video Coding Technology Proposal by Disney Research Zurich and Fraunhofer HHI," MPEG Meeting—ISO/IEC JTC1/SC29/WG11, Doc. MPEG11/M22668, Geneva, Switzerland, Nov./Dec. 2011, 34 pp.
"Text of ISO/IEC FDIS 23002-3 Representation of Auxiliary Video and Supplemental Information," ISO/IEC JTC 1/SC 29/WG 11, MPEG Doc, N81368, Marrakech, Morocoo, Jan. 2007, pp. 1-27.
International Preliminary Report on Patentability from International Application No. PCT/US2013/031339, dated Jun. 26, 2014, 13 pp.
ITU-T H.265, Series H: Audiovisual and Multimedia Systems, Infrastructure of audiovisual services—Coding of moving video, High efficiency video coding, The International Telecommunication Union, Oct. 2014, 540 pp.
Lin, et al., "Motion Vector Coding Techniques for HEVC," IEEE 13th International Workshop on Multimedia Signal Processing (MMSP), Jan. 2011, 6 pp.
Zhang, et al., "3D-CE5.h related: Bug fix for independent estimated depth maps of non-base views in CTC," JCT-VC Meeting; Jul. 16-20, 2012; (Joint Collaborative Team on 3D Video Coding Extension Development of ITU-T SG 16 WP 3 and ISO/IEC JTC 1/SC 29/WG 11); No. JCT2-A0095; Jul. 10, 2012; 5 pp.
Zhang, et al., "3D-CE5.h related: Bug fix for independent estimated depth maps of non-base views in CTC," JCT-VC Meeting; Jul. 16-20, 2012; (Joint Collaborative Team on 3D Video Coding Extension Development of ITU-T SG 16 WP 3 and ISO/IEC JTC 1/SC 29/WG 11); No. JCT2-A0095r1, Jul. 13, 2012; 5 pp.
Zhang, et al., "3D-CE5.h related: Improved merge mode for inter-view predicted motion," Jul. 16-20, 2012; (Joint Collaborative Team on 3D Video Coding Extension Development of ITU-T SG 16 WP 3 and ISO/IEC JTC 1/SC 29/WG 11); No. JCT2-A0096; Jul. 10, 2012; 4 pp.
Joshi, et al., "High Efficiency Video Coding (HEVC) Screen Content Coding; Draft 6," Feb. 19-26, 2016; (Joint Collaborative Team on 3D Video Coding Extension Development of ITU-T SG 16 WP 3 and ISO/IEC JTC 1/SC 29/WG 11); No. JCTVC-W1005_v1; Mar. 24, 2016; 684 pp.
Schwarz, et al., "Test Model under Consideration for HEVC based 3D video coding v3.0," ISO/IEC JTC1/SC29/WG11 MPEG2011/N12744; Apr. 2012; 46 pp.
Schwarz, et al., "Common Test Conditions for 3DV experimentation," ISO/IEC JTC!/SC29/WG11 MPEG2011/N12745; May 2012; 6 pp.
Zhang L, et al., "CE5.h: Disparity vector generation results", JCT2-A0097, 1. JCT-3V Meeting; 101. MPEG Meeting; Jul. 16, 2012-Jul. 20, 2012; Stockholm; (The Joint Collaborative Team on 3D Video 2 Coding Extension Development of ISO/IEC JTC1/SC29/WG11 and ITU-T SG.16); URL: http://Phenix.Int-Evry.Fr/JCT2/, XP030130096, pp. 1-5.

\* cited by examiner

DISPARITY VECTOR PREDICTION IN VIDEO CODING

This application claims the benefit of:
U.S. Provisional Application 61/610,961 filed Mar. 14, 2012;
U.S. Provisional Application 61/621,929 filed Apr. 9, 2012;
U.S. Provisional Application 61/623,041 filed Apr. 11, 2012;
U.S. Provisional Application 61/658,754 filed Jun. 12, 2012;
U.S. Provisional Application 61/682,221 filed Aug. 11, 2012; and
U.S. Provisional Application 61/682,224 filed Aug. 11, 2012, the entire content of each of which is hereby incorporated by reference.

TECHNICAL FIELD

This disclosure relates to video coding and, more particularly, to techniques for coding multi-view and three-dimensional (3D) video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

The techniques described in this disclosure are generally related to determining a disparity vector for a current block of a picture of a view based on motion information of spatial and/or temporal neighboring blocks. The techniques account for the manner in which the motion information of neighboring blocks is stored to determine the disparity vector for the current block. For example, the techniques described in this disclosure may evaluate motion information of neighboring regions that spatially and/or temporally neighbor the current block, where a region includes one or a plurality of the neighboring blocks. The techniques may determine the disparity vector for the current block based on the stored motion information for the region. The techniques may further allow inter-view motion prediction of random access point (RAP) pictures, as well as utilize determined disparity vectors as motion vector predictor candidates.

In one example, the disclosure describes a method for decoding video data. The method includes determining whether a motion vector for a region in a picture in a first view of a plurality of views is a disparity motion vector. In this example, the region neighbors a current block to be predicted, the region includes one or more blocks, the motion vector for the region represents a single motion vector for one reference picture list, and the disparity motion vector refers to a picture in a second, different view. The method also includes responsive to determining that the motion vector for the region in the picture is the disparity motion vector, determining whether the disparity motion vector for the region is a disparity vector for the current block, and inter-prediction decoding the current block, wherein the decoding uses the disparity motion vector for the region as the disparity vector for the current block if it is determined that the disparity motion vector for the region is the disparity vector for the current block.

In one example, the disclosure describes a method for encoding video data. The method includes determining whether a motion vector for a region in a picture in a first view of a plurality of views is a disparity motion vector. In this example, the region neighbors a current block to be predicted, the region includes one or more blocks, the motion vector for the region represents a single motion vector for the one or more blocks for one reference picture list, and the disparity motion vector refers to a picture in a second, different view. The method also includes responsive to determining that the motion vector for the region in the picture is the disparity motion vector, determining whether the disparity motion vector for the region is a disparity vector for the current block, and inter-prediction encoding the current block, wherein the encoding uses the disparity motion vector for the region as the disparity vector for the current block if it is determined that the disparity motion vector for the region is the disparity vector for the current block.

In one example, the disclosure describes a device for decoding video data. The device includes a video decoder configured to determine whether a motion vector for a region in a picture in a first view of a plurality of views is a disparity motion vector. In this example, the region neighbors a current block to be predicted, the region includes one or more blocks, the motion vector for the region represents a single motion vector for the one or more blocks for one reference picture list, and the disparity motion vector refers to a picture in a second, different view. Responsive to determining that the motion vector for the region in the picture is the disparity motion vector, the video decoder is configured to determine whether the disparity motion vector for the region is a disparity vector for the current block. The video decoder is also configured to inter-prediction decode the current block, wherein to decode the current block, the video decoder uses the disparity motion vector for the region as the disparity vector for the current block if it is determined that the disparity motion vector for the region is the disparity vector for the current block.

In one example, the disclosure describes a device for encoding video data. The device includes a video encoder configured to determine whether a motion vector for a region in a picture in a first view of a plurality of views is a disparity motion vector. In this example, the region neighbors a current block to be predicted, the region includes one or more blocks, the motion vector for the region represents a single motion vector for the one or more blocks for one reference picture list, and the disparity motion vector refers to a picture in a second, different view. Responsive to determining that the motion vector for the region in the picture is the disparity motion vector, the video encoder is configured to determine whether the disparity motion vector for the region is a disparity vector for the current block. The video encoder is also configured to inter-prediction encode the current block, wherein to encode the current block, the video encoder uses the disparity motion vector for the region as the disparity vector for the current block if it is determined that the disparity motion vector for the region is the disparity vector for the current block.

In one example, the disclosure describes a device for decoding video data. The device includes means for determining whether a motion vector for a region in a picture in a first view of a plurality of views is a disparity motion vector. In this example, the region neighbors a current block to be predicted, the region includes one or more blocks, the motion vector for the region represents a single motion vector for the one or more blocks for one reference picture list, and the disparity motion vector refers to a picture in a second, different view. The device also includes, responsive to determining that the motion vector for the region in the picture is the disparity motion vector, means for determining whether the disparity motion vector for the region is a disparity vector for the current block, and means for inter-prediction decoding the current block, wherein the means for inter-prediction decoding uses the disparity motion vector for the region as the disparity vector for the current block if it is determined that the disparity motion vector for the region is the disparity vector for the current block.

In one example, the disclosure describes a device for encoding video data. The device includes means for determining whether a motion vector for a region in a picture in a first view of a plurality of views is a disparity motion vector. In this example, the region neighbors a current block to be predicted, the region includes one or more blocks, the motion vector for the region represents a single motion vector for the one or more blocks for one reference picture list, and the disparity motion vector refers to a picture in a second, different view. The device also includes, responsive to determining that the motion vector for the region in the picture is the disparity motion vector, means for determining whether the disparity motion vector for the region is a disparity vector for the current block, and means for inter-prediction encoding the current block, wherein the means for inter-prediction encoding uses the disparity motion vector for the region as the disparity vector for the current block if it is determined that the disparity motion vector for the region is the disparity vector for the current block.

In one example, the disclosure describes a computer-readable storage medium having instructions stored thereon that when executed cause one or more processors to determine whether a motion vector for a region in a picture in a first view of a plurality of views is a disparity motion vector. In this example, the region neighbors a current block to be predicted, the region includes one or more blocks, the motion vector for the region represents a single motion vector for the one or more blocks for one reference picture list, and the disparity motion vector refers to a picture in a second, different view. Responsive to determining that the motion vector for the region in the picture is the disparity motion vector, the instructions cause the one or more processors to determine whether the disparity motion vector for the region is a disparity vector for the current block. The instructions also cause the one or more processors to inter-prediction decode the current block, wherein the instructions to that cause the one or more processors to decode comprise instructions that cause the one or more processors to use the disparity motion vector for the region as the disparity vector for the current block if it is determined that the disparity motion vector for the region is the disparity vector for the current block.

In one example, the disclosure describes a computer-readable storage medium having instructions stored thereon that when executed cause one or more processors to determine whether a motion vector for a region in a picture in a first view of a plurality of views is a disparity motion vector. In this example, the region neighbors a current block to be predicted, the region includes one or more blocks, the motion vector for the region represents a single motion vector for the one or more blocks for one reference picture list, and the disparity motion vector refers to a picture in a second, different view. Responsive to determining that the motion vector for the region in the picture is the disparity motion vector, the instructions cause the one or more processors to determine whether the disparity motion vector for the region is a disparity vector for the current block. The instructions also cause the one or more processors to inter-prediction encode the current block, wherein the instructions that cause the one or more processors to encode comprise instructions that cause the one or more processors to use the disparity motion vector for the region as the disparity vector for the current block if it is determined that the disparity motion vector for the region is the disparity vector for the current block.

The details of one or more examples are set forth in the accompanying drawings and the description below. Other features, objects, and advantages will be apparent from the description and drawings, and from the claims.

DETAILED DESCRIPTION

Figure 1:
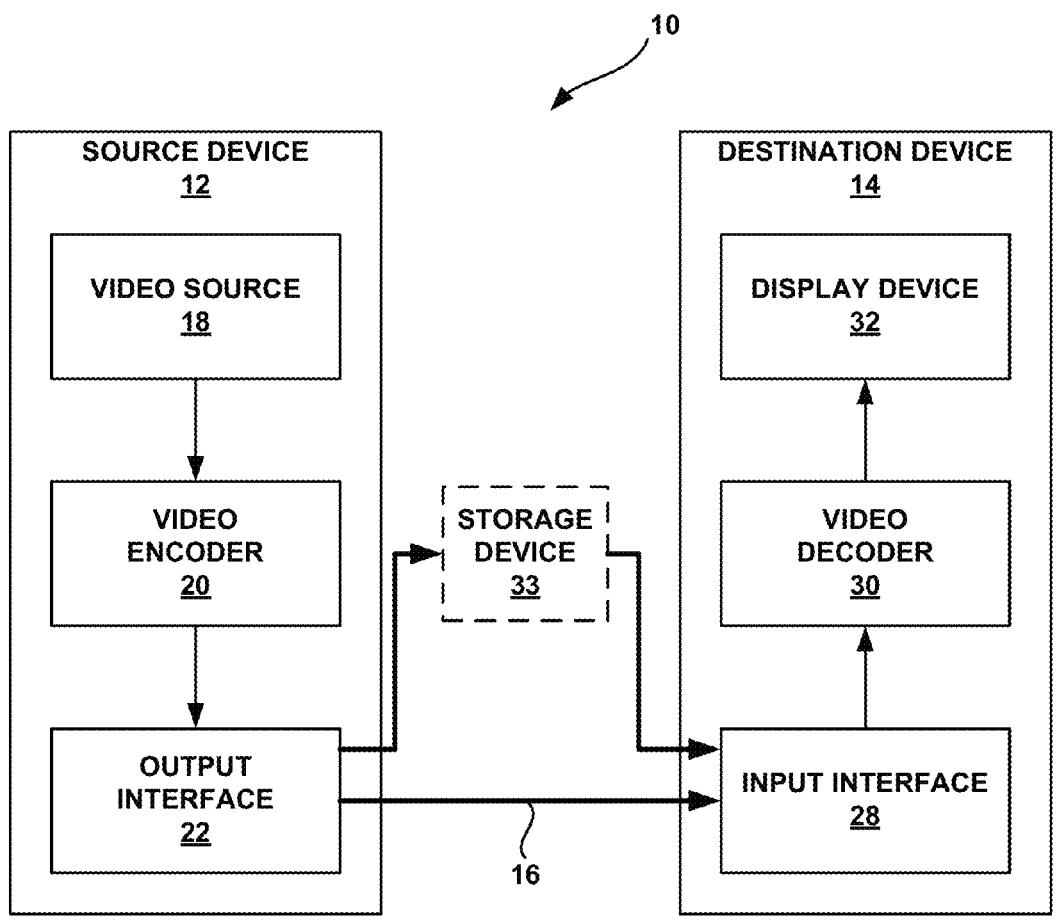
FIG. 1 is a block diagram illustrating an example video encoding and decoding system in accordance with one or more examples described in this disclosure.

The techniques described in this disclosure are generally directed to multiview texture (or texture and depth) coding (MVC), and more particularly to the manner in which a video coder (e.g., video encoder or video decoder) determines a disparity vector for a current block within a current picture of a current view for MVC. MVC refers to the manner in which a plurality of views is coded, in which each view includes a plurality of pictures. MVC may be used to support three-dimensional (3D) video. In a 3D application, when a display presents pictures from two or more of the views, the viewer perceives an image that encompasses a 3D volume, rather than an image that is constrained to the two-dimensional (2D) area of the display. The viewer perception of an image that encompasses a 3D volume is due to the horizontal disparity between objects in the pictures of the different views.

A disparity vector is a vector that refers to a block within a corresponding picture that is in a different view than the current view of the current picture. The block within the corresponding picture and the current block in the current picture may include similar video content; however, there is horizontal disparity between location of the block within the corresponding picture and the location of the current block within the current picture. The disparity vector of the current block provides a measure of this horizontal disparity between the block in the corresponding picture and the current block in the current picture. In another example, there may be also vertical disparity between location of the block within the corresponding picture and the location of the current block within the current picture. The disparity vector of the current block may provide a measure of this vertical disparity between the block in the corresponding picture and the current block in the current picture. The time when the current picture of the current view and the corresponding picture of the different view are displayed may be the same (i.e., such that the current view and different view are views for the same time instance).

As described in more detail below, the video coder determines the disparity vector based on the motion information for one or more spatially and temporally neighboring blocks to the current block. However, because of the manner in which the motion information for these spatially and temporally neighboring blocks is stored, in some examples, the video coder may not need to determine the motion information on a block-by-block basis for the spatially and temporally neighboring blocks. Rather, the video coder may be configured to determine the motion information on a region-by-region basis, where one region includes one or more neighboring blocks and may be larger than the size of the current block. In this example, the video coder accounts for the manner in which the motion information for spatially and temporally neighboring blocks is stored such that the video coder determines motion information on a region-by-region basis which may result in fewer determinations of motion information as compared to determining motion information on a block-by-block basis.

In some examples, the video coder determines the disparity vector without necessarily needing to derive a depth map for the picture, where the depth map indicates relative depth of the pixels in the picture, or without necessarily coding a global disparity vector (GDV). Disparity vectors that are determined from derived depth maps are referred to as smooth temporal-view predicted (STV) disparity vectors. The GDV is a vector that assigns the same disparity vector to each pixel. In some other examples, STV disparity vectors may be applied for each prediction unit/coding unit/macroblock/macroblock partitions, thus, each of them has its own STV.

Deriving a depth map for the picture can be processing- and time-intensive. Accordingly, determining the disparity vector for the block without necessarily needing to derive the depth map for the picture promotes efficient video coding. Furthermore, even if a depth map is available the techniques described in this disclosure may be utilized. The techniques may also be useful for depth map coding tools. Moreover, a GDV does not provide an accurate description of the disparity between corresponding blocks in the different views. For example, two blocks in a picture in one view may be displaced by different amounts in a picture in another view. Because GDV assigns the same disparity vector to all pixels, the GDV does not accurately define the different amounts of disparity of the two blocks.

A disparity vector could be used in several coding tools, such as inter-view motion prediction, inter-view residual prediction. For instance, inter-view motion prediction is an example where the disparity vector could be used in two ways. In a first way, for inter-view motion prediction, a motion vector for the block to which the disparity vector of the current block refers may be a motion vector predictor of a plurality of potential motion vector predictors for a motion vector of the current block. When the video coder selects this motion vector predictor (e.g., the motion vector of the block referred to by the disparity vector of the current block), the video coder may utilize this motion vector predictor as the motion vector of the current block in merge mode or skip mode (for simplicity, in the following descriptions, merge mode is used to indicate both merge and skip mode), and may utilize this motion vector predictor to determine the motion vector of the current block in advanced motion vector prediction (AMVP) mode. In this case, the motion vector converted from the disparity vector is used as an additional candidate for AMVP or merge mode. In a second way, for inter-view motion prediction, the disparity vector is used to locate one corresponding block in the reference view and the motion information of the corresponding block may be converted to a candidate for AMVP or merge mode.

For instance, in the examples of merge mode, the video coder may set the motion vector predictor as the motion vector of the current block, and utilize the reference picture referred to by the motion vector predictor to inter-predict the current block. In AMVP mode, the video coder may code residuals between the motion vector predictor and the actual motion vector of the current block. In this example, the video coder adds the residuals to or subtracts the residuals from the motion vector predictor to determine the motion vector of the current block. Also, in AMVP mode, the video coder codes a reference index into at least one of a first and second reference picture lists to identify the reference picture that is used to inter-predict the current block.

By determining the disparity vector without necessarily needing to derive the depth map, the video coder may be configured to determine the motion vector for the block to which the disparity vector refers in a more efficient manner as compared to examples where the video coder first derives the depth map to determine the disparity vector. Furthermore, by not relying on the GDV, the video coder may be configured to provide a more accurate amount of disparity with the determined disparity vector, where the determined disparity vector more accurately defines the block whose motion vector is to be used in merge mode or AMVP mode. Because the motion vector for the block to which the disparity refers is a potential motion vector predictor for the current block in merge mode and AMVP mode, in the techniques described in this disclosure, the video coder may be configured to implement the merge mode and the AMVP mode in a more efficient manner as compared to some other techniques.

In some examples, the video coder is configured to determine the disparity vector for the block based on a candidate list of disparity vectors. For example, rather than deriving the depth map and deriving the disparity vector from the depth map, in some examples, the video coder constructs a list of candidate disparity vectors, selects one of the candidate disparity vectors, and determines the disparity vector for the current block based on the selected candidate disparity vector. There may be various ways in which the video coder selects one of the candidate disparity vectors, and the techniques described in this disclosure are not limited to any particular way in which to select the candidate disparity vector.

Determining the disparity vector without necessarily deriving the depth map may allow several coding tools, such as inter-view motion prediction/inter-view residual prediction for certain types of pictures. For example, inter-view motion prediction may be applied to a random access point (RAP) picture such as instantaneous decoder refresh (IDR) pictures and clean random access (CRA) pictures utilizing the techniques described in this disclosure. In some other techniques (e.g., techniques not in accordance with the techniques described in this disclosure), inter-view motion prediction could not be applied to RAP pictures in certain non-base views (e.g., dependent views) because the RAP pictures have to be fully decoded to derive the estimated depth map of RAP pictures and the disparity vector relies on the estimated depth map. By deriving the disparity vectors without needing the depth map, the techniques described in this disclosure may allow inter-view motion prediction for RAP pictures of non-base views.

In some examples, the video coder constructs the list of candidate disparity vectors based on spatial and temporal neighboring blocks. For example, if a spatial or temporal neighboring block to the current block used inter-view prediction, the disparity motion vector for such blocks may potentially be included as a candidate disparity vector. Inter-view prediction refers to inter-prediction in which the reference picture that includes the reference block used to inter-predict the current block is located in a view different than the view in which the current picture that includes the current block is located. A disparity motion vector is a vector for a block in a picture in a first view that refers to a block in a picture in a second, different view.

As described above, in accordance with the techniques described in this disclosure, in constructing the list of candidate disparity vectors, the video coder may account for the manner in which the motion vector information for the spatially and temporally neighboring blocks are stored. For example, for a reference picture, which includes a temporally neighboring block, the video coder may not store the motion vectors for each 4×4 block in the reference picture in every example, but may store the motion vectors for each 4×4 block in the reference picture in some examples. In some example, the video decoder may be configured to store one motion vector in one reference picture list for a 16×16 region (where a 16×16 region includes sixteen 4×4 blocks). This one motion vector for the 16×16 region may be considered as a single motion vector for each of the sixteen 4×4 blocks within the region in the reference picture list.

For simplicity, in the following description, the motion vector for the region represents the motion vector of one reference picture list. Also, the region whether from a reference picture, or from within the current picture may include one or more blocks. For ease of illustration, the techniques are described with examples where the region includes more than one block, but it should be understood that the region may include one or more blocks.

In the above example, although each 4×4 block in the 16×16 region in the reference picture may be coded by different motion vectors, when the video coder stores the motion vector information, the individual motion vector information for each 4×4 block in the 16×16 region is lost, and replaced with one motion vector that is the same for each 4×4 block. Another benefit of storing the motion vector in a 16×16 region is that the memory requirement is reduced significantly (i.e., there is no need to store the motion vector for each 4×4 block within the 16×16 region). There may be different ways in which the video coder determines the single motion vector for the 16×16 region, and the techniques described in this disclosure are not limited to any specific way in which the video coder determines the single motion vector for the 16×16 region.

In examples where the video coder stores the motion vector for a region, rather than block-by-block, it may not be necessary for the video coder to determine the motion vector information of every single 4×4 block that is temporally neighboring the current block. For example, for determining a candidate disparity vector, the video coder may check the following locations within a reference picture: the co-located region to the current block, blocks within a largest coding unit (LCU) region that covers the co-located region, and a bottom-right block. However, it may be possible that motion vector information for all of these checked areas is the same due to the manner in which the video coder stored the motion vector information. Accordingly, the video coder may not need to determine the motion vector information for all of these blocks for purposes of determining a candidate disparity vector for the current block.

Instead, the video coder may determine the motion vector information for the 16×16 region. If the motion vector for this 16×16 region is a disparity motion vector, this disparity motion vector may be a candidate disparity vector that is used to determine the disparity vector for the current block. In this example, the 16×16 region is larger in size than each of the 4×4 temporally neighboring blocks. Also, the 16×16 region may be larger in size than the size of the current block. It should be understood that the video coder may check the 4×4 temporally neighboring blocks on a block-by-block basis.

In the above example, the video coder determines a candidate disparity vector based on a temporally neighboring region to the current block. As described above, in some examples, the video coder also evaluates whether any spatially neighboring blocks are inter-view predicted, and utilizes the disparity motion vector for these spatially neighboring blocks as candidates for the disparity vector of the current block. Similar to the case with temporally neighboring blocks, in some examples, the video coder does not store all motion vector information for spatially neighboring blocks.

For example, while for inter-predicting blocks in a line above the line that includes the current block, the video coder stores the motion vector information for the blocks in this line (i.e., line above the line that includes the current block) in a line buffer. In the line buffer, the video coder may not store all of the motion vector information for each 4×4 block. Rather, two blocks may share the same motion vector information. However, two blocks sharing the same motion vector information is not required in all examples, and video coder may store all of the motion vector information for each 4×4 block.

For example, assume there are four 4×4 blocks arranged in a line. There may be a motion vector for each of these four 4×4 blocks arranged in the line, and the motion vectors for these four 4×4 blocks may be different.

In this example, although the motion vectors for the first and second 4×4 blocks may be different, when storing, the first and second 4×4 blocks share the same motion vector information, and the video coder stores one motion vector for both of these blocks in the line buffer. This one motion vector represents a single motion vector for the first and second 4×4 blocks.

In some examples, the video coder stores the motion vector information for the first block as the motion vector for both the first and second blocks so that the motion vector information for the second 4×4 block is lost, and the motion vector information for the first 4×4 block is preserved. Also, in this example, although the motion vectors for the third and fourth 4×4 blocks may be different, when storing, the third and fourth 4×4 blocks share the same motion vector information, and the video coder may store one motion vector for both of these blocks in the line buffer. This one motion vector represents a single motion vector for the third and fourth 4×4 blocks. In some examples, the video coder stores the motion vector information for the fourth block as the motion vector for the both the third and fourth blocks so that the motion vector information for the second 4×4 block is lost, and the motion vector information for the fourth 4×4 block is preserved.

In some examples, the motion vector information that is stored may be derived from the first and second 4×4 blocks or the third and fourth 4×4 blocks, and the derived motion vector information may not be identical to any one of the two blocks. In general, the video coder may utilize any technique to reduce the motion vector information that needs to be stored in the line buffer, and the techniques described above (e.g., storing the motion vector information for one block as the motion vector information for two blocks, or deriving motion vector information for the two blocks) are provided for purposes of illustration and should not be considered limiting.

In the above example, the video coder stores motion vector information for 8×4 regions within the line above the line that includes the current block, where each 8×4 region includes two 4×4 blocks. In this case, it may not be necessary for the video coder to determine the motion vector information for every single 4×4 block among the spatially neighboring blocks to the current block. For example, it is possible that the motion vector information for some of the spatially neighboring blocks is the same. In this example, determining the motion vector information for only one of the blocks may suffice for determining which candidates can be included in the list of candidate disparity vectors.

In other words, the video coder may not determine motion vector information for 4×4 block among spatially neighboring blocks. Rather, the video coder may determine the motion vector information for an 8×4 region (in this example), where the 8×4 region includes two 4×4 blocks that are each spatially neighboring the current block (e.g., a single motion vector that represents the two 4×4 blocks). If the motion vector for this 8×4 region is a disparity motion vector, this disparity motion vector may be a candidate disparity vector that is used to determine the disparity vector for the current block. In this example, the 8×4 region is larger in size than each of the 4×4 spatially neighboring blocks. Also, the 8×4 region may be larger in size than the size of the current block.

Moreover, the techniques described in this disclosure may overcome other issues present in some video coding techniques. For example, the disparity motion vectors for spatial and temporal neighboring blocks may include both a horizontal component and a vertical component (e.g., both an x-coordinate and a y-coordinate). However, some examples of disparity vectors include only a horizontal component. Therefore, in some examples, when using a disparity motion vector of a spatial or temporal neighboring block, the video coder may set the y-coordinate value to 0 so that the candidate disparity vector includes only an x-coordinate. Again, not all disparity vectors need to necessarily include only a horizontal component, and may include both horizontal and vertical components.

Conversely, as described in more detail below, when the disparity vector is used as a disparity motion vector, the disparity motion vector may not include a y-component. However, in some examples, it may be beneficially to inter-view predict the current block from a block whose location is not at the exact same y-coordinate as the block being predicted. In other words, the block, in the reference picture in the reference view, that is only horizontally displaced from the block being inter-view predicted may not necessarily be the best block for prediction. In this case, it may be desirable for the disparity motion vector to include a y-coordinate to identify a block that is either above or below the horizontally displaced block in the reference picture in the reference view. In some examples, the techniques described in this disclosure allow for the disparity motion vector to include a y-coordinate when the disparity motion vector is derived from the disparity vector.

FIG. 1 is a block diagram illustrating an example video encoding and decoding system in accordance with one or more examples described in this disclosure. For example, system 10 includes source device 12 and destination device 14. Source device 12 and destination device 14 are configured to implement multiview coding (MVC) in which source device 12 and destination device 14 each code pictures of different views. When the pictures of the different views are viewed together, the viewer perceives an image that encompasses a 3D volume, instead of an image that is constrained to the 2D area of the display.

System 10 may operate in accordance with different video coding standards, a proprietary standard, or any other way of multiview coding. The following describes a few examples of video coding standards, and should not be considered limiting. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010. A more recent, publicly available joint draft of MVC is described in "Advanced video coding for generic audiovisual services," ITU-T Recommendation H.264, June 2012. A current joint draft of the MVC has been approved as of January 2012.

In addition, there is a new video coding standard, namely High Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). A recent working draft of HEVC, referred to as HEVC WD9 is available, as of Mar. 6, 2013 from http://phenix.int-evey.fr/jct/doc_en-d_user/documents/11_Shanghai/wg11/JCTVC-K1003-v10.zip.

For purposes of illustration only, the techniques described in this disclosure are described with examples in accordance the H.264 and HEVC standards. In some examples, the techniques described in this disclosure may be applicable for the H.264 3D-AVC standard, the H.264 MVC+Depth (H.246 MVC+D) standard, and the 3D-HEVC standard. However, the techniques described in this disclosure should not be considered limited to these example standards, and may be extendable to other video coding standards for multiview coding or 3D video coding, or to techniques related to multiview coding or 3D video coding that are not necessarily based on a particular video coding standard. For example, the techniques described in this disclosure are implemented by video encoders/decoders (codecs) for multiview coding, where multiview coding includes coding of two or more views.

As shown in FIG. 1, system 10 includes a source device 12 that generates encoded video data to be decoded at a later time by a destination device 14. Source device 12 and destination device 14 comprise any of a wide range of devices, including a wireless handset such as so-called "smart" phones, so-called "smart" pads, or other such wireless devices equipped for wireless communication. Additional examples of source device 12 and destination device 14 include, but are not limited to, a digital television, a device in digital direct broadcast system, a device in wireless broadcast system, a personal digital assistants (PDA), a laptop computer, a desktop computer, a tablet computer, an e-book reader, a digital camera, a digital recording device, a digital media player, a video gaming device, a video game console, a cellular radio telephone, a satellite radio telephone, a video teleconferencing device, and a video streaming device, or the like.

Destination device 14 may receive the encoded video data to be decoded via a link 16. Link 16 comprises any type of medium or device capable of moving the encoded video data from source device 12 to destination device 14. In one example, link 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data is output from output interface 22 to a storage device 33. Similarly, encoded data is accessed from storage device 33 by input interface 28. Examples of storage device 33 include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 33 corresponds to a file server or another intermediate storage device that holds the encoded video generated by source device 12. In these examples, destination device 14 accesses stored video data from storage device 33 via streaming or download. The file server is any type of server capable of storing encoded video data and transmitting that encoded video data to the destination device 14. Example file servers include a web server (e.g., for a website), an FTP server, network attached storage (NAS) devices, or a local disk drive. Destination device 14 accesses the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 33 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions (e.g., via the Internet), encoding of digital video for storage on a data storage medium, decoding of digital video stored on a data storage medium, or other applications. In some examples, system 10 is configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 includes a modulator/demodulator (modem) and/or a transmitter. In source device 12, video source 18 includes one or more of a source such as a video capture device (e.g., a video camera), a video archive containing previously captured video, a video feed interface to receive video from a video content provider, and/or a computer graphics system for generating computer graphics data as the source video, a combination of such sources, or any other source. As one example, if video source 18 is a video camera, source device 12 and destination device 14 may form so-called camera phones or video phones. However, the techniques described in this disclosure are applicable to video coding in general, and may be applied to wireless and/or wired applications.

Video encoder 20 encodes the captured, pre-captured, or computer-generated video. Output interface 22 of source device 12 is configured to transmit the encoded video data to destination device 14. The encoded video data may also (or alternatively) be stored onto storage device 33 for later access by destination device 14 or other devices, for decoding and/or playback.

Destination device 14 includes an input interface 28, a video decoder 30, and a display device 32. In some cases, input interface 28 includes a receiver and/or a modem. Input interface 28 of destination device 14 receives the encoded video data over link 16 or from storage device 33. The encoded video data communicated over link 16, or provided on storage device 33, includes a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 includes an integrated display device and also configured to interface with an external display device. In other examples, destination device 14 is a display device. In general, display device 32 displays the decoded video data to a user, and comprises any of a variety of display devices such as a liquid crystal display (LCD), a plasma display, an organic light emitting diode (OLED) display, or another type of display device.

Video encoder 20 and video decoder 30 may operate according to various video coding standards, such as the examples listed above. However, the techniques described in this disclosure should not be considered limited as such. For purposes of description, video encoder 20 and video decoder 30 are described in context of the HEVC or the H.264 standard and the extensions of such standards, and may be applicable to standards such as the H.264 3D-AVC standard, the H.264 MVC+D standard, and the 3D-HEVC standard. The techniques of this disclosure, however, are not limited to any particular coding standard. Other examples of video compression standards include MPEG-2 and ITU-T H.263. Proprietary coding techniques, such as those referred to as On2 VP6/VP7/VP8, may also implement one or more of the techniques described herein.

Although not shown in FIG. 1, in some aspects, video encoder 20 and video decoder 30 are each integrated with an audio encoder and decoder, and include appropriate MUX-DEMUX units, or other hardware and software, to handle encoding of both audio and video in a common data stream or separate data streams. If applicable, in some examples, MUX-DEMUX units conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. Video encoder 20 is configured to encode video data and video decoder 30 is configured to decode video data in accordance with techniques described in this disclosure.

Figure 2:
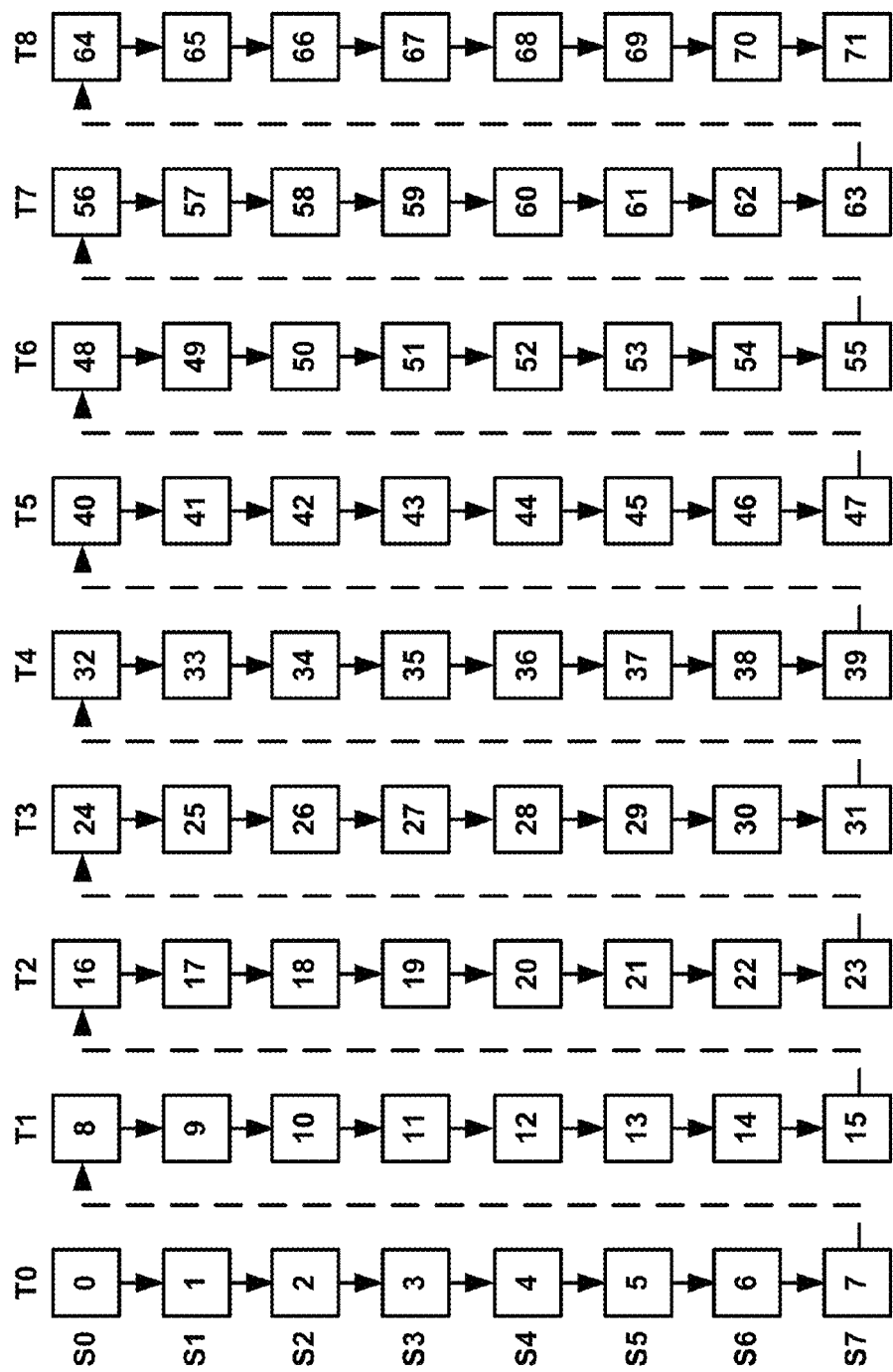
FIG. 2 is a graphical diagram illustrating an example multiview video coding (MVC) encoding or decoding order, in accordance with one or more examples described in this disclosure.

FIG. 2 is a graphical diagram illustrating an example multiview video coding (MVC) encoding or decoding order, in accordance with one or more examples described in this disclosure. For example, the decoding order arrangement illustrated in FIG. 2 is referred to as time-first coding. In FIG. 2, S0-S7 each refers to different views of the multiview video. T0-T8 each represents one output time instance. An access unit may include the coded pictures of all the views for one output time instance. For example, a first access unit includes all of the views S0-S7 for time instance T0 (i.e., pictures 0-7), a second access unit includes all of the views S0-S7 for time instance T1 (i.e. pictures 8-15), and so forth. In this examples, pictures 0-7 are at a same time instance (i.e., time instance T0), pictures 8-15 at a same time instance (i.e., time instance T1). Pictures with the same time instance are generally displayed at the same time, and it is the horizontal disparity, and possibly some vertical disparity, between the objects within the pictures of the same time instance that cause the viewer to perceive an image that encompasses a 3D volume.

In FIG. 2, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. Each set includes two pictures: one picture is referred to as a texture view component, and the other picture is referred to as a depth view component. The texture view component and the depth view component within a set of pictures of a view may be considered as corresponding to one another. For example, the texture view component within a set of pictures of a view is considered as corresponding to the depth view component within the set of the pictures of the view, and vice-versa (i.e., the depth view component corresponds to its texture view component in the set, and vice-versa). As used in this disclosure, a texture view component that corresponds to a depth view component may be considered as the texture view component and the depth view component being part of a same view of a single access unit.

The texture view component includes the actual image content that is displayed. For example, the texture view component may include luma (Y) and chroma (Cb and Cr) components. The depth view component may indicate relative depths of the pixels in its corresponding texture view component. As one example, the depth view component may be considered as a gray scale image that includes only luma values. In other words, the depth view component may not convey any image content, but rather provide a measure of the relative depths of the pixels in the texture view component.

For example, a purely white pixel in the depth view component indicates that its corresponding pixel or pixels in the corresponding texture view component is closer from the perspective of the viewer, and a purely black pixel in the depth view component indicates that its corresponding pixel or pixels in the corresponding texture view component is further away from the perspective of the viewer. The various shades of gray in between black and white indicate different depth levels. For instance, a very gray pixel in the depth view component indicates that its corresponding pixel in the texture view component is further away than a slightly gray pixel in the depth view component. Because only gray scale is needed to identify the depth of pixels, the depth view component need not include chroma components, as color values for the depth view component may not serve any purpose.

The depth view component using only luma values (e.g., intensity values) to identify depth is provided for illustration purposes and should not be considered limiting. In general, any technique may be utilized to indicate relative depths of the pixels in the texture view component.

In accordance with MVC, the texture view components are inter-predicted from texture view components in the same view but different access units, or from texture view components in one or more different views, but in the same access unit. The texture view components may be coded in blocks of video data, which are referred to as "video blocks" and commonly called "macroblocks" in the H.264 context. Other video coding standards, such as the HEVC standard, may refer to video blocks as treeblocks or coding units (CUs).

The video content in the pictures in the same time instance may be similar. However, the video content may be slightly displaced in the horizontal direction, and possibly the vertical direction as well. For example, if a block is located at (x, y) in picture 0 of view S0, a block located at (x+x', y) in picture 1 of view S1 includes similar video content as the block located at (x, y) in picture 0 of view S0. In this example, the block located at (x, y) in picture 0 of view S0 and the block located at (x+x', y) in picture 1 of view S1 are considered as corresponding blocks. In some examples, a disparity vector for the block located at (x+x', y) in picture 1 of view S1 refers to the location of its corresponding block. For example, the disparity vector for the block located at (x+x', y) is (−x', 0).

In some examples, video encoder 20 or video decoder 30 utilize the disparity vector of a block in a picture of a first view to identify the corresponding block in a picture of a second view. Video encoder 20 or video decoder 30 may utilize the motion information for the identified corresponding block in the picture of the second view as a candidate motion vector predictor in a list of candidate motion predictors of the block in the picture in the first view. In some examples, video encoder 20 or video decoder 30 select this candidate motion predictor (e.g., the motion information for the block in the picture of the second view) as the motion vector predictor for the block in the picture in the first view. In this example, video encoder 20 or video decoder 30 determine the motion vector for the block in the picture in the first view based on the motion vector predictor in accordance with the so-called merge mode or advanced motion vector prediction (AMVP) mode, both of which are described in more detail below. In some example, the disparity vector may be used to locate a residual block in the second view to predict current residual information of the first view.

Video encoder 20 or video decoder 30 is configured to determine the disparity vector of a block. In some other techniques (i.e., techniques other than those in accordance with the techniques described in this disclosure), video encoder 20 or video decoder 30 first derive the depth view component for a texture view component, and then determine the disparity vector for a block in the texture view component based on the derived depth view component. The resulting disparity vector is referred to as a smooth temporal view predicted (STV) disparity vector. Also in some other techniques, video encoder 20 and video decoder 30 code a global disparity vector (GDV) that assigns each pixel the same disparity vector.

However, deriving the depth view component may be complex (i.e., processing- and time-intensive). The techniques described in this disclosure allow for video encoder 20 and video decoder 30 to determine the disparity vector for the block in the texture view component without necessarily determining the depth view component first. However, even if video encoder 20 and video decoder 30 were to derive the depth view component first, video encoder 20 and video decoder 30 may still utilize the techniques described in this disclosure. In some cases, the techniques described in this disclosure may be useful as depth map coding tools.

Also, the GDV may not be an accurate measure of the actual disparity vector, and hence, may not accurately refer to the block whose motion vector is used as a motion vector predictor. In other words, the motion vector of the block to which the GDV refers is a less accurate motion vector predictor then the motion vector of the block to which the actual disparity vector refers.

Figure 3:
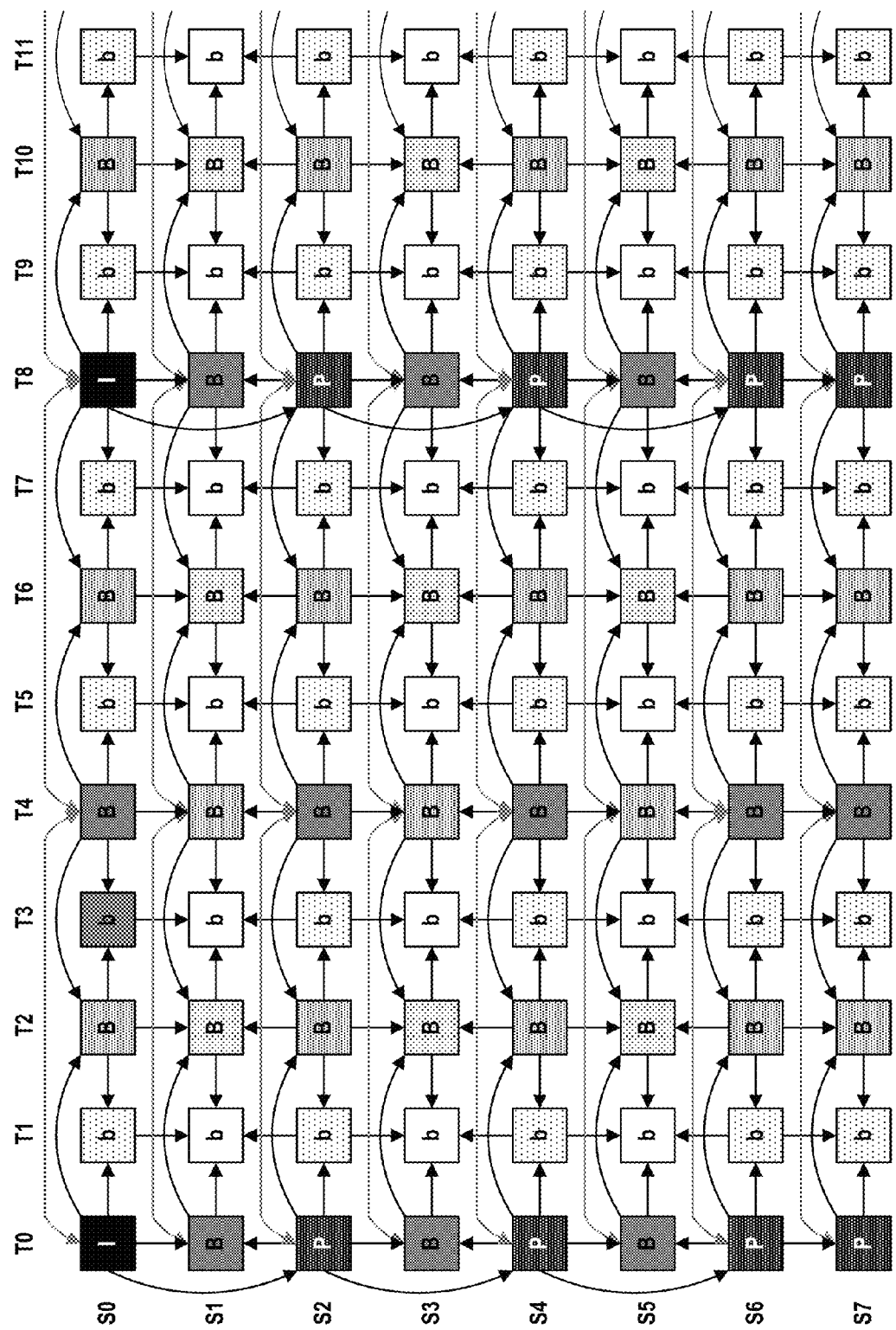
FIG. 3 is a graphical diagram illustrating an example MVC prediction pattern.

FIG. 3 is a graphical diagram illustrating an example MVC prediction pattern. In the example of FIG. 3, eight views (having view IDs "S0" through "S7") are illustrated, and twelve temporal locations ("T0" through "T11") are illustrated for each view. That is, each row in FIG. 3 corresponds to a view, while each column indicates a temporal location.

Although MVC has a so-called base view which is decodable by H.264/AVC decoders or HEVC decoders and stereo view pair could be supported also by MVC, the advantage of MVC is that it could support an example that uses more than two views as a 3D video input and decodes this 3D video represented by the multiple views. A renderer of a client having an MVC decoder (e.g., H.264/MVC decoder or HEVC decoder) may expect 3D video content with multiple views.

In FIG. 3, view S0 is considered as a base view, and views S1-S7 are considered as dependent views. A base view includes pictures that are not inter-view predicted. Picture in a base view can be inter-predicted with respect to other pictures in the same view. For instance, none of the pictures in view S0 are inter-predicted with respect to a picture in any of views S1-S7, but some of the pictures in view S0 are inter-predicted with respect to other pictures in view S0.

A dependent view includes pictures that are inter-view predicted. For example, each one of views S1-S7 includes at least one picture that is inter-predicted with respect to a picture in another view. Pictures in a dependent view may be inter-predicted with respect to pictures in the base view, or may be inter-predicted with respect to pictures in other dependent views.

Including both a base view and dependent views ensures that different types of video decoders can decode the pictures. For example, one type of video decoder is not configured to process multiview coding. The type of video decoder can still decode the base view, while video decoders that are configured to process multiview coding can decode each one of views S0-S7.

Documents m22570 and m22571 define some techniques for HEVC-based 3D coding (3D-HEVC), and are available, as of Mar. 6, 2013, with password, from http://wg11.sc29.org/doc_end_user/documents/98 Geneva/wg11/m22570-v2-m22570-v2.zip; http://wg11.sc29.org/doc_en-d_user/documents/98 Geneva/wg11/m22571-v2-m22571-v2.zip. One of the tools described in these documents is the inter-view motion prediction where motion parameters (i.e., motion vectors and reference indices) of a block in a dependent view are predicted or inferred (e.g., in AMVP mode or merge mode) based on already coded motion parameters in other views of the same access unit. As described in more detail, there may be certain limitations and issues present in the techniques described in the m22570 and m22571 documents. The techniques described in this disclosure potentially overcome some of the limitations and issues in the techniques described in the m22570 and m22571 documents. The latest reference software description for 3D-HEVC is available as: Gerhard Tech, Krzysztof Wegner, Ying Chen, Sehoon Yea, "3D-HEVC Test Model 1," http://phenix.it-sudparis.eu/jct2/doc_end_user/documents/1_Stockholm/wg11/JCT3V-A1005-v1.zip. Stockholm, Sweden, April 2012. The latest reference software for 3D-HEVC, namely HTM is available from: https://hevc.h-hi.fraunhofer.de/svn/svn_3DVCSoftware/trunk.

Pictures in FIG. 3 are indicated at the intersection of each row and each column in FIG. 3. The H.264/AVC standard with MVC extensions may use the term frame to represent a portion of the video, while HEVC standard may use the term picture to represent a portion of the video. This disclosure uses the term picture and frame interchangeably.

The pictures in FIG. 3 are illustrated using a shaded block including a letter, designating whether the corresponding picture is intra-coded (that is, an I-picture), or inter-coded in one direction (that is, as a P-picture) or in multiple directions (that is, as a B-picture). In general, predictions are indicated by arrows, where the pointed-to pictures use the pointed-from picture for prediction reference. For example, the P-picture of view S2 at temporal location T0 is predicted from the I-picture of view S0 at temporal location T0.

As with single view video encoding, pictures of a multi-view video coding video sequence may be predictively encoded with respect to pictures at different temporal locations. For example, the b-picture of view S0 at temporal location T1 has an arrow pointed to it from the I-picture of view S0 at temporal location T0, indicating that the b-picture is predicted from the I-picture. Additionally, however, in the context of multiview video encoding, pictures may be inter-view predicted. That is, a view component (e.g., a texture view component) can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references.

FIG. 3 provides various examples of inter-view prediction. Pictures of view S1, in the example of FIG. 3, are illustrated as being predicted from pictures at different temporal locations of view S1, as well as inter-view predicted from pictures of views S0 and S2 at the same temporal locations. For example, the b-picture of view S1 at temporal location T1 is predicted from each of the B-pictures of view S1 at temporal locations T0 and T2, as well as the b-pictures of views S0 and S2 at temporal location T1.

In the example of FIG. 3, capital "B" and lowercase "b" are used to indicate different hierarchical relationships between pictures, rather than different coding methodologies. In general, capital "B" pictures are relatively higher in the prediction hierarchy than lowercase "b" frames. FIG. 3 also illustrates variations in the prediction hierarchy using different levels of shading, where a greater amount of shading (that is, relatively darker) frames are higher in the prediction hierarchy than those frames having less shading (that is, relatively lighter). For example, all I-pictures in FIG. 3 are illustrated with full shading, while P-pictures have a somewhat lighter shading, and B-pictures (and lowercase b-pictures) have various levels of shading relative to each other, but always lighter than the shading of the P-pictures and the I-pictures.

In general, the prediction hierarchy is related to view order indexes, in that pictures relatively higher in the prediction hierarchy should be decoded before decoding pictures that are relatively lower in the hierarchy, such that those pictures relatively higher in the hierarchy can be used as reference pictures during decoding of the pictures relatively lower in the hierarchy. A view order index is an index that indicates the decoding order of view components in an access unit. The view order indices are implied in the sequence parameter set (SPS) MVC extension, as specified in Annex H of H.264/AVC (the MVC amendment). In the SPS, for each index i, the corresponding view_id is signaled. The decoding of the view components shall follow the ascending order of the view order index. If all the views are presented, then the view order indexes are in a consecutive order from 0 to num_views_minus_1.

In this manner, pictures used as reference pictures are decoded before decoding the pictures that are encoded with reference to the reference pictures. A view order index is an index that indicates the decoding order of view components in an access unit. For each view order index i, the corresponding view_id is signaled. The decoding of the view components follows the ascending order of the view order indexes. If all the views are presented, then the set of view order indexes may comprise a consecutively ordered set from zero to one less than the full number of views.

For certain pictures at equal levels of the hierarchy, decoding order may not matter relative to each other. For example, the I-picture of view S0 at temporal location T0 is used as a reference picture for the P-picture of view S2 at temporal location T0, which is in turn used as a reference picture for the P-picture of view S4 at temporal location T0. Accordingly, the I-picture of view S0 at temporal location T0 should be decoded before the P-picture of view S2 at temporal location T0, which should be decoded before the P-picture of view S4 at temporal location T0. However, between views S1 and S3, a decoding order does not matter, because views S1 and S3 do not rely on each other for prediction, but instead are predicted only from views that are higher in the prediction hierarchy. Moreover, view S1 may be decoded before view S4, so long as view S1 is decoded after views S0 and S2.

In this manner, a hierarchical ordering may be used to describe views S0 through S7. Let the notation SA>SB mean that view SA should be decoded before view SB. Using this notation, S0>S2>S4>S6>S7, in the example of FIG. 2. Also, with respect to the example of FIG. 2, S0>S1, S2>S1, S2>S3, S4>S3, S4>S5, and S6>S5. Any decoding order for the views that does not violate these requirements is possible. Accordingly, many different decoding orders are possible, with only certain limitations.

In some examples, FIG. 3 may be viewed as illustrating the texture view components. In these examples to implement inter-view motion prediction in the so-called merge mode or AMVP mode, in some cases, video encoder 20 or video decoder 30 utilizes the motion vector for the block referred to by the disparity vector of a current block that is to be inter-predicted as a motion vector predictor. The techniques described in this disclosure determine the disparity vector of the current block without necessarily needing to derive the depth view component, and without necessarily relying on the global disparity vector.

A video sequence typically includes a series of video pictures from a view (e.g., views illustrated in FIGS. 2 and 3). A group of pictures (GOP) generally comprises a series of one or more video pictures. A GOP may include syntax data in a header of the GOP, a header of one or more pictures of the GOP, or elsewhere, that describes a number of pictures included in the GOP. Each picture may include picture syntax data that describes an encoding mode for the respective picture. Video encoder 20 typically operates on video blocks within individual video pictures in order to encode the video data. A video block may correspond to a macroblock, a partition of a macroblock, and possibly a sub-block of a partition, as defined in the H.264 standard or largest coding units (LCUs), coding units (CUs), prediction units (PUs), or transform units (TUs), as defined in the HEVC standard. The video blocks may have fixed or varying sizes, and may differ in size according to a specified coding standard. Each video picture may include a plurality of slices. Each slice may include a plurality of blocks.

As an example, the ITU-T H.264 standard supports intra-prediction in various block sizes, such as 16 by 16, 8 by 8, or 4 by 4 for luma components, and 8×8 for chroma components, as well as inter-prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions (e.g., 16×16 pixels or 16 by 16 pixels). In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

When the block is intra-mode encoded (e.g., intra-predicted), the block may include data describing an intra-prediction mode for the block. As another example, when the block is inter-mode encoded (e.g., inter-predicted), the block may include information defining a motion vector for the block. This motion vector refers to a reference picture in the same view, or refers to a reference picture in another view. The data defining the motion vector for a block describes, for example, a horizontal component of the motion vector, a vertical component of the motion vector, a resolution for the motion vector (e.g., one-quarter pixel precision or one-eighth pixel precision). In addition, when inter-predicted, the block may include reference index information such as a reference picture to which the motion vector points, and/or a reference picture list (e.g., RefPicList0 or RefPicList1) for the motion vector.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to (e.g., ITU-T H.264/AVC). For example, whereas H.264 provides nine intra-prediction encoding modes, the HM may provide as many as thirty-three directional/angular intra-prediction encoding modes plus DC and Planar modes.

The working model of the HM describes that a video picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node (i.e., a coded video block). Syntax data associated with a coded bitstream may define a maximum number of times a treeblock may be split, and may also define a minimum size of the coding nodes. Treeblocks are referred to as LCUs in some examples.

A CU includes a coding node and prediction units (PUs) and transform units (TUs) associated with the coding node. A size of the CU corresponds to a size of the coding node and may square in shape. In some examples, the size of the CU ranges from 8×8 pixels up to the size of the treeblock with a maximum of 64×64 pixels or greater. In some examples, each CU contains one or more PUs and one or more TUs. Syntax data associated with a CU describe, for example, partitioning of the CU into one or more PUs. Partitioning modes differ between whether the CU is skip or direct mode encoded, intra-prediction mode encoded, or inter-prediction mode encoded. PUs can be partitioned to be non-square in shape, in some examples. Syntax data associated with a CU also describes, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this is not always the case. The TUs are typically the same size or smaller than the PUs. In some examples, residual samples corresponding to a CU are subdivided into smaller units using a quadtree structure known as "residual quad tree" (RQT). The leaf nodes of the RQT can be referred to as transform units (TUs). Pixel difference values associated with the TUs are transformed to produce transform coefficients, which are quantized, in some examples.

In general, a PU includes data related to the prediction process. For example, when the PU is intra-mode encoded, the PU includes data describing an intra-prediction mode for the PU. As another example, when the PU is inter-mode encoded, the PU includes data defining a motion vector for the PU. The data defining the motion vector for a PU describes, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., RefList0 or RefPicList1) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In either the H.264 standard or the HEVC standard, following intra-predictive or inter-predictive coding, video encoder 20 calculates residual data for the TUs of the CU, in HEVC or for macroblock in H.264. The PUs comprise pixel data in the spatial domain (also referred to as the pixel domain) and the TUs comprise coefficients in the transform domain following application of a transform (e.g., a discrete cosine transform (DCT)), an integer transform, a wavelet transform, or a conceptually similar transform to residual video data. The residual data may correspond to pixel differences between pixels of the unencoded picture and prediction values corresponding to the PUs in HEVC or prediction values for the macroblock in H.264.

Following any transforms to produce transform coefficients, video encoder 20 performs quantization of the transform coefficients, in some examples. Quantization generally refers to a process in which transform coefficients are quantized to possibly reduce the amount of data used to represent the coefficients, providing further compression. The quantization process reduces the bit depth associated with some or all of the coefficients. For example, an n-bit value is rounded down to an m-bit value during quantization, where n is greater than m.

In some examples, video encoder 20 utilizes a predefined scan order to scan the quantized transform coefficients to produce a serialized vector that can be entropy encoded. In other examples, video encoder 20 performs an adaptive scan. After scanning the quantized transform coefficients to form a one-dimensional vector, in some examples, video encoder 20 entropy encodes the one-dimensional vector according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology, as a few examples. Video encoder 20 also entropy encodes syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

As described above, in MVC, video encoder 20 and video decoder 30 inter-predict a current block within a current picture of a first view with reference to a reference block within a reference picture of a second view. Such inter-prediction is referred to as inter-view prediction. The time instance of the current picture and the reference picture may be the same in respective views. In this example, video encoder 20 or video decoder 30 perform inter-view prediction across pictures in a same access unit, where pictures in the same access unit are at the same time instance.

To perform inter-view prediction on the current block, video encoder 20 or video decoder 30 construct reference picture lists that identify reference pictures that can be used for inter-prediction, including pictures that can be used for inter-view prediction. Inter-prediction refers to predicting a current block in a current picture with respect to a reference block in a reference picture. Inter-view prediction is a subset of inter-prediction in that in inter-view prediction, the reference picture is in a view different than the view of the current picture. Accordingly, for inter-view prediction, video encoder 20 and video decoder 30 add the reference picture in the other view in one or both of the constructed reference picture lists. The reference picture in the other view can be identified at any location within the constructed reference picture lists. As used in this disclosure, when video encoder 20 is performing inter-prediction (e.g., inter-predicting) on a block, video encoder 20 may be considered as inter-prediction encoding a block. When video decoder 30 is performing inter-prediction (e.g., inter-predicting) on a block, video decoder 30 may be considered as inter-prediction decoding a block.

In inter-prediction, a motion vector for the current block identifies a location of the block that is to be used as the reference block for inter-predicting the current block, and a reference index into one or both of the constructed reference picture lists identifies the reference picture that includes the block that is be used as the reference block for inter-predicting the current block. In MVC, there are at least two types of motion vectors. A temporal motion vector refers to a temporal reference picture, where a temporal reference picture is a picture within the same view as the picture that includes the block to be predicted, and where the temporal reference picture is displayed earlier or later than the picture that includes the block to be predicted. A disparity motion vector refers to a reference picture in a view other than the view in which the picture that includes the block to be predicted. In this disclosure, the term "motion vector" may refer to either a temporal motion vector or a disparity motion vector, or only a temporal motion vector or a disparity motion vector, which will be clear in the context of the description.

When video encoder 20 or video decoder 30 utilizes temporal motion vectors, video encoder 20 and video decoder 30 are considered as implementing motion-compensated prediction (MCP). When video encoder 20 or video decoder 30 utilizes disparity motion vectors, video encoder 20 and video decoder 30 are considered as implementing disparity-compensated prediction (DCP), or inter-view prediction.

To reduce the amount of video data that needs to be signaled, it is not necessary for video encoder 20 to signal the motion vector for a current block to be predicted in every example. Rather, video decoder 30 determines the motion vector for the current block based on motion vector predictors. A motion vector predictor is a motion vector for a block other than the current block. The block other than the current block may be a spatially neighboring block to the current block, a temporally neighboring block to the current block, or a corresponding block in a view other than the view of the current block.

Video decoder 30 utilizes a motion vector predictor to determine the motion vector of the current block in accordance with a merge mode or an advanced motion vector prediction (AMVP) mode. In both the merge mode and the AMVP mode, in some examples, video decoder 30 implements an implicit technique to construct a candidate list of motion vector predictors. The implicit technique means that video decoder 30 need not necessarily receive instructions from video encoder 20 that instruct video decoder 30 in the manner in which to construct the candidate list of motion vector predictors. In other examples, it is possible for video encoder 20 to instruct video decoder 30 in the manner in which to construct the candidate list of motion vector predictors. For purposes of illustration, the techniques are described with examples in which video decoder 30 implements the implicit technique to construct the list of candidate motion vector predictors.

For example, video decoder 30 determines the motion vectors of one or more spatially neighboring blocks to the current block, and includes these motion vectors as candidate motion vector predictors in the candidate list of motion vector predictors. In some examples, video decoder 30 determines the motion vector of one or more temporally neighboring blocks to the current block, and includes these motion vectors as candidate motion vector predictors in the candidate list of motion vector predictors. The temporally neighboring blocks refer to blocks in a picture in the same view as the picture that includes the current block that encompass approximately the same area in the picture that the current block encompasses in its picture. The temporally neighboring blocks may be referred to as co-located blocks.

In some examples, video decoder 30 scales the motion vector for temporally neighboring blocks based on a picture order count (POC) value of the temporally neighboring blocks and the POC value of the current block. POC value indicates the display or output order of the pictures.

Furthermore, in some examples, video decoder 30 determines the motion vector of a block that is referred to by the disparity vector of the current block. The block that is referred to by the disparity vector of the current block is in a view different than the view of the current block. The block that is referred by the disparity vector is referred to as a corresponding block to the current block because the corresponding block and the current block include similar video content, but from the perspective of different views. In these examples, video decoder 30 includes the motion vector for the corresponding block as a candidate motion vector predictor in the list of candidate motion vector predictors.

In some examples, video encoder 20 signals an index value into the candidate list of motion vector predictors, and video decoder 30 selects a motion vector predictor identified in the candidate list of motion vector predictors based on the index value into the candidate list of motion vector predictors. In merge mode, video decoder 30 sets the selected motion vector predictor as the motion vector for the current block. Also, in merge mode, video decoder 30 inherits the reference picture to which the selected motion vector predictor referred. For example, the motion vector predictor is a motion vector for a block other than the current block. The motion vector for the block other than the current block refers to a reference picture identified by an index value into one of a first reference picture list (RefPicList0) or a second reference picture list (RefPicList1). In merge mode, video decoder 30 inherits the reference index into the reference picture list as the reference index into the reference picture list for the current block. In some examples, the reference index may require to be converted based on picture order count (POC) value before it could be inherited. In this manner, video decoder 30 determines the motion vector for the current block and the reference picture that is used to inter-predict the current block in merge mode.

In AMVP mode, in addition to signaling the index value into the list of candidate motion vector predictors, video encoder 20 signals a residual between the motion vector predictor identified by the index value and the actual motion vector of the current block. Video decoder 30 selects the motion vector predictor based on the index value into the candidate list of motion vector predictors, and adds or subtracts the signaled residual between the motion vector predictor identified by the index value and the actual motion vector of the current block to determine the motion vector for the current block.

In some examples, in AMVP mode, video encoder 20 also signals the reference index into RefPicList0 or RefPicList1 that identifies the reference picture that video decoder 30 is to use for inter-predicting the current block. In other words, unlike merge mode, in AMVP mode, video decoder 30 does not inherit the reference index, but rather receives the reference index.

Figure 4:
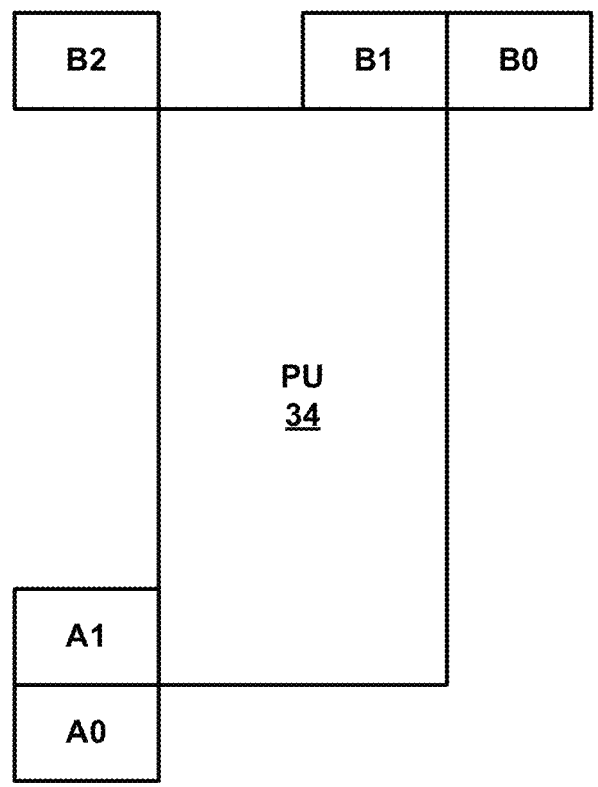
FIG. 4 is conceptual diagram illustrating spatially neighboring blocks whose motion vectors may be candidate motion vector predictors.

FIG. 4 is conceptual diagram illustrating spatially neighboring blocks whose motion vectors may be candidate motion vector predictors. In FIG. 4, the current block to be inter-predicted is prediction unit (PU) 34. FIG. 4 illustrates blocks A0, A1, B0, B1, and B2 that spatially neighbor PU 34 (i.e., blocks within the same picture as PU 34). In some examples, video decoder 30 determines the motion vectors for A0, A1, B0, B1, and B2 and includes one or more of these motion vectors after possible scaling, if available, as candidate motion vector predictors in the list of candidate motion vector predictors for PU 34.

Blocks A0, A1, B0, B1, and B2 are examples of spatially neighboring blocks to PU 34, and should not be considered as the only examples of spatially neighboring blocks to PU 34. For example, spatially neighboring blocks to PU 34 can be located at location other than blocks A0, A1, B0, B1, and B2. The location of blocks A0, A1, B0, B1, and B2 is defined as follows.

In FIG. 4, a luma location (xP, yP) specifies the top-left luma sample of PU 34 relative to the top-left sample of the current picture that includes PU 34. Accordingly, the top-left luma same of a current PU "N" relative to the top-left sample of the current picture is (xN, yN). Variables nPSW and nPSH denote the width and height of PU 34 for luma. In this example, (xN, yN), with N being replaced by A0, A1, B0, B1, or B2) is defined as (xP−1, yP+nPSH), (xP−1, yP+nPSH−1), (xP+nPSW, yP−1), (xP+nPSW−1, yP−1) or (xP−1, yP−1), respectively. In this manner, video decoder 30 determines the location of the spatially neighboring blocks.

It is the motion vectors after possible scaling of one or more of these blocks that video decoder 30 includes in the candidate list of motion vector predictors for determining the motion vector of PU 34.

The following describes the manner in which video decoder 30 determines the motion vector for temporally neighboring blocks. As described above, in some examples, temporally neighboring blocks reside in a picture in the same view as the picture that includes the current block to be inter-predicted. However, the temporally neighboring blocks need not necessarily reside in a picture in the same view as the picture that includes the current block to be inter-predicted. In some examples, the temporally neighboring blocks may reside in a picture in a view different than the view of the picture that includes the current block to be inter-predicted. For example, the picture that includes the temporally neighboring blocks may be identified by the collocated_ref_idx index value into one of the reference picture lists for the picture that includes current block to be inter-predicted. The collocated_ref_idx index value may identify a picture in the same view as the picture that includes the block to be inter-predicted, or a picture in a different view as the picture that includes the block to be inter-predicted. In either of these examples, the picture identified by the collocated_ref_idx index value may include the "temporally neighboring blocks," as the phrase is used in this disclosure. The motion vector for the temporally neighboring blocks that are candidate motion vector predictors are referred to as temporal motion vector predictors (TMVPs).

To determine a motion vector for a temporally neighboring block, video decoder 30 may determine which picture includes the temporally neighboring block. The picture that includes the temporally neighboring block is referred to as a co-located picture. If the block to be inter-predicted (e.g., the current block) is within a slice of the current picture, where the slice is a B-slice (e.g., predicted with respect to a reference picture in RefPicList0, RefPicList1, or with respect to two reference pictures where one is identified in RefPicList0 and the other is identified in RefPicList1), video encoder 20 signals a flag (e.g., collocated_from_l0_flag) that indicates whether the co-located picture is identified in RefPicList0 or RefPicList1. For example, if the flag value is 1, then video decoder 30 determines that the co-located picture is identified in RefPicList0, and if the flag value is 0, then video decoder 30 determine that the co-located picture is identified in RefPicList1.

In some examples, for a B-slice, video decoder 30 constructs a combined reference picture list (RefPicListC) from the constructed RefPicList0 and RefPicList1. Video decoder 30 modifies RefPicListC if video coder signals a reference picture list modification syntax. In examples where video decoder 30 constructs RefPicListC, video encoder 20 may not signal the collocated_from_l0_flag. In these examples, video decoder 30 determines that the co-located picture is identified in RefPicListC.

If the block to be inter-predicted is within a slice of the current picture, where the slice is a P-slice (e.g., predicted with respect to a reference picture in RefPicList0), video encoder 20 may not signal a flag. In this case, video decoder 30 determines that the co-located picture is located in RefPicList0 because the current block (i.e., block to be inter-predicted) is within a P-slice.

Video decoder 30 may also receive an index into the determined reference picture list. For example, video encoder 20 signals the collocated_ref_idx syntax in the slice header of the slice that includes the current block to inter-predicted. As described above, the collocated_ref_idx syntax provides an index value into the determined reference picture list. Video decoder 30 determines the co-located picture that includes the temporally neighboring blocks based on the index value into the reference picture list.

Video decoder 30 then identifies a co-located block in the determined co-located picture. For example, video decoder 30 identifies the location of the co-located block in the co-located picture based on the location of the current block in its picture. For example, assume that the current block is a prediction unit (PU). In this case, video decoder 30 determines the location of the coding unit (CU) in the co-located picture based on the location of the PU in its picture. This CU in the co-located picture is referred to as a co-located block.

In some examples, video decoder 30 determines the motion vector for the right-bottom PU within the co-located block. In some examples, video decoder 30 determines the motion vector for the PU covering the modified middle position of the co-located block. The modified middle position of the co-located block may refer to the block that extends from the center point of the co-located block towards the bottom right corner of the co-located block. In other words, the top-left corner of the block located at the modified middle position of the co-located block may be the center of the co-located block, and the bottom-right corner of the block located at the modified middle position of the co-located block may extend in the downward and rightward direction relative to the center of the co-located block. In some examples, video decoder 30 scales these identified motion vectors based on the POC value of the co-located picture and the picture that includes the current block.

The HEVC standard further defines which pictures can be co-located pictures. In other words, the HEVC standard further defines which pictures video decoder 30 can be utilized to determine candidate motion vector predictors from temporally neighboring blocks. For example, video encoder 20 signals the enable_temporal_mvp_flag in a picture parameter set (PPS). When a temporal identification value (temporal_id) of the picture that includes the current block is 0, and the syntax elements for the picture refer to the PPS, where the enable_temporal_mvp_flag is 0, video decoder 30 may set all reference pictures stored in a decoded picture buffer (DPB) of video decoder 30 as "unused for temporal motion vector prediction." In this case, video decoder 30 may not utilize any picture that is earlier in decoding order then the picture that includes the current block as a co-located picture for the picture that includes the current block and for pictures that follow the picture that includes the current block in decoding order.

Figure 5:
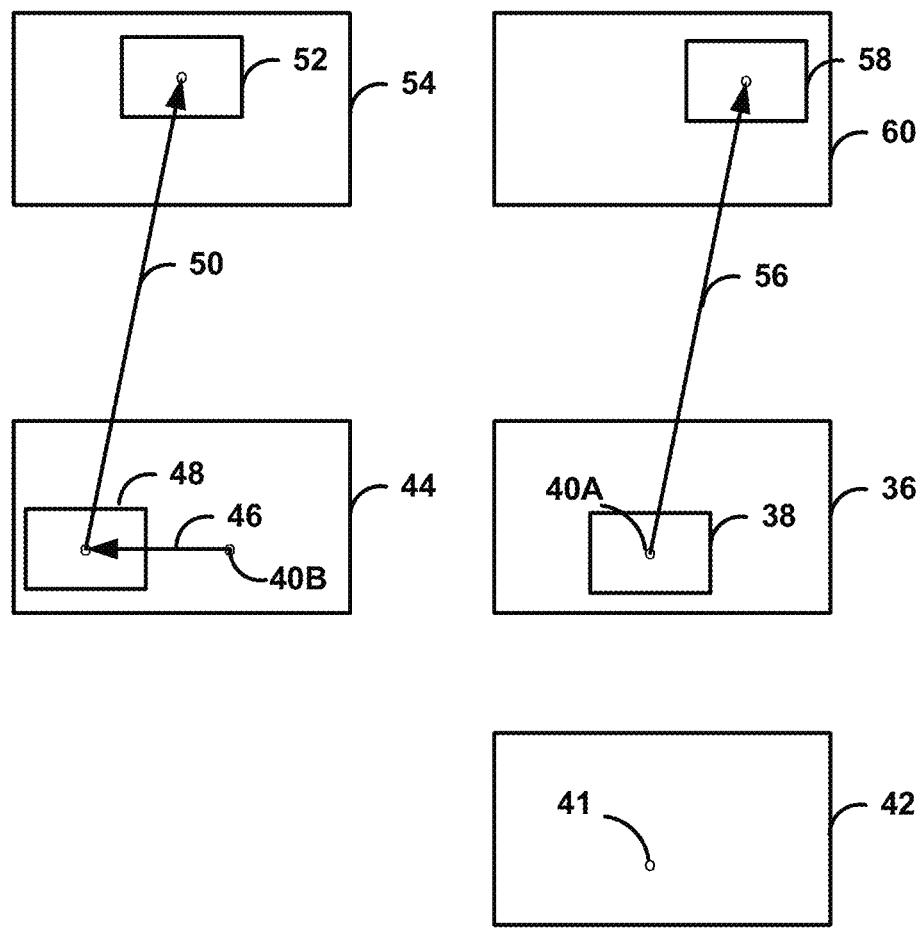
FIG. 5 is a conceptual diagram illustrating a manner in which to determine a candidate motion vector predictor based on a disparity vector.

FIG. 5 is a conceptual diagram illustrating a manner in which to determine a candidate motion vector predictor based on a disparity vector. The example described in FIG. 5 is not necessarily in accordance with the techniques described in this disclosure, where in the techniques described in this disclosure video decoder 30 may not need to derive a depth map to determine a disparity vector. FIG. 5 illustrates current picture 36 of a current view. Current picture 36 includes current block 38, which is the block that is to be inter-predicted. To determine a candidate motion vector predictor for current block 38, in the example of FIG. 5, video decoder 30 determines a disparity vector for current block 38.

To determine the disparity vector for block 38, video decoder 30 determines location 40A of current block 38 in current picture 36. Video decoder 30 determines depth value 41 in depth map 42. For example, video decoder 30 may have had to derive depth map 42 of current picture 36, and depth value 41 indicates the relative depth of the pixel located at location 40A in current block 38.

In this example of FIG. 5, video decoder 30 determines disparity vector 46. For example, video decoder 30 may determine by how much current block 38 should be horizontally displaced so that the viewer perceives the video content of block 38 at a depth defined by depth value 41. Disparity vector 46 may indicate the determined amount of horizontal displacement, and may therefore be determined based on depth value 41. Disparity vector 46 is an example of a smooth temporal view predicted (STV) disparity vector.

As illustrated, disparity vector 46 refers to reference sample block 48 of current picture 44 in the reference view. Reference sample block 48 may include similar video content as the video content of current block 38, the location of reference sample block 48 is horizontally displaced in current picture 44 in the reference view relative to the location of current block 38 in current picture 36 in the current view. Motion vector 50 of reference block 48 refers to reference block 52 of reference picture 54 of the reference view.

Motion vector 50 is an example of a motion vector predictor for the motion vector of current block 38. For example, video decoder 30 includes motion vector 50 in the candidate list of motion vector predictors for current block 38.

In some examples, video decoder 30 also includes disparity vector 46 as a candidate motion vector predictor for current block 38. For example, FIG. 5 illustrates that reference block 48 is inter-predicted. However, for purposes of illustration, assume that reference block 48 is intra-predicted, and not inter-predicted. In this case, there is no motion vector for reference block 48 that video decoder 30 can use as a motion vector predictor. Accordingly, in this example, video decoder 30 includes disparity vector 46 as a motion vector predictor in the candidate list of motion vector predictors.

There may be certain requirements that motion vector 50 needs to satisfy to be included as a candidate motion vector predictor. As one example, video decoder 30 determines that motion vector 50 is included in the candidate list of motion vector predictors only if the time instance of the picture to which motion vector 50 refers (i.e., picture 54 in the reference view) is the same as the time instance of one reference picture of current block 38, such as picture 60 (i.e., picture 54 and picture 60 belong to the same access unit).

In the example illustrated in FIG. 5, video decoder 30 implements the merge mode. For example, video encoder 20 signals an index into the candidate list of motion vector predictors that video decoder 30 constructed. In FIG. 5, assume that index into the candidate list of motion vector predictors identifies motion vector 50. In this case, for merge mode, video decoder 30 selects motion vector 50, and sets motion vector 50 as the motion vector for block 38 (i.e., motion vector 56).

Also, in this example, video decoder 30 may have inherited the reference index into a reference picture list that identified reference picture 54 in the reference view. In this example, the inherited reference index into the reference picture list that video decoder 30 constructs for picture 36 of the current view may identify reference picture 60 in the current view. Reference picture 60 in the current view includes reference block 58. Video decoder 30 utilizes reference block 58 to inter-predict current block 38.

The AMVP mode and merge mode techniques described with respect to FIG. 5 can be summarized as follows. For example, AMVP mode and merge mode both allow for an inter-view motion vector predictor to be included in the candidate list of motion vector predictors. Video decoder 30 determines a depth estimate of the middle sample of the current block, and determines a disparity vector and a reference block in a reference view based on the determined depth estimate.

In AMVP mode, if the reference index into one or both of RefPicList0 and RefPicList1 for the current block refers to an inter-view reference picture, video decoder 30 sets the inter-view motion vector predictor equal to the determined disparity vector. Also, if the reference index into one or more both of RefPicList0 and RefPicList1 for the block referred to by the disparity vector refers to a temporal reference picture (i.e., a picture in the same view as the picture that includes the block referred to by the disparity vector), and if the time instance of the temporal reference picture is the same as the time instance of the reference picture that video decoder 30 is to use for inter-prediction, then video decoder 30 utilizes the motion vector for the reference block as a motion vector predictor. In all other cases, video decoder 30 may not utilize a motion vector from a different view.

In merge mode (or skip mode), video decoder 30 utilizes the first two indices in the reference picture list constructed for picture 36. For reference index 0, video decoder 30 determines the candidate motion vector predictor in the same manner as described above with respect to the AMVP mode (i.e., the picture identified in reference index 0 is reference picture 44). If video decoder 30 determines a candidate motion vector predictor for the picture identified in reference index 0, video decoder 30 includes motion vector 50 as a candidate motion vector and inherits the reference index of motion vector 50 (i.e., the reference index that identifies picture 54).

If video decoder 30 does not determine a candidate motion vector predictor with the picture identified with reference index 0, video decoder 30 repeats the above steps, in merge mode, for the picture identified with reference index 1. If video decoder 30 does not determine a candidate motion vector predictor with the picture identified with reference index 1, video decoder 30 does not include a motion vector for a block from the reference view in the candidate list of motion vector predictors.

In some examples, video decoder 30 starts with the picture identified by reference index 1, and then proceeds to the picture identified by reference index 0. This may result in video decoder 30 implementing temporal prediction more than inter-view motion prediction.

In the example described in FIG. 5, video decoder 30 first needed to derive depth map 42 to determine disparity vector 46. There are various ways in which video decoder 30 derives depth map 42. As one example, video decoder 30 uses the temporal motion vectors of a picture in a base view, and a depth map that in the base view that corresponds to the picture in the base view to determine/update a depth map for a picture in a dependent view. As another example, video decoder 30 uses temporal motion vectors for pictures in the dependent view and in the base view, and disparity motion vectors for pictures in the dependent view to determine/update a depth map for the pictures in the dependent view. There may be other ways in which to derive the depth map.

As one example, at the beginning of the coding process, video decoder 30 may decode a first picture in a base view. The base view may include pictures that are not predicted from pictures in another view. For example, referring to FIG. 3, the base view may be view S0 since pictures in view S0 are not inter-predicted with pictures in any of views S1-S7. The first picture in view S0 is an intra-predicted picture (i.e., an I-picture represented with the I in view S0 at time T0). Also, a first picture in one of the non-base views (e.g., dependent views) may be inter-view motion predicted or intra-predicted. A non-base view (referred to as a dependent view) may include pictures that are inter-predicted with respect to pictures in another view (e.g., with disparity motion vectors). At this stage of the coding process, no depth map is available.

After the decoding of the first picture in the non-base view, the disparity motion vectors are available (i.e., the disparity motion vectors used to inter-predict blocks in the first picture of the non-base view). These disparity motion vectors can be converted to depth values to generate a depth map. The depth map can be used to map to base view or used to update the depth maps of the following pictures in the non-base view. From the depth map, video decoder 30 may be able to determine the disparity vectors for the blocks.

In general, such a technique for deriving the depth map may be complex and requires video decoder 30 to consume processing power and time to derive the depth map. In the examples described in this disclosure, video decoder 30 may not first derive the depth map to determine the disparity vector for the current block. Instead, video decoder 30 may determine the disparity vector from disparity motion vectors of spatially and/or temporally neighboring blocks, which may be a less complex task than determining the disparity vector from the derived depth map.

In some other techniques, rather than determining the disparity vector from the depth map, video encoder 20 and video decoder 30 may encode or decode the GDV. Because the GDV provides the same disparity vector for all pixels, the GDV does not provide an accurate measure for the actual disparity vector, and therefore, the motion vector predictor determined from the GDV is not as good as a motion vector predictor that is determined from the actual disparity vector of the block. Accordingly, there may be deficiencies in determining disparity vectors from depth maps, and from using a GDV as a substitute for the actual disparity vectors.

In some examples, the determined disparity vector, in accordance with the techniques described in this disclosure, may not be identical to the actual disparity vector of the current block. As one example, the actual disparity vector of the current block may include an x-component, and no y-component, or a zero for the y-component, because the actual disparity vector refers to a corresponding block that is only horizontally displaced relative to the current block. The determined disparity vector, in some examples, includes both an x-component and a y-component because the disparity motion vector used to determine the disparity vector may include both an x-component and a y-component. The determined disparity vector for a block may be referred to as a disparity vector for inter-view motion prediction (DVIVMP) because it is a constructed disparity vector that is used for inter-view motion prediction.

To determine a disparity vector for the current block, video decoder 30 constructs a candidate list of disparity vectors. This candidate list of disparity vectors should not be confused with the candidate list of motion vector predictors. The candidate list of disparity vectors identifies vectors that can potentially be used to determine the disparity vector of the current block. The candidate list of motion vector predictors identifies vectors that can potentially be used to determine a motion vector of the current block.

Also, a disparity vector and a disparity motion vector should not be confused. A disparity motion vector of a block in a first view is a motion vector that refers to a block in a second view, where the block in the second view is a reference block that is used to inter-predict the block in the first view. A disparity vector is a vector that refers to a block in a different view than the block being predicted, and indicates a displacement of the block being predicted relative to the picture that includes the block referred to by the disparity vector. The block referred to by the disparity vector need not necessarily be used to inter-predict the current block, but may be used to determine motion vector predictors for the current block. In some examples, the block referred to by the modified disparity vector (by setting the y-component of the determined disparity vector to 0) is used to inter-predict the current block. In these examples, the modified disparity vector is considered as an example of a disparity motion vector.

In other words, not all disparity vectors are disparity motion vectors, and when blocks referred by the disparity vectors are used to inter-predict the current block, those disparity vectors can be converted to disparity motion vectors. Disparity motion vectors refer to blocks that are used as reference blocks for inter-prediction and do not necessarily indicate displacement of the current block.

For example, video encoder 20 performs a search in a picture in a view different than the view of the current block, and finds a block in the picture of the different view that best matches the current block. Video encoder 20 and video decoder 30 then utilize this "best match" block for inter-predicting the current block by identifying the location of the "best match" block with the disparity motion vector.

The disparity vector does not necessarily refer to a "best match" block. Rather, the disparity vector refers to a block whose motion vector can be used as a motion vector predictor. If, however, the block to which the disparity vector refers is not inter-predicted (e.g., there is no motion vector for the block to which the disparity vector refers), the disparity vector may be a candidate motion vector predictor. In some examples, even if the block to which the disparity vector refers is inter-predicted, the disparity vector after modification may be an additional candidate motion vector predictor.

It should be understood that the above examples of how the disparity vector is used (e.g., for determining motion vector predictors) are provided only for purposes of illustration and should not be considered limiting. In other words, the above examples describe some ways in which the determined disparity vector can be used, but the techniques described in this disclosure should not be considered so limiting. In general, the techniques described in this disclosure provide example ways in which to determine the disparity vector, such as techniques for determining the disparity vector without necessarily needing to derive the depth map, as one example.

To construct the candidate list of disparity vectors, video decoder 30 determines whether spatially neighboring blocks and/or temporally neighboring blocks have been inter-view motion predicted with a disparity motion vector. Video decoder 30 may include one or more of the disparity motion vectors for the neighboring blocks that have been inter-view motion predicted in the candidate list of disparity vectors or those have used implicit disparity vectors. Implicit disparity vectors are described in more detail below. Furthermore, in some examples, the STV or GDV may also be used to construct the candidate list of disparity vectors. Video decoder 30 may utilize any one of a plurality of different techniques to select one from the list of candidate disparity vectors, and set the selected candidate disparity vector as the disparity vector for the current block.

In the above example, video decoder 30 evaluated the motion vector information of the spatially neighboring and temporally neighboring blocks on a block-by-block basis to construct the candidate list of disparity vectors. However, evaluating the motion vector information of the spatially neighboring and temporally neighboring blocks on a block-by-block basis may be inefficient given the manner in which video decoder 30 stores the motion vector information of the spatially and temporally neighboring blocks. As described in more detail, in some examples, video decoder 30 accounts for the manner in which the motion vector information of the spatially neighboring and temporally neighboring blocks are stored to so that video decoder 30 evaluates the motion vector information on a region-by-region basis, where a region includes a plurality of neighboring blocks and may be larger in size than the current block. However, if video decoder 30 stores the motion vector information of the spatially or temporally neighboring blocks in a block-by-block basis, the region may include one block. In other words, in this disclosure, the region may include one or more blocks.

Based on the evaluation on the region-by-region basis of disparity motion vectors, video decoder 30 constructs a list of candidate disparity vectors, selects one of the candidate disparity vectors, and determines the disparity vector for the current block based on the selected candidate disparity vector. Video decoder 30 implements the merge mode or the AMVP mode utilizing the block referred to by the determined disparity vector. In some examples, video decoder 30 may also implement the inter-view residual prediction using the block referred to by the determined disparity vector. In some examples, video decoder 30 may implement other coding tools utilizing the block referred to by the determined disparity vector. As one example, video decoder 30 may inter-predict decode a block by using the disparity motion vector of the neighboring region (e.g., the region that includes one or more spatially or temporally neighboring blocks) as the disparity vector for the block. For instance, video decoder 30 may implement the merge mode or the AMVP mode using the disparity motion vector of the neighboring region as the disparity vector of the block.

In the techniques described in the disclosure, the disparity motion vectors for the regions include both an x-component and a y-component. Accordingly, in some examples, the determined disparity vector includes both an x-component and a y-component. In some examples, video decoder 30 also includes the determined disparity vector as a candidate motion vector predictor for the current block in the candidate list of motion vector predictors.

Video decoder 30 may modify the determined disparity vector before including the determined disparity vector in the candidate list of motion vector predictors. For example, video decoder 30 sets the y-component of the determined disparity vector equal to 0 for modifying the determined disparity vector, and includes the modified disparity vector in the candidate list of motion vector predictors. In some instances, the modified disparity vector is a better predictor for the motion vector of the current block than the determined disparity vector. In some examples, the y-component of the determined disparity vector, which may be unequal to 0, is kept unchanged and used for inter-view motion prediction and/or inter-view residual prediction.

Furthermore, in some techniques described in this disclosure, by determining a disparity vector from spatially and temporally neighboring blocks, certain types of pictures can be coded with inter-view motion prediction and/or inter-view residual prediction or other coding tools using a disparity vector. For instance, in some other techniques (i.e., techniques that are not in accordance with the techniques described in this disclosure), a dependent view includes random access point (RAP) pictures, such as instantaneous decoder refresh (IDR) pictures and clean random access (CRA) pictures. In these other techniques, the depth map for the RAP pictures is not available until the RAP pictures are fully decoded. Accordingly, in these other techniques, the RAP pictures could not be inter-view predicted using the merge mode or AMVP mode because the depth map was not available to determine the disparity vector.

However, in the techniques described in this disclosure, video decoder 30 may be configured to determine the disparity vector without needing to derive the depth map. Accordingly, in some examples, video decoder 30 is able to be configured to implement the merge mode and AMVP mode for RAP pictures, where the candidate list of motion vector predictors includes motion vectors from blocks in views other than the view of the RAP pictures.

The following describes the example types of pictures. There are four picture types that can be identified by the network abstract layer (NAL) unit type in HEVC. Example of the types of pictures include, but are not limited to, instantaneous decoder refresh (IDR) picture, the clean random access (CRA) picture, the temporal layer access (TLA) picture, and the coded picture that is not an IDR, CRA or TLA picture.

The H.264/AVC specification defined the IDR picture, and the HEVC standard inherited the definition of the IDR picture from the H.264/AVC specification. The HEVC standard also defined the clean random access (CRA) picture, the broken link access (BLA) picture, and the temporal layer access (TLA) picture. These picture types are new in HEVC and not available in the H.264/AVC specification.

The CRA picture is a picture type that facilitates decoding beginning from any random access point in the middle of a video sequence and may be more efficient than using IDR pictures for random access. In HEVC, the bitstream starting from these CRA pictures are also conforming bitstreams. The TLA picture is a picture type that can be used to indicate valid temporal layer switching points. The following describes the CRA and TLA pictures in further detail.

In video applications, such as broadcasting and streaming, viewers may desire to switch between different channels or to jump to specific parts within the video with minimal delay. To allow for such switching or jumping, video encoder 20 may include random access pictures at regular intervals in the video bitstream. A random access picture is a picture from which decoding can start. For example, when the user switches channels or jumps to a specific part within the video, the video switches at a random access picture or jumps to a random access picture.

The IDR picture, specified in both H.264/AVC and HEVC can be used for random access. However, since an IDR picture starts a coded video sequence and always cleans the decoded picture buffer (DPB) of video decoder 30, pictures following the IDR in decoding order cannot use pictures decoded prior to the IDR picture as reference. For example, the DPB stored decoded pictures that video decoder 30 uses as reference pictures for purposes of inter-prediction (e.g., inter-prediction decoding). If video decoder 30 clears the DPB, as what happens when video decoder 30 starts decoding at an IDR picture, then there may not be any picture in the DPB that pictures following the IDR picture, in decoding order (referred to as leading pictures), can use as reference pictures.

Consequently, bitstreams relying on IDR pictures for random access can have significantly lower coding efficiency (e.g., 6%). To improve the coding efficiency, the CRA pictures in HEVC allow pictures that follow the CRA picture in decoding order, but precede the CRA picture in output order to use pictures decoded before the CRA picture as reference.

Figure 6:
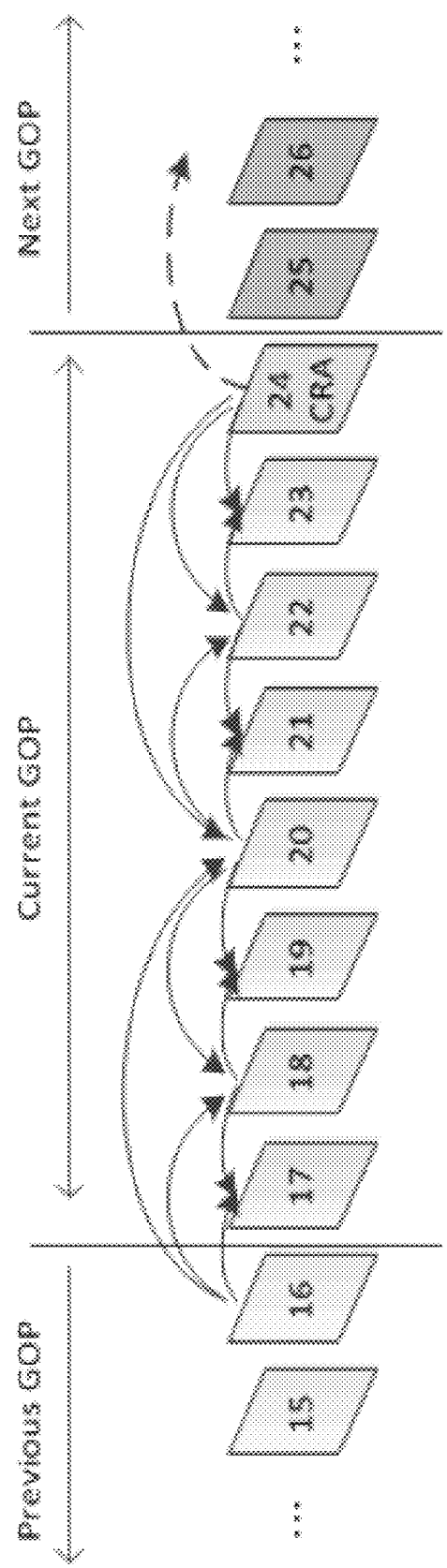
FIG. 6 is a conceptual diagram illustrating an example of a clean random access (CRA) picture.

FIG. 6 is a conceptual diagram illustrating an example of a clean random access (CRA) picture. For instance, FIG. 6 illustrates pictures identified by their display order. The display order is identified by picture order count (POC) values. For example, in FIG. 6, the picture with POC value 24 is the CRA picture, and belongs to a Group of Pictures (GOP). The GOP also includes pictures with POC values 17-23. Pictures with POC values 17-23 follow the CRA picture (i.e., the picture with POC value 24) in decoding order (i.e., pictures with POC values 17-23 are inter-predicted by the CRA picture with POC value 24 or inter-predicted by pictures that were inter-predicted by the CRA picture with POC value 24). However, the pictures with POC values 17-23 precede the CRA picture with POC value 24 in output order (i.e., the pictures with POC values 17-23 are displayed earlier than the CRA picture with POC value 24).

In this example, pictures with POC values 17-23 are referred to as leading pictures of the CRA with POC value 24, and can be correctly decoded if video decoder 30 starts decoding from an IDR or a CRA picture before the current CRA picture (i.e. the picture with POC value 24). However, video decoder 30 may not be able to properly decode pictures with POC values 17-23 if video decoder 30 starts decoding from the CRA picture with POC value 24. In these cases, video decoder 30 discards the leading pictures (i.e., pictures with POC values 17-23) during the random access decoding.

Furthermore, to prevent error propagation from reference pictures that may not be available depending on where video decoder 30 starts decoding, all pictures in the next GOP that follow the CRA picture with POC value 24 in both decoding order and output order do not use any picture that precedes the CRA picture with POC value 24 either in decoding order or output order as reference. For example, as described above, if video decoder 30 starts decoding from the CRA picture with POC value 24, video decoder 30 discard pictures with POC values 17-23. In this case, because pictures with POC values 17-23 are not available, the pictures that follow the CRA picture with POC value 24 in both decoding and output order do not use any of the pictures with POC values 17-23 as a reference picture.

Similar random access functionalities are supported in H.264/AVC with the recovery point supplemental enhancement information (SEI) message. Not all video decoders that conform to the H.264/AVC standard support the recovery point SEI message.

In HEVC, a bitstream starting with a CRA picture is considered as a conforming bitstream. As described above, when a bitstream starts with a CRA picture, the leading pictures of the CRA picture may refer to unavailable reference pictures and hence cannot be correctly decoded. However, also as described above, HEVC specifies that the leading pictures of the starting CRA picture are not output, hence the name "clean random access."

For establishment of bitstream conformance requirement, HEVC specifies a decoding process to generate unavailable reference pictures for decoding of the non-output leading pictures. However, video decoder 30 does not necessarily have to follow that decoding process, as long as video decoder 30 can generate identical output compared to when the decoding process is performed from the beginning of the bitstream. Moreover, in HEVC, a conforming bitstream may contain no IDR pictures at all, and consequently may contain a subset of a coded video sequence or an incomplete coded video sequence.

As described above, in some examples, video decoder 30 evaluates motion vectors of spatially and temporally neighboring blocks to determine the disparity vector for the current block. The following examples illustrate example manners in which video decoder 30 determines the disparity vector for the current block from motion vectors of spatially and temporally neighboring blocks. The following examples should not be considered limiting, and the techniques are extendable to other possible techniques for determining the disparity vector for the current block.

Given a target reference view, to enable the inter-view motion prediction from the target reference view, video decoder 30 may utilize spatial disparity vectors, temporal disparity vectors, and/or implicit disparity vectors to produce a disparity vector for inter-view motion prediction (DVIVMP) and/or inter-view residual prediction. Spatial disparity vectors, temporal disparity vectors, and implicit disparity vectors are all described in more detail below. In some examples, the disparity vector is not restricted by the given target reference view, which means that a disparity vector corresponds to a picture in any dependent view that is considered as available and can be directly used as the determined disparity vector. In some examples, this disparity vector is used to predict or infer the motion parameters (i.e., motion vector predictors) of a block in a current view based on already coded motion parameters in the target reference view of the same access unit. According to techniques of this disclosure, video decoder 30 may construct a list of candidate disparity vectors based on determined implicit disparity vectors (IDV), spatial disparity vectors (SDV), and temporal disparity vectors (TDV). One or more of the determined candidate disparity vectors may, for example, be included in a candidate list for merge or AMVP.

Figure 7:
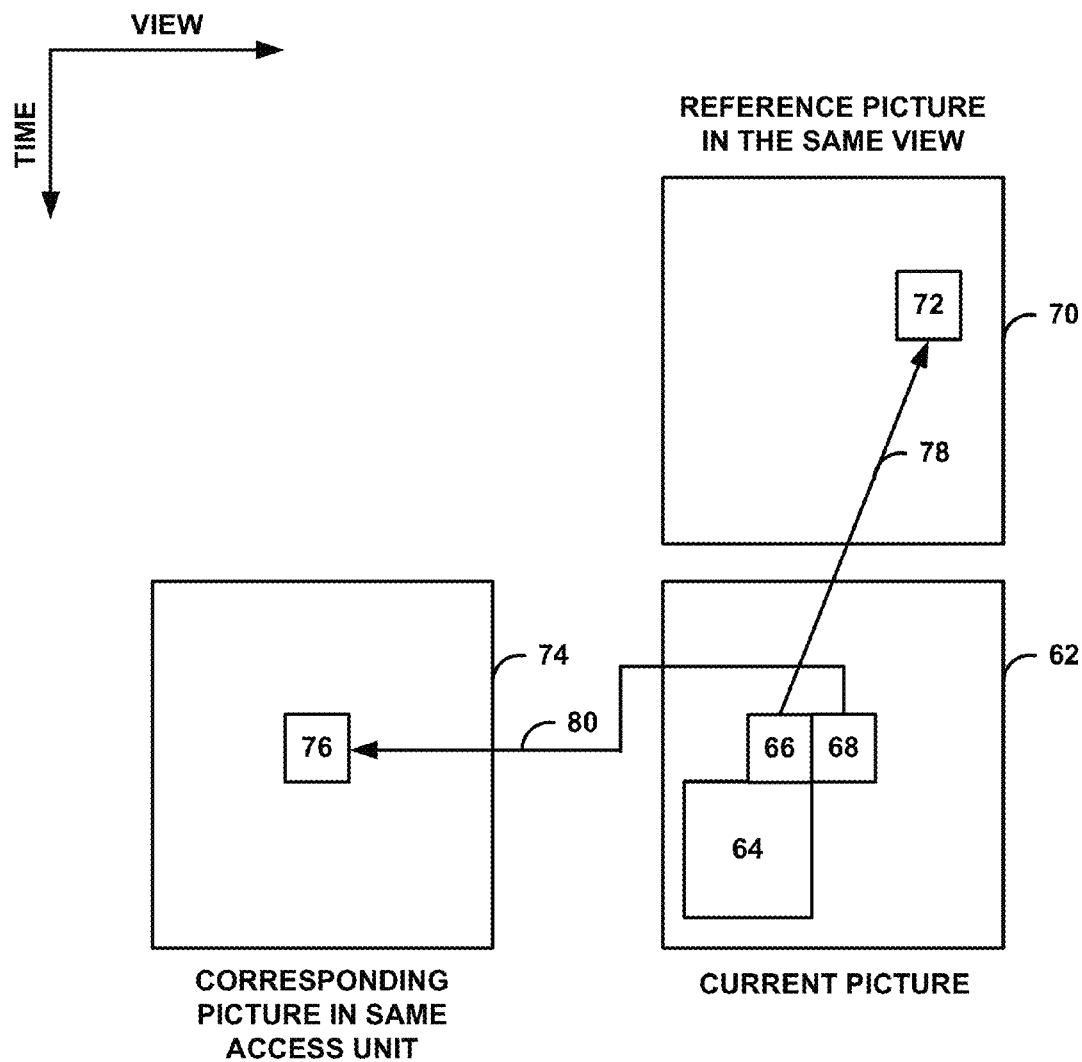
FIG. 7 is a conceptual diagram illustrating one example of determining a candidate disparity vector.

FIG. 7 is a conceptual diagram illustrating one example of determining a candidate disparity vector. In FIG. 7, picture 62 is in a first view, and includes block 64 that is to be inter-predicted using the merge mode or AMVP mode. To determine the disparity vector for block 64, video decoder 30 determines the motion vectors for spatially neighboring blocks. Video decoder 30 may evaluate the spatially neighboring blocks in any order. For each spatially neighboring block, video decoder 30 determines whether the spatially neighboring block is predicted with a forward prediction vector that identifies a reference picture in RefPicList0 or a backward prediction vector that identifies a reference picture in RefPicList1. If a combined reference picture list (i.e., RefPicListC) is used, video decoder 30 determines whether a motion vector for a spatially neighboring block identifies a picture in the RefPicListC. If any of these are spatially neighboring blocks is inter-predicted with a disparity motion vector, video decoder 30 includes the disparity motion vector in the list of candidate disparity vectors for block 64.

For example, FIG. 7 illustrates spatially neighboring block 66 and spatially neighboring block 68 that are each spatially neighboring to block 64 (e.g., neighboring block 66/68 belong to the same picture as block 64, which is picture 62). In this example, block 66 and block 68 are each 4×4 blocks. In FIG. 7, block 66 is inter-predicted with block 72 of picture 70, as illustrated by temporal motion vector 78 referring to block 72 of picture 70. Picture 70 is in the same view as picture 62, but at a different temporal instance.

Block 68 is inter-view predicted with respect to block 76 of picture 74. For example, motion vector 80 for block 68 is a disparity motion vector that refers to block 76 of picture 74. Pictures 62 and 74 are in different views in the same temporal instance. Motion vector 80 is a disparity motion vector because picture 74 is located a second view that is different than the first view in which picture 62 is located. Moreover, the time instance of picture 62 and picture 74 is the same. Therefore, picture 62 and picture 74 belong to the same access unit.

In this example, video decoder 30 evaluates motion vector 78 of block 66 and motion vector 80 of block 68, and determines that motion vector 80 is a disparity motion vector. Video decoder 30 then includes disparity motion vector 80 in the candidate list of disparity vectors. Disparity motion vector 80 may be referred to as a spatial disparity vector (SDV).

However, because of the manner in which video decoder 30 stores the motion vector information of block 66 and block 68, it may not be necessary for video decoder 30 to evaluate the motion vector information of both block 66 and block 68. For example, after video decoder 30 inter-predicts block 66 and block 68, video decoder 30 stores the motion vector information for block 66 and block 68 in a line buffer of video decoder 30. In some examples, prior to storing the motion vector information in the line buffer, video decoder 30 compresses the motion vector information for block 66 and block 68 such that video decoder 30 stores the motion vector information for one of block 66 and block 68, or derives motion vector information for both blocks 66 and 68 from the motion vector information for blocks 66 and 68. The compression of the motion vector information is further illustrated in FIG. 8. Compression of the motion vector information is not required in every example.

Figure 8:
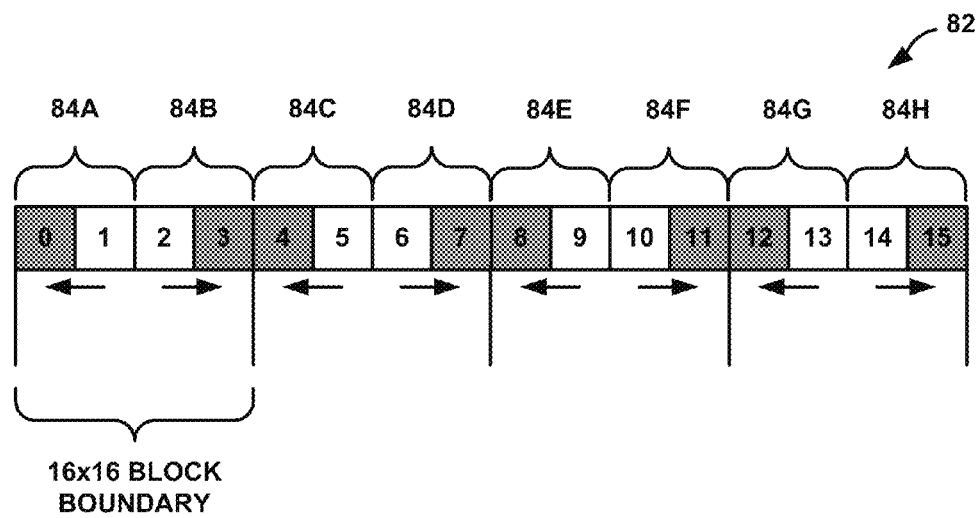
FIG. 8 is a conceptual diagram illustrating a manner in which motion vector information is stored in accordance with one or more examples described in this disclosure.

FIG. 8 is a conceptual diagram illustrating a manner in which motion vector information is stored in accordance with one or more examples described in this disclosure. FIG. 8 illustrates line buffer 82. Line buffer 82 stores motion vector for blocks that spatially located above the current block that is to be predicted. Blocks 0-15 in FIG. 8 are each 4×4 blocks.

The motion vector information includes the inter-prediction direction, reference picture index, and motion vector (MV). In some examples, video decoder 30 does not store the motion vector information for each one of blocks 0-15 in line buffer 82. Rather, video decoder 30 stores the motion vector information for two of every four blocks within line buffer 82. This results in 2:1 motion vector information compression for one line, and results in fewer information that needs to be stored in line buffer 82.

For example, the motion vector information for each one of blocks 0-3 may be different. In this example, although the motion vector information for block 0 and block 1 is different, when storing, the block 0 and block 1 share the same motion vector information, and video decoder 30 stores one set of motion vector information for both of blocks 0 and 1 in line buffer 82. In FIG. 8, the video decoder 30 stores the motion vector information for block 0 as the motion vector information for both block 0 and block 1. In this case, the motion vector information for block 1 may be lost, and the motion vector information for block 0 is preserved.

Similarly, in this example, although the motion vectors for blocks 2 and 3 are different, when storing, blocks 2 and 3 share the same motion vector information, and video decoder 30 may store one set of motion vector information for both of block 2 and block 3 in the line buffer. In some examples, video decoder 30 stores the motion vector information for block 3 as the motion vector for the both blocks 2 and 3. In this case, the motion vector information for block 2 is lost, and the motion vector information for block 3 is preserved.

In other words, for motion vector information compression for line buffer reduction, video decoder 30 does not store the motion vector information for both block 0 and block 1 in line buffer 82. Rather, video decoder 30 stores the motion vector information of block 1 in line buffer 82, and the motion vector information of block 0 may be lost. Similarly, video decoder 30 stores the motion vector information of block 3 in line buffer 82, and the motion vector information of block 2 may be lost.

In FIG. 8, the darkened blocks indicate the blocks whose motion vector information is stored. The arrows indicate the block whose motion vector information is now represented by the stored motion vector information. As illustrated, because the motion vector information for half of the blocks is lost and represented by motion vector information for the other half of the blocks, only half the memory is required in line buffer 82 as compared to the case where the motion vector information for all of the blocks is stored.

The techniques described with respect to FIG. 8 are one way for implementing motion vector information compression. There may be other ways for implementing motion vector information compression for line buffer reduction, and the techniques described in this disclosure are not limited to any specific way for implementing motion vector information compression for line buffer reduction.

In accordance with the techniques described in this disclosure, video decoder 30 may not need to determine the motion vector information for each one of blocks 0-15 because line buffer 82 stores motion information for a region of blocks and not for all blocks within the region. For example, regions 84A-84H each represents an 8×4 region of pixels. For example, region 84A represents a first 8×4 region, where the first 8×4 region includes blocks 0 and 1. In this example, the motion vector information of block 0 is considered as the motion vector information of region 84A. Region 84B represents a second 8×4 region, where the second 8×4 region includes blocks 2 and 3, and so forth. In this example, the motion vector information of block 3 is considered as the motion vector information of region 84B, and so forth.

Furthermore, although FIG. 8 illustrates 8×4 regions, aspects of this disclosure are not so limited. In other examples, the regions may be 4×8 regions, where line buffer 82 stores motion vector information for blocks that reside in vertical lines, rather than horizontal lines. Similarly, the 4×4 block size of spatially neighboring blocks is also provided for purposes of illustration and should not be considered limiting.

In the example of FIG. 8, video decoder 30 may determine which one of regions 84A-84H includes spatially neighboring blocks to the current block. Then, video decoder 30 determines the motion vector information for the region that includes the spatially neighboring blocks to current block, rather than determining the motion vector information for each one of the spatially neighboring blocks within the region. If the motion vector for the region is a disparity motion vector, video decoder 30 may include the disparity motion vector in the list of candidate disparity vectors for the current block. In this example, the motion vector for the region represents the single motion vector for the plurality of blocks within the region.

In some examples, there may be two motion vectors for the region that includes the spatially neighboring blocks, one that refers to RefPicList0 and one that refers to RefPicList1. In these examples, there is one single motion vector for all blocks within the region that includes the spatially neighboring blocks that refers to RefPicList0 and one single motion vector for all blocks within the region that includes the spatially neighboring blocks that refers to RefPicList1.

For example, referring back to FIG. 7, assume that block 66 of FIG. 7 corresponds to block 2 of FIG. 8, and block 68 corresponds to block 3 of FIG. 8. In this example, line buffer 82 stores the motion vector information for disparity motion vector 80 and the reference index that identifies picture 74, and does not store the motion vector information for temporal motion vector 78 and the reference index that identifies picture 70.

In this example, video decoder 30 need not determine the motion vector information for block 66 and the motion vector information for block 68. Instead, video decoder 30 may determine the motion vector information for region 84B, where region 84B includes block 66 and block 68. This allows video decoder 30 to perform fewer determinations of motion vector information, thereby promoting efficient video coding. In this case, the motion vector information of region 84B indicates that the motion vector is disparity motion vector 80. Because the motion vector for region 84 is a disparity motion vector, video decoder 30 includes disparity motion vector 80 as a candidate disparity vector for block 64 in the list of candidate disparity vectors for block 64. Disparity motion vector 80 may be referred to as a spatial disparity vector (SDV) because disparity motion vector 80 is a disparity vector for the spatially neighboring region 84. Also, if disparity motion vector 80 for the spatially neighboring blocks (e.g., the spatially neighboring region) is determined to be the disparity vector for block 64 (e.g., because it is selected from the list of candidate disparity vectors), then video decoder 30 may use disparity motion vector 80 as the disparity vector for block 64 for inter-predicting block 64. For example, video decoder 30 may implement the AMVP or the merge mode on block 64 using disparity motion vector 80 as the disparity vector of block 64.

In the example of FIGS. 7 and 8, video decoder 30 utilized spatially neighboring blocks to determine a candidate disparity vector for the current block. In some examples, instead of or in addition to utilizing spatially neighboring blocks, video decoder 30 utilizes temporally neighboring blocks to determine another candidate disparity vector for the current block.

Figure 9:
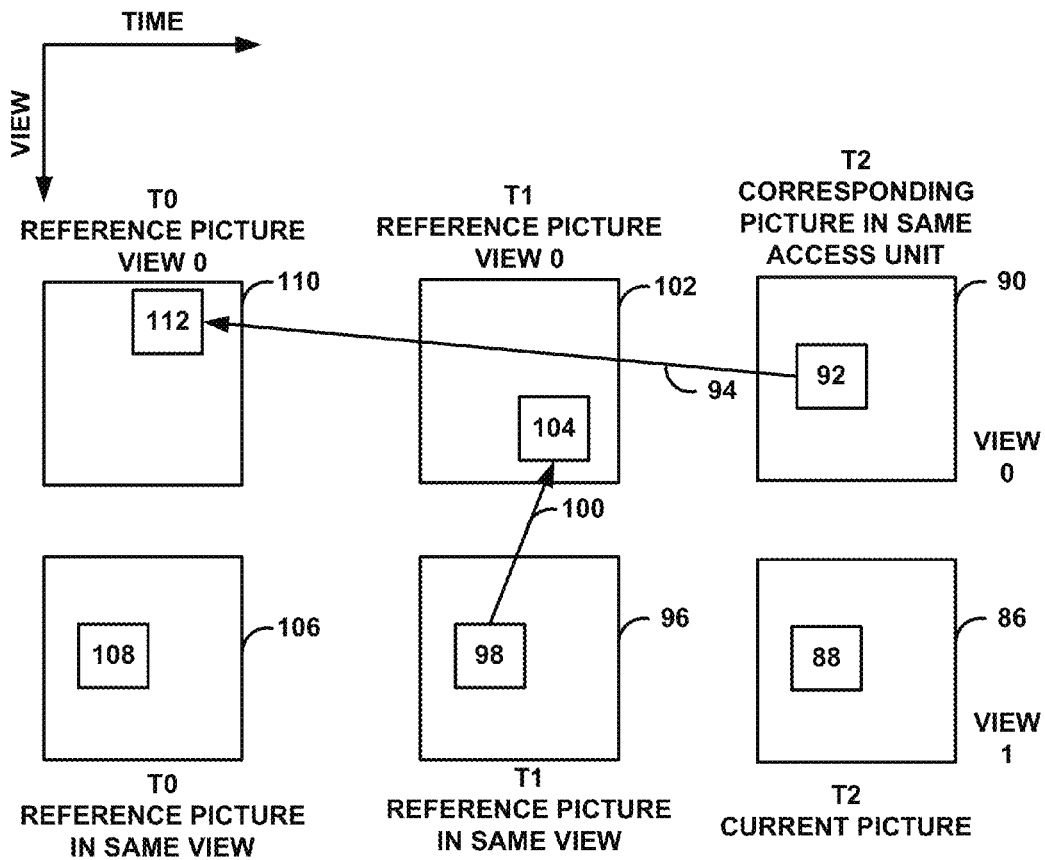
FIG. 9 is a conceptual diagram illustrating one example of determining a candidate disparity vector.

FIG. 9 is a conceptual diagram illustrating one example of determining a candidate disparity vector. FIG. 9 illustrates picture 86 in view 1 that includes block 88 that is to be inter-predicted. There are three possible reference pictures for picture 86: picture 96 and picture 106 because these pictures belong in the same view as picture 86, and picture 90 because picture 90 is in a different view (view 0), but in the same access unit as picture 86 (e.g., the time instance of picture 86 and picture 90 is the same).

In this example, video decoder 30 determines the motion vector information for the three co-located blocks in the reference pictures 90, 96, and 106 (i.e., block 92, block 98, and block 108). For instance, video decoder 30 determines whether the motion vector for any of co-located blocks 92, 98, and 108 is a disparity motion vector.

In FIG. 9, block 108 is intra-predicted, and therefore, is not predicted with a disparity motion vector. Block 92 is inter-predicted with motion vector 94. However, motion vector 94 is a temporal motion vector because motion vector 94 refers to block 112 in picture 110, and picture 110 is in the same view as picture 90 (i.e., view 0).

Block 98 of picture 96 is inter-predicted with respect to block 104 of picture 102, as illustrated by motion vector 100. In this example, picture 96 is in view 1 and picture 102 is in a different view (i.e., view 0). Therefore, motion vector 100 is a disparity motion vector. In this example, video decoder 30 includes disparity motion vector 100 as a candidate disparity vector in the list of candidate disparity vectors. Disparity motion vector 100 is referred to as a temporal disparity vector (TDV) because disparity motion vector 100 is the motion vector for a co-located block.

FIG. 9 illustrates some examples of co-located blocks that are co-located with block 88. There may be other examples of co-located blocks. For instance, one example of the co-located block to the current block is a block in a co-located picture that is located in the same region as the current block is located in its current picture. This region is referred to as a co-located region (CR). In other words, one example of a co-located block is a block in the CR of the co-located picture.

Another example of a co-located block is a largest coding unit (LCU) that covers the co-located region. For example, LCU may be larger in size than the current block, and may therefore encompass more area in the co-located picture as compared to the area encompassed by the current block in the current picture. The region that such an LCU covers is referred to as co-located LCU (CLCU).

As yet another example of a co-located block, video decoder 30 identifies a block located at the bottom-right of the co-located region in the co-located picture. This example of the co-located block is referred to as BR, which is an acronym for bottom-right block. The examples of co-located blocks are further illustrated in FIG. 10. As yet another example of a co-located block, any block located in the co-located picture could be used to derive the candidate disparity vector.

Figure 10:
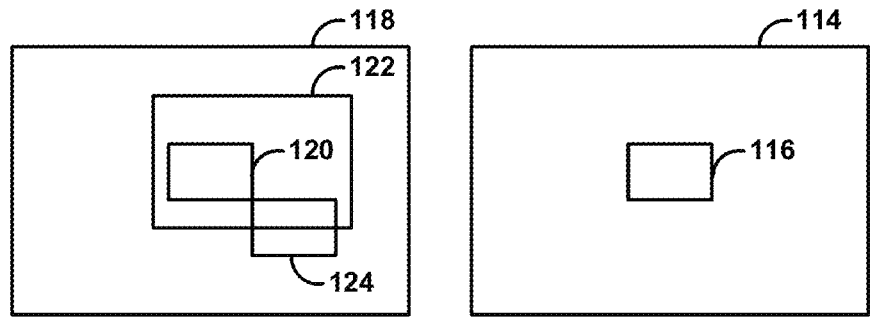
FIG. 10 is a conceptual diagram illustrating examples of co-located blocks that are co-located with the current block that is to be predicted.

FIG. 10 is a conceptual diagram illustrating examples of co-located blocks that are co-located with the current block that is to be predicted. FIG. 10 illustrates picture 114 and picture 118. In some examples, picture 114 and picture 118 belong to the same view and different access units. In some examples, picture 114 and picture 118 belong to different views and the same access unit. In either example, picture 118 is considered to be co-located with picture 114. Alternatively, picture 118 is considered to be co-located with picture 114 only for the first example (i.e., belong to the same view and different access units).

Picture 114 includes block 116 that is to be inter-predicted using, for example, merge mode or AMVP mode or residual prediction. To implement merge mode or AMVP mode, video decoder 30 determines candidate disparity vectors for block 116, where one or more of the candidate disparity vectors are disparity motion vectors from co-located blocks that are inter-view predicted.

In FIG. 10, block 120 is one example of a co-located block that is co-located with block 116. For example, block 120 covers a same region in picture 118 that block 116 covers in picture 114. Block 120 is referred to as a co-located region (CR) block (e.g., a block that covers the co-located region in the co-located picture).

Block 122 is another example of a co-located block that is co-located with block 116. For example, block 122 is a largest coding unit (LCU) whose size is larger than or equal to that of block 116. In the example of FIG. 10, block 122 covers more area in picture 118 than the area the block 116 covers in picture 114. However, block 122 covers at least the same area in picture 118 that block 116 covers in picture 114. In this case, block 122 is an LCU covering the co-located region of block 116, and is referred to as CLCU block.

Block 124 is yet another example of a co-located block that is co-located with block 116. For example, block 124 is located to the bottom-right of the co-located region in picture 118 that is co-located with the region in picture 114 where block 116 resides. Block 124 is referred to as BR block.

In some examples, to determine the candidate disparity vectors for block 116, video decoder 30 determines the motion vector information for one or more of CR block 120, CLCU block 122, and BR block 124. For example, video decoder 30 determines whether each of the 4×4 blocks within CR block 120, CLCU block 122, and BR block 124 are inter-view predicted. Video decoder 30 may include the disparity motion vectors for the inter-view predicted 4×4 blocks within CR block 120, CLCU block 122, and BR block 124 in the list of candidate disparity vectors for block 116.

However, determining the motion vector information for each 4×4 block within CR block 120, CLCU block 122, and BR block 124 may require video decoder 30 to unnecessarily determine motion vector information for more co-located blocks than needed. For instance, similar to the example with spatially neighboring blocks, video decoder 30 may not store the motion vector information for each 4×4 block within a co-located picture. However, it may be possible that in some examples, video decoder 30 stores the motion vector information for a 4×4 block within the co-located picture.

For example, after video decoder 30 inter- or intra-predicts the blocks within a co-located picture, video decoder 30 may apply 16× compression on the motion vectors of the inter-predicted 4×4 blocks in the co-located picture. As one example, to apply 16× compression, video decoder 30 generates one motion vector information based on sixteen 4×4 blocks (four 4×4 blocks in horizontal and four 4×4 blocks in vertical direction) to result in a motion vector for a 16×16 region. For example, the video decoder 30 may select the motion information of the top-left 4×4 block of one 16×16 region to represent all sixteen 4×4 blocks. Video decoder 30 stores the motion vector for the 16×16 region in a buffer of video decoder 30. This buffer may be the same as line buffer 82 or a different buffer of video decoder 30.

In other words, a 16×16 region in a co-located picture includes sixteen 4×4 blocks. The motion vector information for these sixteen 4×4 blocks may be different. However, for motion vector compression for memory bandwidth reduction, the individual motion vector information for each of these sixteen 4×4 blocks may be lost, and replaced with one motion vector for the 16×16 region that encompasses the sixteen 4×4 blocks. This motion vector for the 16×16 region represents a single motion vector for the plurality of 4×4 blocks within the 16×16 region. This single motion vector may refer to one of the two reference picture lists (RefPicList0 or RefPicList1). In some examples, there may be two motion vectors for the 16×16 region, one that refers to RefPicList0 and one that refers to RefPicList1. In these examples, there is one single motion vector for all blocks within the 16×16 region that refers to RefPicList0 and one single motion vector for all blocks within the 16×16 region that refers to RefPicList1. In examples where compression is not used, the region may include one 4×4 block.

Moreover, the region being a 16×16 region that includes sixteen 4×4 blocks is provided for purposes of illustration and should not be considered. The region may be of a size different than 16×16, and video decoder 30 may downsample the motion vector field by factor 4 in both horizontal and vertical direction for 16× compression. Similarly, the 4×4 block size of temporally neighboring blocks is also provided for purposes of illustration and should not be considered limiting.

In accordance with techniques described in this disclosure, video decoder 30 may not need to determine the motion vector information for each 4×4 block within co-located blocks. Rather, video decoder 30 may determine the motion vector information for the 16×16 region that includes the 4×4 blocks within the co-located blocks. For instance, referring back to FIG. 10, video decoder 30 may not need to determine the motion vector information for each 4×4 block within CR block 120, CLCU block 122, or BR block 124 to determine whether any of the 4×4 blocks were inter-view predicted with a disparity motion vector.

In this example, video decoder 30 determines whether the motion vector for the 16×16 region or regions that cover CR block 120, CLCU block 122, and BR block 124 is a disparity motion vector. If the motion vector for the 16×16 region or regions that cover CR block 120, CLCU block 122, and BR block 124 is a disparity motion vector, then video decoder 30 includes the disparity motion vector as a candidate disparity vector in the list of candidate disparity vectors of block 116. Also, if the disparity motion vector for the region or regions that cover CR block 120, CLCU block 122, and BR block 124 (e.g., the temporally neighboring region) is determined to be the disparity vector for block 88 (e.g., because it is selected from the list of candidate disparity vectors), then video decoder 30 may use this disparity motion vector as the disparity vector for block 88 for inter-predicting block 88. For example, video decoder 30 may implement the AMVP or the merge mode on block 88 using the disparity motion vector as the disparity vector of block 88.

The examples illustrated in FIGS. 7-10 describe techniques in which video decoder 30 determines a candidate disparity vector that is added to the list of candidate disparity vectors. For example, FIGS. 7 and 8 describe including a spatial disparity vector (SDV) into the list of candidate disparity vectors. FIGS. 9 and 10 describe including a temporal disparity vector (TDV) into the list of candidate disparity vectors. If video decoder 30 selects the SDV or the TDV as the disparity vector for the current block, then video decoder 30 implements merge mode or AMVP mode on the current blocking using the selected SDV or TDV disparity vector to identify the block whose motion vector information is used to determine the motion vector information for the current block.

However, the techniques described in this disclosure are not so limited. In some examples, video decoder 30 also determines an implicit disparity vector (IDV), and includes the IDV in the list of candidate disparity vectors. An IDV is the disparity vector of a neighboring block whose neighboring block is coded with the inter-view motion prediction. For example, assume that the current block to be predicted is referred to as a first block, the block neighboring the first block is referred to as a second block, and the block neighboring the second block is referred to as a third block.

In this example, the second block is inter-predicted with respect to a picture in the same view as the second block. However, the motion vector for the second block is determined from the third block. For example, to determine the motion vector for the second block, video decoder 30 determines a disparity vector for the second block, using similar techniques described above. Video decoder 30 uses the motion vector for the third block to which the disparity vector of second block refers as the motion vector for the second block. In this case, the disparity vector of the second block is referred to as an implicit disparity vector (IDV), and video decoder 30 includes this IDV as a candidate disparity vector for the first block.

In other words, video decoder 30 determines the SDV and TDV, described above with respect to FIGS. 7-10, based on spatially and temporally neighboring blocks to the current block. The IDV differs from the SDV and the TDV in that video decoder 30 determines the IDV based on spatially and/or temporally neighboring blocks that spatially and/or temporally neighbor a block, and this block spatially and/or temporally neighbors the current block. For example, if video decoder 30 determined a motion vector for a spatially and/or temporally neighboring block (referred to as a second block) based on the motion vector of the third block located by the disparity vector of the second block, video decoder 30 includes the disparity vector (referred to as an IDV) in the candidate list of disparity vectors for the current block (referred to as a first block). The IDV vector is further illustrated in FIG. 11.

Figure 11:
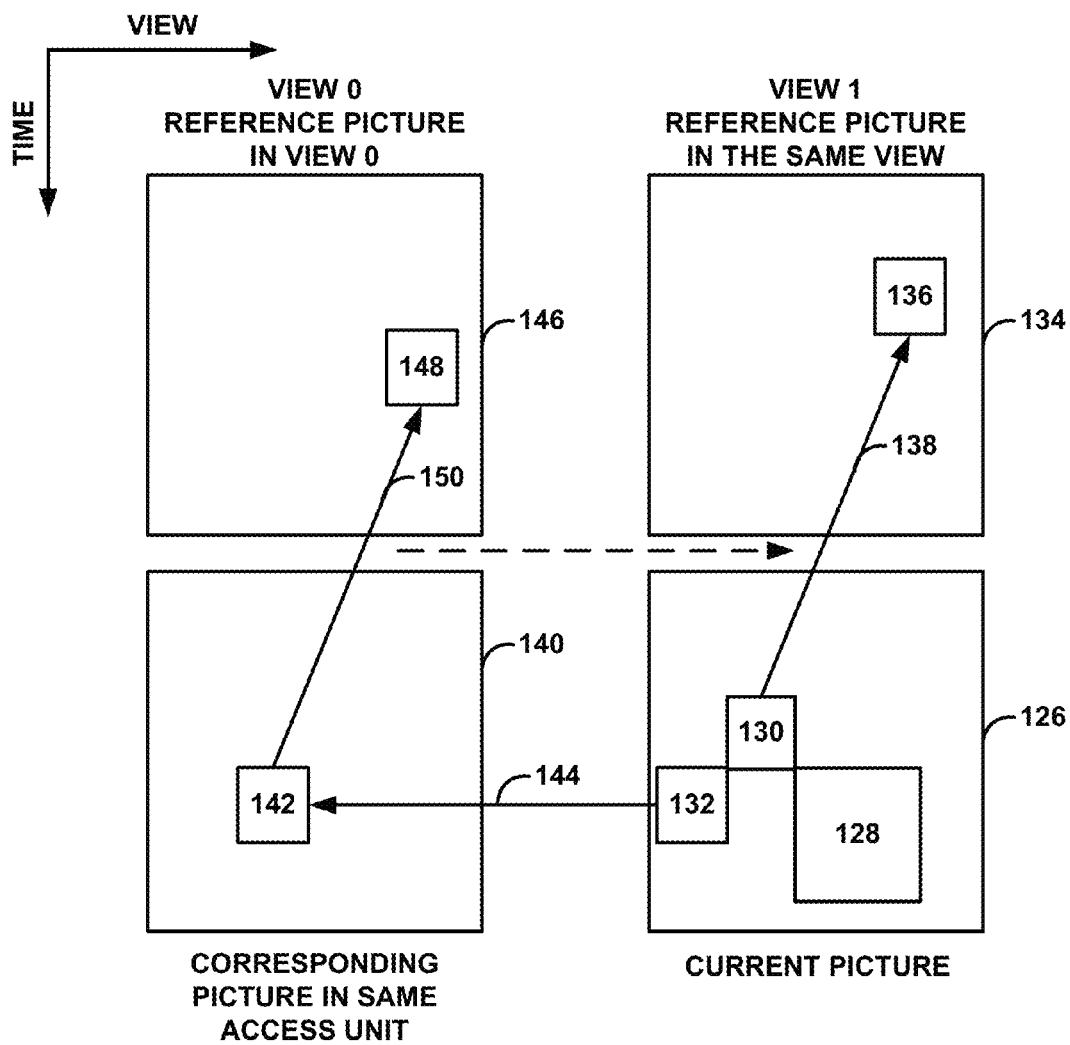
FIG. 11 is a conceptual diagram illustrating one example of determining a candidate disparity vector.

FIG. 11 is a conceptual diagram illustrating one example of determining a candidate disparity vector. FIG. 11 illustrates current picture 126 that includes block 128, where block 128 is the block to be predicted. In FIG. 11, block 130 neighbors block 128, and is inter-predicted with block 136 of picture 134, as illustrated by motion vector 138. In this example, video decoder 30 determined motion vector 138 using AMVP mode or merge mode, where video decoder 30 constructed a list of candidate motion vector predictors for block 130. In FIG. 11, video decoder 30 included a candidate motion vector predictor for block 130, where video decoder 30 determined the candidate motion vector predictor for block 130 based on a disparity vector of a spatially neighboring block that spatially neighbors block 130. In other words, in some examples, video decoder 30 implemented the techniques described in this disclosure to determine the candidate motion vector predictor for block 130.

For instance, video decoder 30 may have determined that a block that spatially neighbors block 130 is inter-view predicted with respect to a disparity motion vector that refers to a block in a different view, in the same access unit as the picture that includes block 130. Video decoder 30 may have then determined the motion vector for the block in the different view. If the motion vector for the block in the different view refers to a picture that is in the same access unit (e.g., same time instance) as the reference picture that is to be used to inter-predict block 130, then video decoder 30 may have used the motion vector information for the block in the different view to inter-predict block 130.

For example, in FIG. 11, block 132 spatially neighbors block 130. Also, in FIG. 11, block 132 is inter-view predicted by block 142 of picture 140 as indicated by disparity motion vector 144. In this example, picture 140 and picture 126 are in the same access unit (e.g., same time instance), but in different views; therefore, motion vector 144 is a disparity motion vector. In this example, video decoder 30 determined that disparity motion vector 144 is a candidate disparity vector for block 130.

To determine the motion vector for block 130, video decoder 30 determines the motion vector of block 142 (i.e., the block referred to by the determined disparity vector for block 130, where the determined disparity vector for block 130 is disparity motion vector 144). As illustrated, block 142 is inter-predicted with respect to block 148 of picture 146, as indicated by motion vector 150. In this example, video decoder 30 includes motion vector 150 as a candidate motion vector predictor for block 130. For instance, video encoder 20 may have determined that block 130 should be inter-predicted with picture 134. In this example, picture 146 is in the same time instance (e.g., same access unit) as picture 134. Therefore, motion vector 150 can be a valid motion vector predictor for block 130.

In FIG. 11, video decoder 30 determined that motion vector 150 is the motion vector predictor for block 130, and set the motion vector of block 130 equal to motion vector 150. For instance, FIG. 11 illustrates motion vector 138, which is the motion vector of block 130. In this example, video decoder 30 determined motion vector 138 based on motion vector 150, as illustrated by the dashed line extending from motion vector 150 to motion vector 138. For example, motion vector 138 inherited the motion vector information of motion vector 150.

In this example, because video decoder 30 determined the motion vector for block 130 based on determined disparity vector 144 (i.e., the disparity motion vector of block 132, which is the determined disparity vector of block 130), and block 130 spatially neighbors block 128, video decoder 30 includes disparity motion vector 144 as a candidate disparity vector for block 128. In this example, disparity motion vector 144 is referred to as an implicit disparity motion vector (IDV). Moreover, in this example, because video decoder 30 determined the motion vector for block 130 based on the implicit disparity vector (i.e., disparity motion vector 144), block 130 is referred to as an implicitly disparity predicted (IDP) block.

It should be noted that although FIG. 11 illustrates an example of an IDV based on spatially neighboring blocks, the techniques described in this disclosure are not so limited. In some examples, block 130 may be a temporally neighboring block, and block 132 may be a spatially or temporally neighboring that neighbors block 130, instead of block 130 and block 132 both being the spatially neighboring blocks illustrated in FIG. 11. Accordingly, one example of an IDV is an IDV determined based on spatially neighboring blocks. Another example of an IDV is an IDV determined based on temporally neighboring blocks.

Moreover, in accordance with the techniques described in this disclosure, video decoder 30 may account for the manner in which motion information for blocks are stored when determining the IDV for the current block. For example, when the IDV is based on spatially neighboring blocks, video decoder 30 may determine whether the motion vector for a region of blocks (e.g., an 8×4 region of blocks) is a disparity motion vector, where the region includes a plurality of blocks in the same picture as the picture that includes the block to be inter-predicted, and a motion vector for at least one of the blocks is different than the motion vector for the other blocks. Also, when the IDV is based on temporally neighboring blocks, video decoder 30 may determine whether the motion vector for a region of blocks (e.g., a 16×16 region of blocks) is a disparity motion vector, where the region includes a plurality of blocks in a different picture than the picture that includes the block to be inter-predicted.

Accordingly, video decoder 30 may determine that the region of block (i.e., the region that neighbors the current block) is an implicitly disparity predicted region when the motion vector for the region is derived from a disparity motion vector of a block that neighbors the region (i.e., block 132 of FIG. 11 neighbors the region of blocks that includes block 130 of FIG. 11). In response to determining that the region is the implicitly disparity predicted region, video decoder 30 may determine whether the disparity motion vector of the block that neighbors the region is the disparity vector for the current block (e.g., block 128 of FIG. 11). For instance, video decoder 30 may include the disparity motion vector of the block that neighbors the region in the list of candidate disparity vectors, and select the disparity motion vector. In this example, video decoder 30 may inter-predict decode block 128 using disparity motion vector 144 as the disparity vector for block 128 if it is determined that the disparity motion vector (i.e., disparity motion vector 144) is the disparity vector for block 128. In some examples, video decoder 30 may inter-predict decode block 128 using disparity motion vector 144 as the disparity vector for block 128, if the disparity motion vector for a neighboring region was not determined to be the disparity vector for block 128 (e.g., the disparity motion vector for the spatial or temporal neighboring region was not determined to be the disparity vector for block 128 or the spatial or temporal neighboring region was not inter-predicted with a disparity motion vector).

In this manner, video decoder 30 may construct a list of candidate disparity vectors for the current block that is to be predicted based on the manner in which video decoder 30 stored motion vector information for blocks that spatially and/or temporally neighbor the current block. This list of candidate disparity vectors may include one or more spatial disparity vectors (SDVs), one or more temporal disparity vectors (TDVs), and/or one or more implicit disparity vectors (IDVs).

Video decoder 30 may select one of the candidate disparity vectors from the list of candidate disparity vectors. Determining the list of candidate disparity vectors for the current, and selecting a candidate disparity vector from the list, as described in this disclosure, may overcome issues described above with respect to STVs and GDVs, such that video decoder 30 is able to determine the disparity vector for the current block with minimal complexity, in a time efficient manner.

There may be various possible criteria that video decoder 30 utilizes to determine which candidate disparity vector to select. As one example, video decoder 30 selects the most frequently occurring candidate disparity vector. As another example, video decoder 30 selects the first candidate disparity vector (e.g., as soon as a candidate disparity vector is found, video decoder 30 stops finding candidate disparity vectors). In this example, video decoder 30 may first find an SDV, then a TDV, followed by an IDV; however, the order of SDV, TDV, and IDV is provided for purposes of illustration and should not be considered limiting. If, for example, video decoder 30 finds an SDV, then the SDV may be the disparity vector. If, however, there is not SDV, but video decoder 30 finds a TDV, then the TDV may be the disparity vector, and so forth.

As another example, video decoder 30 selects the shortest candidate disparity vector, as determined by video decoder 30 taking a sum of the squares of the x- and y-components of the candidate disparity vectors and a square-root of the result of the sum. In general, video decoder 30 may utilize any technique to select a candidate disparity vector from the list of candidate disparity vectors, including receiving an index value in the candidate disparity vector from video encoder 20.

Video decoder 30 may determine the disparity vector of the current block based on the selected candidate disparity vector. For example, video decoder 30 sets the selected candidate disparity vector as the disparity vector of the current block. In this example, the determined disparity vector of the current block may include both an x-component and a y-component, if the selected candidate disparity vector also included both an x-component and a y-component. In some examples, video decoder 30 may set the y-component of the selected candidate disparity vector equal to 0 such that there is no vertical component in the determined disparity vector of the current block.

In some examples, video decoder 30 utilizes the determined disparity vector to identify a block in a picture that is in a view different than the view of the current block. Video decoder 30 determines a motion vector for the block in the picture that is in the view different than the view of the current block. In this example, video decoder 30 includes the determined motion vector as a candidate motion vector predictor in a list of candidate motion vector predictors for the current block. In some examples, if the determined motion vector refers to a picture in the same time instance as the picture that is used to inter-predict the current picture, then video decoder 30 includes the determined motion vector as a candidate motion vector predictor in the list of candidate motion vector predictors for the current picture.

Video decoder 30 may implement merge mode or AMVP mode on the current block based on the candidate list of motion vector predictors for the current block. For example, video decoder 30 may select one of the motion vector predictors such as by receiving an index value in the list of motion vector predictors from video encoder 20, as one example. Video decoder 30 then utilizes the motion vector information for the selected candidate motion vector predictor in the above described manner.

Also, in some examples, video decoder 30 also includes the determined disparity vector as a candidate motion vector predictor. For example, as described above, the list of candidate motion vector predictors provide for a way for video decoder 30 to determine the motion vector for the current block without necessarily receiving the syntax elements that define the motion vector. In some cases, the determined disparity vector (e.g., the selected disparity vector from the candidate list of disparity vectors) may also be a suitable candidate motion vector predictor for the current block, and may be candidate motion vector predictor.

In examples where the determined disparity vector is a candidate motion vector, the determined disparity vector is considered as a disparity motion vector. This is because, in these examples, the block to which the disparity vector refers is directly used to inter-predict the current block (e.g., video encoder 20 signals residuals between the block to which the disparity vector refers and the current block).

In some examples, video decoder 30 modifies the determined disparity vector. For example, as described above, the determined disparity vector for the current block may include both an x-component and a y-component. In some examples, video decoder 30 sets the y-component of the determined disparity vector equal to 0. Video decoder 30 includes the modified disparity vector as a candidate motion vector predictor for the current block.

In some examples, video decoder 30 implements parallel processing of merge mode or AMVP mode. For instance, in HEVC, video decoder 30 may divide a largest coding unit (LCU) into parallel motion estimation regions (MERs), and may allow only those neighboring blocks, to the current block, which belong to different MERs to be included in the construction process for the list of motion vector predictors.

Video encoder 20 may define the size of the MER in a picture parameter set (PPS). For example, the log 2_parallel_merge_level_minus2 syntax element in the PPS defines the size of the MER. Furthermore, when the MER size is larger than N×N such that 2N×2N is the smallest size of a coding unit (CU), the HEVC specification may define that MER takes effect in a way that a spatially neighboring block, if it is inside the same MER as the current block, is considered unavailable.

Also, the above techniques are described with respect to inter-view motion prediction; however, these techniques are extendable to inter-view residual prediction. For example, inter-view residual prediction is enabled in HEVC based 3DV. In HEVC based 3DV, the disparity vector, determined from a depth map, is used to locate the residual reference block in the residual reference view. When residual prediction is enabled for a residual block, the residual block is added in addition to the motion compensated predictors and the signaled residual for this block.

In some examples, for inter-view residual prediction, video decoder 30 may determine a disparity vector in the manner described above (e.g., based on the SDV, TDV, and/or IDV). Video decoder 30 may determine a block to which the disparity vector refers. In this example, for inter-view residual prediction, video decoder 30 may use residual information of the determined block (i.e., the block to which the disparity vector refers) to inter-predict residual information of the current block. Video encoder 20 may implement a similar technique.

As described above, relying upon the disparity vector that is determined from the depth map is computationally complex and time consuming. Accordingly, video decoder 30 may utilize the above described techniques for determining the disparity vector, and then implement inter-view residual prediction for the residual block similar to the above described techniques.

The above examples described the manner in which video decoder 30 determines a disparity vector for the current block based on spatially neighboring blocks and temporally neighboring blocks. The following examples describe the manner in which video decoder 30 determines which spatially neighboring blocks and temporally neighboring blocks are to be evaluated to determine which neighboring blocks are inter-view predicted with a disparity vector.

For instance, for a given current view and a reference view (e.g., a target reference view or any other dependent view), video decoder 30 may include a candidate disparity vector, whenever a candidate disparity vector is found from spatially neighboring, temporally neighboring blocks, or neighboring blocks of neighboring blocks (such as for the implicit disparity vector). In some examples, video decoder 30 first includes disparity vectors determined from spatially neighboring blocks, and then includes disparity vector determined from temporally neighboring blocks in the list of candidate disparity vectors, followed by disparity vector determined from neighboring blocks of neighboring blocks. In some examples, video decoder 30 first includes disparity vectors determined from temporally neighboring blocks, and then includes disparity vector determined from spatially neighboring blocks in the list of candidate disparity vectors, followed by the disparity vector determined from neighboring blocks or neighboring blocks.

In some examples, video decoder 30 may first determine whether any of the spatially neighboring blocks is inter-view predicted with a disparity motion vector, and if the disparity motion vector is found, video decoder 30 may include that disparity motion vector in the list of candidate of disparity vectors, and may not proceed with determining whether any of the temporally neighboring blocks is inter-view predicted with a disparity motion vector. In some examples, video decoder 30 may first determine whether any of the temporally neighboring blocks is inter-view predicted with a disparity motion vector, and if the disparity motion vector is found, video decoder 30 may include that disparity motion vector in the list of candidate of disparity vectors, and may not proceed with determining whether any of the spatially neighboring blocks is inter-view predicted with a disparity motion vector. The checking order of spatial/temporal neighboring blocks and neighboring blocks of neighboring blocks could be in any permutation.

For a spatially neighboring block or a temporally neighboring block, video decoder 30 may determine whether the motion vector for the spatially neighboring block or the temporally neighboring block refers to a picture in RefPicList0, and if the motion vector is a disparity motion vector, then video decoder 30 may include this disparity motion vector in the list of candidate disparity vectors. Otherwise, if the motion vector for the spatially neighboring block or the temporally neighboring block refers to a picture in RefPicList1/RefPicListC, then video decoder 30 may include this disparity motion vector in the list of candidate disparity vectors. In the previous example, video decoder 30 first checked RefPicList0, and then RefPicList1/RefPicListC. In some examples, video decoder 30 first checks RefPicList1/RefPicListC, and then RefPicList0. In some examples, only one reference picture list may be checked, for example, RefPicList0 or RefPicList1.

For the spatially neighboring blocks, video decoder 30 may determine whether the motion vector for a neighboring region is a disparity motion vector in any order (e.g., start from the top-left and extend to the top-right, or start from the top-right and extend to the top-left). In some examples, where video decoder 30 does not necessarily determine motion vectors in regions, video decoder 30 may determine, in any order, whether the motion vector of any of the spatially neighboring 4×4 blocks is a disparity motion vector for AMVP mode or merge mode. For example, the order in which video decoder 30 checks the 4×4 spatially neighboring blocks may be in the order defined by the HEVC standard for examples that do not use inter-view motion prediction. For instance, for merge mode, for examples that do not use inter-view motion prediction, HEVC defines that video decoder 30 check the motion vectors in the order of A1, B1, B0, A0, and B2, as illustrated in FIG. 4. In this example, video decoder 30 may determine whether the motion vectors for any of A1, B1, B0, A0, and B2, in that order, are disparity motion vectors.

Alternatively, video decoder 30 may utilize any permutation in the order of the above five blocks (i.e., A1, B1, B0, A0, and B2) or any permutation of the spatially neighboring regions. In some examples, video decoder 30 may determine whether the motion vectors for a subset of the neighboring blocks or neighboring regions is a disparity motion vector, and in some examples, in any permutation.

Also, if a spatially neighboring block is inside the same MER as the current block to be predicted, video decoder 30 does not determine whether that spatially neighboring block is inter-view predicted with a disparity motion vector. However, the techniques described in this disclosure are not so limited. In some other examples, if the spatially neighboring block is within the same MER as the current block to be predicted, video decoder 30 determines whether that block is inter-view predicted with a disparity motion vector.

As described above, in some examples, it may not be necessary for video decoder 30 to determine whether spatially neighboring blocks are inter-view predicted on a block-by-block basis, but may determine whether spatially neighboring blocks are inter-view predicted on a region-by-region basis. For instance, a region may include a plurality of blocks. As one example, a block may be 4×4, and the region may be two blocks encompassing an 8×4 region. Other sizes of the blocks and the regions may be possible, and the techniques described in this disclosure should not be considered limited to examples of 4×4 blocks and 8×4 regions.

For the temporally neighboring blocks, video decoder 30 may determine which co-located pictures to evaluate, and which blocks within the co-located pictures to evaluate to determine whether temporally neighboring blocks are inter-view predicted with a disparity motion vector. For instance, in some examples, for selecting the co-located picture, video decoder 30 evaluates pictures identified in the reference picture list(s) of the current picture that includes the current block. In these examples, video decoder 30 evaluates the pictures identified in the reference picture list(s) in ascending order (e.g., starting from the first picture and ending on last picture in the list). In some examples, video decoder 30 evaluates the pictures identified in the reference picture list(s) in descending order (e.g., starting from the last picture in the list and ending on the first picture in the list).

As one example, the num_ref_idx_l0_active_minus1 syntax element signaled by video encoder 20 identifies the number of entries in the RefPicList0, and the num_ref_idx_l1_active_minus1 syntax element or num_ref_idx_1C_active_minus1 signaled by video encoder 20 identifies the number of entries in the RefPicList1 or RefPicListC, respectively. The num_ref_idx_1C_active_minus1 syntax element may not be part of the current HEVC standard, but is included here as an additional example. For purposes of illustration, the techniques are described with the reference picture lists being RefPicList0 and RefPicList1. In this example, let N equal the greater of these two signaled values that define the number of entries in the reference picture list(s). Also, let ref_idx refer to a reference index in RefPicList0 or RefPicList1.

In one example, video decoder 30 checks the pictures identified in RefPicList0 and RefPicList1 based on the value of the collocated_from_l0_flag described above. For example, if collocated_from_l0_flag is 0, video decoder 30 first determines whether the pictures identified in RefPicList0[ref_idx], where ref_idx ranges from 0 to N, include co-located blocks that are inter-view predicted with respect to a disparity motion vector. If none of the co-located blocks in none of the pictures in RefPicList0 are inter-view predicted with a disparity motion vector, video decoder 30 determines whether the pictures identified in RefPicList1[ref_idx], where ref_idx ranges from 0 to N, include co-located blocks that are inter-view predicted with respect to a disparity motion vector.

If collocated_from_l0_flag is 1, video decoder 30 first determines whether the pictures identified in RefPicList1[ref_idx], where ref_idx ranges from 0 to N, include co-located blocks that are inter-view predicted with respect to a disparity motion vector. If none of the co-located blocks in none of the pictures in RefPicList1 are inter-view predicted with a disparity motion vector, video decoder 30 determines whether the pictures identified in RefPicList0[ref_idx], where ref_idx ranges from 0 to N, include co-located blocks that are inter-view predicted with respect to a disparity motion vector.

In some examples, video decoder 30 first checks whether any picture in RefPicList0, as identified by RefPicList0[ref_idx], includes a co-located block that is inter-view predicted with a disparity vector regardless of the value of the collocated_from_l0_flag, and then checks whether any picture in RefPicList1, as identified by RefPicList1[ref_idx], includes a co-located block that is inter-view predicted with a disparity vector regardless of the value of the collocated_from_l0_flag. In some examples, video decoder 30 first checks whether any picture in RefPicList1, as identified by RefPicList1[ref_idx], includes a co-located block that is inter-view predicted with a disparity vector regardless of the value of the collocated_from_l0_flag, and then checks whether any picture in RefPicList0, as identified by RefPicList0[ref_idx], includes a co-located block that is inter-view predicted with a disparity vector regardless of the value of the collocated_from_l0_flag.

When checking the pictures in RefPicList0 or RefPicList1, if one of the pictures is for a picture in a view different the view of the current block, video decoder 30 may not determine whether there are any co-located blocks in such a picture that are inter-view predicted with a disparity vector (e.g., a picture from a different view in the reference picture list may be skipped). Alternatively, video decoder 30 may determine whether a picture in a different view than the view of the current picture includes co-located blocks that are inter-view predicted with a disparity motion vector. For example, the picture in the view different than the view of the current block may be a previously decoded picture in the same access unit as the picture that includes the current view.

In some examples, video decoder 30 may determine whether a picture in a different view than the view of the current picture includes co-located blocks that are inter-view predicted with a disparity motion vector even if that picture is not included in RefPicList0 or RefPicList1. In these examples, in some instances, it may be possible that there are multiple views with pictures in the same access unit as the picture that includes the current block. For these cases, video decoder 30 may check pictures in descending order of view order indices. For example, video decoder 30 may determine whether the picture in the view with the highest view order index includes co-located blocks that are inter-view predicted with a disparity motion vector, followed by the view with the second highest view order index, and so forth.

In another example, video decoder 30 determines the difference between view identifiers for each of the pictures that are in different views and the view identifier for the current block. Video decoder 30 checks pictures in ascending order based on the difference. For example, assume that there is a picture in a first view and a picture in a second view that are each in the same access unit as the current picture that includes the current block, and the difference between the view identifier for the first view and the view identifier for the current view is less than the difference between the view identifier for the second view and the view identifier for the current view. In this case, video decoder 30 may first determine whether any of the co-located blocks in the picture in the first view are inter-view predicted with a disparity vector, and if not, determines whether any of the co-located blocks in the picture in the second view are inter-view predicted with a disparity vector.

In some examples, video decoder 30 checks only a subset of the pictures identified in the reference picture lists to determine whether any of the pictures include co-located blocks that are inter-view predicted with a disparity motion vector. In some examples, this subset of pictures may include pictures that are identified with relatively smaller reference indices (e.g., pictures that are identified with reference index 0 and reference index 1 in RefPicList0 and RefPicList1). In other words, video decoder 30 may check pictures identified in a truncated version of RefPicList0 and RefPicList1.

The above describes some example ways of the order in which video decoder 30 checks co-located pictures to identify co-located blocks that are inter-view predicted with a disparity motion vector. The following describes the co-located blocks that video decoder 30 checks in each picture to identify co-located blocks that are inter-view predicted with a disparity motion vector.

As described above, there may be three examples of co-located blocks (e.g., the CR block, the CLCU block, and the BR block, as described above with respect to FIG. 10). In some examples, video decoder 30 may check each one of the CR block, the CLCU block, and the BR block to determine which co-located blocks are inter-view predicted with a disparity motion vector. In some examples, video decoder 30 may check one or more of the CR block, CLCU block, and BR block, but not all three. For instance, video decoder 30 may not check the BR block in one instance, may not check the CR block in one instance, and may not check the CLCU block in one instance.

In some examples, the order in which video decoder 30 checks the three examples of co-located blocks is different for pictures in different views. For example, for a picture in a first view, video decoder 30 first checks the CR block, followed by the CLCU block, and then the BR block to determine whether any of these blocks is inter-view predicted with a disparity motion vector. For a picture in a second view, video decoder 30 first checks the BR block, followed by the CR block, and then the CLCU block to determine whether any of these blocks is inter-view predicted with a disparity motion vector.

For each CR block or CLCU block, video decoder 30 may raster scan each 4×4 block in the CR block or the CLCU block to determine whether any of the 4×4 blocks is inter-view predicted with a disparity motion vector. In examples where video decoder 30 raster scans the CLCU block, video decoder 30 may skip the 4×4 blocks of CR block, and not determine whether any of the 4×4 blocks of the CR block are inter-view predicted with a disparity motion vector.

However, checking each 4×4 temporally neighboring block may not be necessary. For instance, as described above, video decoder 30 may store the motion vector information for one 16×16 region that includes sixteen 4×4 blocks due to motion vector compression, rather than the motion vector information for each of the 4×4 blocks. In these examples, video decoder 30 may check 16×16 regions in raster scan order to determine whether a motion vector for a 16×16 region is a disparity motion vector. Video decoder 30 may check in the 16×16 regions in examples where the co-located picture is in a different access unit, but in the same view, and in examples where the co-located picture is in the same access unit, but in the different view.

The 16×16 region is described as one example, and should not be considered limiting. In some examples, the region may be larger or smaller than 16×16, and may be based on the manner in which video decoder 30 compresses the motion vector information for the temporally neighboring blocks (e.g., blocks in pictures in the same view, but different time instance or blocks in pictures in a different view, but same time instance).

In some examples, video decoder 30 may raster scan on co-located blocks on N×N blocks, where 2N×2N is the size of the smallest coding unit (CU). In some examples, video decoder 30 may raster scan on prediction units (PUs).

In accordance with the techniques described in this disclosure, after identifying at least one disparity motion vector (e.g., based on the scanning of spatially neighboring blocks and temporally neighboring blocks), video decoder 30 may utilize the disparity motion vector for different purposes. As one example, video decoder 30 may include the disparity motion vectors in the list of candidate disparity vectors for the current block, and the motion vector information for the block referred to by the selected candidate disparity vector is included in the list of candidate motion vector predictors for AMVP mode and merge mode. As another example, video decoder 30 may include the disparity motion vector in the list of candidate motion vector predictors. In this example, in some instances, video decoder 30 may modify the disparity motion vector by setting the y-component of the disparity motion vector equal to zero.

Although the above example techniques are described from the perspective of video decoder 30, the techniques described in this disclosure are not so limited. In general, video encoder 20 may be configured to implement techniques similar to those described above with respect to video decoder 30. Moreover, in some examples, video decoder 30 is configured to implement the techniques described in this disclosure, and video encoder 20 is not. In some examples, video encoder 20 is configured to implement the techniques described in this disclosure, and video decoder 30 is not. In some examples, both video encoder 20 and video decoder 30 are configured to implement the techniques described in this disclosure.

Accordingly, this disclosure describes a video coder (e.g., video encoder 20 and/or video decoder 30) that is configured to determine whether a motion vector for a region in a picture in a first view is a disparity motion vector. In this example, the region temporally or spatially neighbors the current block that is to be predicted. For example, the region includes one or more temporally or spatially neighboring blocks, and the motion vector for this region represents a single motion vector for the plurality of temporally or spatially neighboring blocks for one reference picture list. For example, if inter-predicted from two reference picture lists, one motion vector for the region represents a single motion vector for the one or more blocks for one reference picture list (e.g., one of RefPicList0 or RefPicList1), and another motion vector for the region represents a single motion vector for the one or more blocks for another reference picture list (e.g., the other one of RefPicList0 or RefPicList1). The video coder is further configured to include the disparity motion vector in the list of candidate disparity vectors for the current block. Also, in some examples, the current block is a block of an instantaneous decoder refresh (IDR) or a clean random access (CRA) picture.

In examples where the region is a spatially neighboring region, the region may be an 8×4 region that includes two 4×4 blocks. In this example, the picture that includes the spatially neighboring region also includes the current block that is to be predicted. In examples where the region is a temporally neighboring region, the region may be a 16×16 region that includes sixteen 4×4 blocks. In this example, the picture that includes the temporally neighboring region does not include the current block. As described above, if compression is not used for storing motion vector information for temporally and/or spatially neighboring blocks, then the spatially neighboring region and/or temporally neighboring region may include one block rather than a plurality of blocks.

In accordance with techniques described in the disclosure, the video coder may be configured to determine whether temporally neighboring regions in pictures identified in a reference picture list (e.g., one or both of RefPicList0 and RefPicList1) are inter-view predicted with disparity motion vectors. For example, after the video coder determines whether a region of a first picture is inter-view predicted, the video coder determines whether a region of a second picture is inter-view predicted. If the region of the second picture is inter-view predicted, the video coder includes the disparity motion vector for the region of the second picture in the list of candidate disparity vectors for the current block.

In this example, the first picture and the second picture both belong to a reference picture list. Also, in some examples, the reference picture list identifies the first picture and the second picture in ascending order. For example, the reference index that identifies the first picture in the reference picture list is less than the reference index that identifies the second picture in the reference picture list. In other words, the first picture is identified earlier than the second picture in the reference picture list.

Moreover, the video coder may utilize the disparity motion vector for inter-view prediction purposes such as for merge mode and AMVP mode. For example, the video coder sets the disparity motion vector as a disparity vector for the current block. The video coder determines a block to which the disparity vector refers. The video coder also determines a motion vector for the block to which the disparity vector refers, and includes the determined motion vector in a list of candidate motion vector predictors. The video coder may then inter-predict the current block based on the one of the candidate motion vector predictors.

In some examples, the video coder includes the disparity motion vector in the list of candidate motion vector predictors. For example, the video coder modifies the disparity motion vector by setting the y-component of the disparity motion vector equal to zero, and includes the modified disparity motion vector in the list of candidate motion vector predictors.

In some examples, the video coder may implement the techniques described in this disclosure for inter-view residual prediction. For example, the video coder may determine a block to which the disparity vector refers, and may use residual information of the block to which the disparity vector refers (i.e., the determined block) to inter-predict residual information of the current block.

Figure 12:
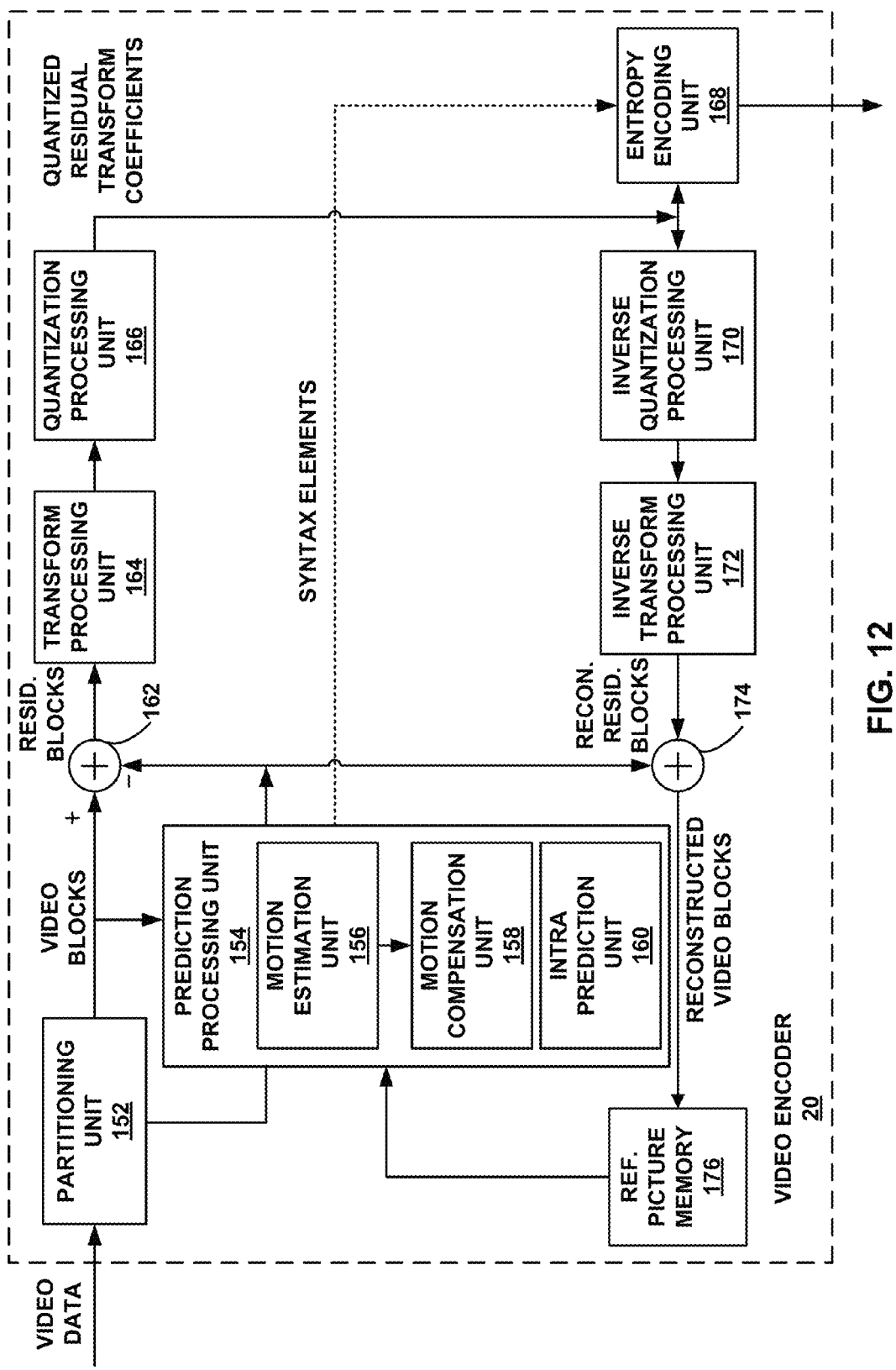
FIG. 12 is a block diagram illustrating an example of a video encoder that may implement the techniques described in this disclosure.

FIG. 12 is a block diagram illustrating an example of a video encoder that may implement the techniques described in this disclosure. For example, FIG. 12 illustrates video encoder 20 which may perform intra- and inter-coding of video blocks within video slices. For example, video encoder 20 may perform inter-prediction encoding or intra-prediction encoding. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 12, video encoder 20 includes a partitioning unit 152, prediction processing unit 154, reference picture memory 176, summer 162, transform processing unit 164, quantization processing unit 166, and entropy encoding unit 168. Prediction processing unit 154 includes motion estimation unit 156, motion compensation unit 158, and intra prediction unit 160. For video block reconstruction, video encoder 20 also includes inverse quantization processing unit 170, inverse transform processing unit 172, and summer 174. A deblocking filter (not shown in FIG. 12) may also be included to filter block boundaries to remove blockiness artifacts from reconstructed video. If desired, the deblocking filter would typically filter the output of summer 174. Additional loop filters (in loop or post loop) may also be used in addition to the deblocking filter. Reference picture memory 176 is one example of a decoded picture buffer (DPB).

As shown in FIG. 12, video encoder 20 receives video data, and partitioning unit 152 partitions the data into video blocks. This partitioning may also include partitioning into slices, tiles, or other larger units, as wells as video block partitioning (e.g., according to a quadtree structure of LCUs and CUs). Video encoder 20 generally illustrates the components that encode video blocks within a video slice to be encoded. The slice may be divided into multiple video blocks (and possibly into sets of video blocks referred to as tiles). Prediction processing unit 154 may select one of a plurality of possible coding modes, such as one of a plurality of intra coding modes or one of a plurality of inter coding modes, for the current video block based on error results (e.g., coding rate and the level of distortion). Prediction processing unit 154 may provide the resulting intra- or inter-coded block to summer 162 to generate residual block data and to summer 174 to reconstruct the encoded block for use as a reference picture.

Intra prediction unit 160 within prediction processing unit 154 may perform intra-predictive coding of the current video block relative to one or more neighboring blocks in the same frame or slice as the current block to be coded to provide spatial compression. Motion estimation unit 156 and motion compensation unit 158 within prediction processing unit 154 perform inter-predictive coding of the current video block relative to one or more predictive blocks in one or more reference pictures to provide temporal compression.

Motion estimation unit 156 may be configured to determine the inter-prediction mode for a video slice according to a predetermined pattern for a video sequence. The predetermined pattern may designate video slices in the sequence as P slices or B slices. Motion estimation unit 156 and motion compensation unit 158 may be highly integrated, but are illustrated separately for conceptual purposes. Motion estimation, performed by motion estimation unit 156, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 176. For example, video encoder 20 may interpolate values of one-quarter pixel positions, one-eighth pixel positions, or other fractional pixel positions of the reference picture. Therefore, motion estimation unit 156 may perform a motion search relative to the full pixel positions and fractional pixel positions and output a motion vector with fractional pixel precision.

Motion estimation unit 156 calculates a motion vector for a PU of a video block in an inter-coded slice by comparing the position of the PU to the position of a predictive block of a reference picture. The reference picture may be selected from a first reference picture list (RefPicList0) or a second reference picture list (RefPicList1), each of which identify one or more reference pictures stored in reference picture memory 176. Motion estimation unit 156 sends the calculated motion vector to entropy encoding unit 168 and motion compensation unit 158.

Motion compensation, performed by motion compensation unit 158, may involve fetching or generating the predictive block based on the motion vector determined by motion estimation, possibly performing interpolations to sub-pixel precision. Upon receiving the motion vector for the PU of the current video block, motion compensation unit 158 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 162 represents the component or components that perform this subtraction operation. Motion compensation unit 158 may also generate syntax elements associated with the video blocks and the video slice for use by video decoder 30 in decoding the video blocks of the video slice. Motion estimation unit 156 and motion compensation unit 158 may together also implement inter-prediction where a block is inter-predicted with respect to a block in another view.

Intra prediction unit 160 may intra-predict a current block, as an alternative to the inter-prediction performed by motion estimation unit 156 and motion compensation unit 158, as described above. In particular, intra prediction unit 160 may determine an intra-prediction mode to use to encode a current block. In some examples, intra prediction unit 160 may encode a current block using various intra-prediction modes, e.g., during separate encoding passes, and intra prediction unit 160 (or a mode select unit, in some examples) may select an appropriate intra-prediction mode to use from the tested modes. For example, intra prediction unit 160 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction unit 160 may calculate ratios from the distortions and rates for the various encoded blocks to determine which intra-prediction mode exhibits the best rate-distortion value for the block.

In any case, after selecting an intra-prediction mode for a block, intra prediction unit 160 may provide information indicative of the selected intra-prediction mode for the block to entropy encoding unit 168. Entropy encoding unit 168 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 154 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 164. Transform processing unit 164 transforms the residual video data into residual transform coefficients using a transform, such as a discrete cosine transform (DCT) or a conceptually similar transform. Transform processing unit 164 may convert the residual video data from a pixel domain to a transform domain, such as a frequency domain.

Transform processing unit 164 may send the resulting transform coefficients to quantization processing unit 166. Quantization processing unit 166 quantizes the transform coefficients to further reduce bit rate. The quantization process may reduce the bit depth associated with some or all of the coefficients. The degree of quantization may be modified by adjusting a quantization parameter. In some examples, quantization processing unit 166 may then perform a scan of the matrix including the quantized transform coefficients. Alternatively, entropy encoding unit 168 may perform the scan.

Following quantization, entropy encoding unit 168 entropy encodes the quantized transform coefficients. For example, entropy encoding unit 168 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 168, the encoded bitstream may be transmitted to video decoder 30, or archived for later transmission or retrieval by video decoder 30. Entropy encoding unit 168 may also entropy encode the motion vectors and the other syntax elements for the current video slice being coded.

Inverse quantization processing unit 170 and inverse transform processing unit 172 apply inverse quantization and inverse transformation, respectively, to reconstruct the residual block in the pixel domain for later use as a reference block of a reference picture. Motion compensation unit 158 may calculate a reference block by adding the residual block to a predictive block of one of the reference pictures within one of the reference picture lists. Motion compensation unit 158 may also apply one or more interpolation filters to the reconstructed residual block to calculate sub-integer pixel values for use in motion estimation. Summer 174 adds the reconstructed residual block to the motion compensated prediction block produced by motion compensation unit 158 to produce a reference block for storage in reference picture memory 176. The reference block may be used by motion estimation unit 156 and motion compensation unit 158 as a reference block to inter-predict a block in a subsequent video frame or picture.

In this manner, video encoder 20 is an example of a video encoder that is configured to implement one or more example techniques described in this disclosure. For example, prediction processing unit 154 may be configured to determine a disparity vector for the current block based on disparity motion vectors of spatially and temporally neighboring regions. Prediction processing unit 154 may also be configured to utilize the determined disparity vector for determining candidate motion vector predictors for the list of candidate motion vector predictors. In some examples, prediction processing unit 154 may modify the determined disparity vector, and include the modified, determined disparity vector in the list of candidate motion vector predictors. Prediction processing unit 154 may also be configured for inter-view motion prediction and inter-view residual prediction.

In some examples, a unit other than prediction processing unit 154 may implement the examples described above. In some other examples, prediction processing unit 154 in conjunction with one or more other units of video encoder 20 may implement the examples described above. In some examples, a processor or unit of video encoder 20 (not shown in FIG. 12) may, alone or in conjunction with other units of video encoder 20, implement the examples described above.

Figure 13:
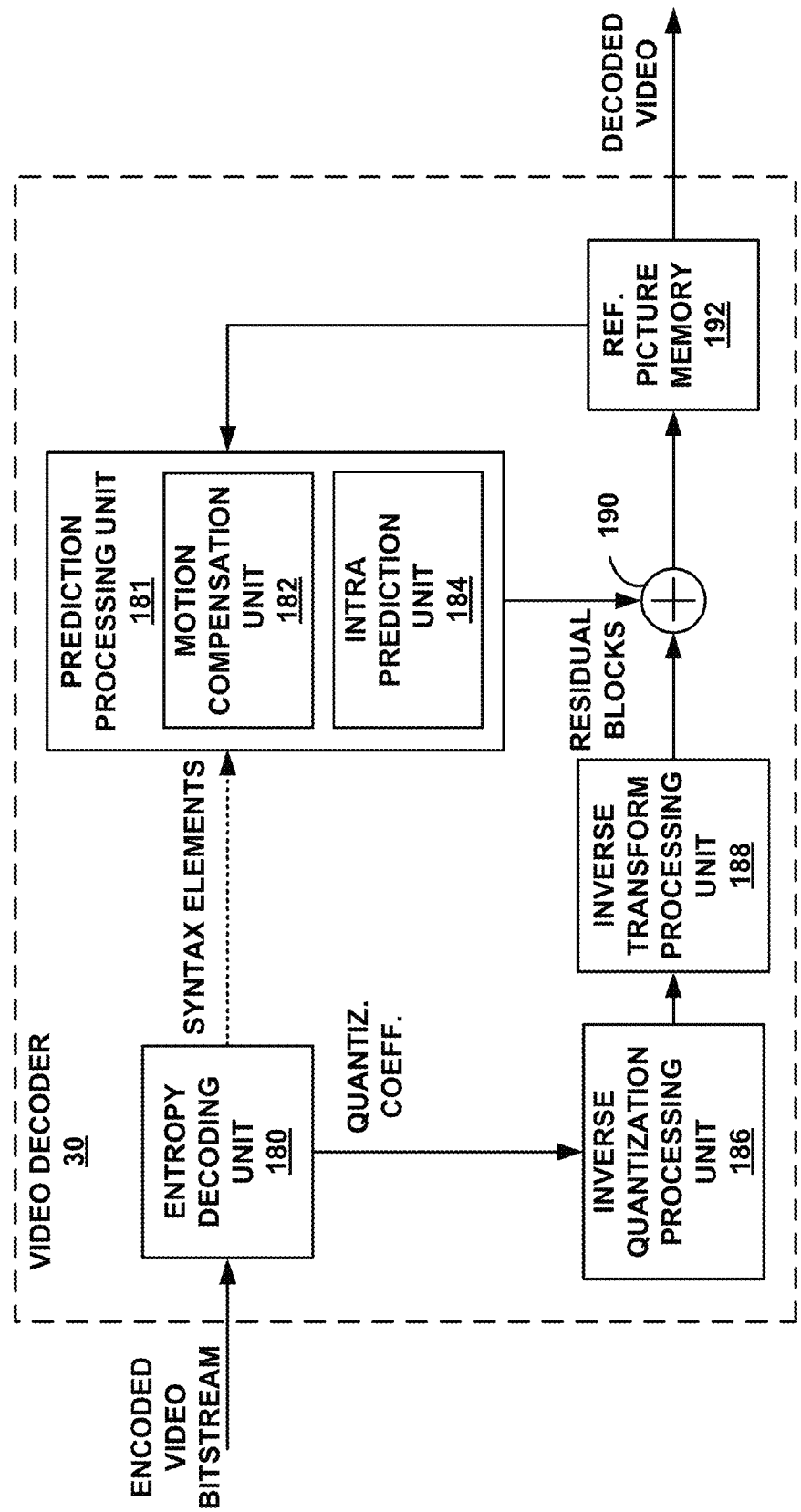
FIG. 13 is a block diagram illustrating an example of a video decoder that may implement the techniques described in this disclosure.

FIG. 13 is a block diagram illustrating an example of a video decoder that may implement the techniques described in this disclosure. For example, video decoder 30 may perform inter-prediction decoding or intra-prediction decoding. FIG. 13 illustrates video decoder 30. In the example of FIG. 13, video decoder 30 includes an entropy decoding unit 180, prediction processing unit 181, inverse quantization processing unit 186, inverse transform processing unit 188, summer 190, and reference picture memory 192. Prediction processing unit 181 includes motion compensation unit 182 and intra prediction unit 184. Video decoder 30 may, in some examples, perform a decoding pass generally reciprocal to the encoding pass described with respect to video encoder 20 from FIG. 12. Reference picture memory 192 is one example of a decoded picture buffer (DPB).

During the decoding process, video decoder 30 receives an encoded video bitstream that represents video blocks of an encoded video slice and associated syntax elements from video encoder 20. Entropy decoding unit 180 of video decoder 30 entropy decodes the bitstream to generate quantized coefficients, motion vectors, and other syntax elements. Entropy decoding unit 180 forwards the motion vectors and other syntax elements to prediction processing unit 181. Video decoder 30 may receive the syntax elements at the video slice level and/or the video block level.

When the video slice is coded as an intra-coded (I) slice, intra prediction unit 184 of prediction processing unit 181 may generate prediction data for a video block of the current video slice based on a signaled intra prediction mode and data from previously decoded blocks of the current frame or picture. When the video frame is coded as an inter-coded (i.e., B or P) slice, motion compensation unit 182 of prediction processing unit 181 produces predictive blocks for a video block of the current video slice based on the motion vectors and other syntax elements received from entropy decoding unit 180. The predictive blocks may be produced from one of the reference pictures within one of the reference picture lists. Video decoder 30 may construct the reference picture lists (RefPicList0 and RefPicList1) using default construction techniques based on reference pictures stored in reference picture memory 192.

Motion compensation unit 182 determines prediction information for a video block of the current video slice by parsing the motion vectors and other syntax elements, and uses the prediction information to produce the predictive blocks for the current video block being decoded. For example, motion compensation unit 182 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 182 may also perform interpolation based on interpolation filters. Motion compensation unit 182 may use interpolation filters as used by video encoder 20 during encoding of the video blocks to calculate interpolated values for sub-integer pixels of reference blocks. In this case, motion compensation unit 182 may determine the interpolation filters used by video encoder 20 from the received syntax elements and use the interpolation filters to produce predictive blocks.

Inverse quantization processing unit 186 inverse quantizes (i.e., de-quantizes), the quantized transform coefficients provided in the bitstream and decoded by entropy decoding unit 180. The inverse quantization process may include use of a quantization parameter calculated by video encoder 20 for each video block in the video slice to determine a degree of quantization and, likewise, a degree of inverse quantization that should be applied. Inverse transform processing unit 188 applies an inverse transform (e.g., an inverse DCT, an inverse integer transform, or a conceptually similar inverse transform process), to the transform coefficients in order to produce residual blocks in the pixel domain.

After motion compensation unit 182 generates the predictive block for the current video block based on the motion vectors and other syntax elements, video decoder 30 forms a decoded video block by summing the residual blocks from inverse transform processing unit 188 with the corresponding predictive blocks generated by motion compensation unit 182. Summer 190 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given picture are then stored in reference picture memory 192, which stores reference pictures used for subsequent motion compensation. Reference picture memory 192 also stores decoded video for later presentation on a display device, such as display device 32 of FIG. 1.

In this manner, video decoder 30 is an example of a video decoder that is configured to implement one or more example techniques described in this disclosure. For example, prediction processing unit 181 may be configured to determine a disparity vector for the current block based on disparity motion vectors of spatially and temporally neighboring regions. Prediction processing unit 181 may also be configured to utilize the determined disparity vector for determining candidate motion vector predictors for the list of candidate motion vector predictors. In some examples, prediction processing unit 181 may modify the determined disparity vector, and include the modified, determined disparity vector in the list of candidate motion vector predictors. Prediction processing unit 181 may also be configured to perform inter-view motion prediction and inter-view residual prediction.

In some examples, a unit other than prediction processing unit 181 may implement the examples described above. In some examples, prediction processing unit 181 in conjunction with one or more other units of video decoder 30 may implement the examples described above. In yet some other examples, a processor or unit of video decoder 30 (not shown in FIG. 13) may, alone or in conjunction with other units of video decoder 30, implement the examples described above.

Figure 14:
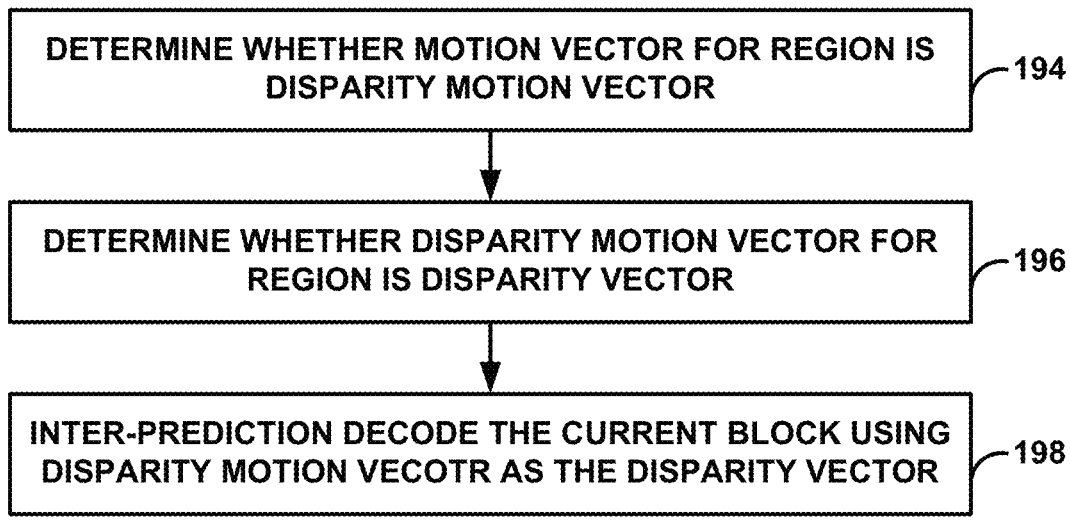
FIG. 14 is a flowchart illustrating an example operation of a video decoder in accordance with one or more techniques described in this disclosure.

FIG. 14 is a flowchart illustrating an example operation of a video decoder in accordance with one or more techniques described in this disclosure. One example of the video decoder is video decoder 30. As illustrated in FIG. 14, video decoder 30 may determine whether a motion vector for a region is a disparity motion vector (194). For example, the region may include one or more blocks and may be within a picture in a first view of a plurality of views. The motion vector for the region may represent a single motion vector for the one or more block within the region for one reference picture list (i.e., RefPicList0 or RefPicList1). For simplicity, the techniques are described with the motion vector for the region being for one of the reference picture lists. In some cases, there may be two motion vectors for the region. In these examples, there may be a single motion vector for all of the blocks within the region for one reference picture list, and a single motion vector for all of the blocks within the region for the other reference picture list.

The region may neighbor (e.g., spatially neighbor, temporally neighbor) a current block. The region may also spatially or temporally neighbor a block that spatially or temporally neighbors the current block. Also, the motion vector may be the disparity motion vector if the motion vector refers to a picture in a second, different view (e.g., in a view different than the view that includes the picture with the region).

Responsive to determining that the motion vector for the region in the picture is the disparity motion vector, video decoder 30 may determine whether the disparity motion vector for the region is a disparity vector for the current block (196). There may be various ways in which video decoder 30 may determine whether the disparity motion vector for the region is the disparity vector for the current block. As one example, video decoder 30 may check spatially neighboring regions to determine spatial disparity vectors (SDVs), check temporally neighboring regions to determine temporal disparity vectors (TDVs), check spatially/temporally neighboring regions of spatially/temporally neighboring blocks to determine implicit disparity vectors (IDVs). Video decoder 30 may construct a list of candidate disparity vectors that includes the SDVs, TDVs, and IDVs, and may select one of the candidate disparity vectors as the disparity vector for the current block. As another example, video decoder 30 may select the first disparity motion vector that video decoder 30 as the disparity vector for the current block. There may be other example ways in which video decoder 30 determines whether the disparity motion vector for the region is the disparity vector for the current block.

Video decoder 30 inter-prediction decodes the current block (198). For example, video decoder 30 inter-prediction decodes the current block using the disparity motion vector as the disparity vector for the current block if it is determined that the disparity motion vector for the region is the disparity vector for the current block. Inter-prediction decode refers to inter-prediction performed by video decoder 30. For example, video decoder 30 may determine a block to which the disparity vector refers. Video decoder 30 may determine a motion vector for the block to which the disparity vector refers, and include the motion vector for the block to which the disparity vector refers in a list of candidate motion vector predictors. In this example, video decoder 30 may inter-predict decode the current block based on the motion vector for the block to which the disparity vector refers when the motion vector for the block to which the disparity vector refers is selected from the list of candidate motion vector predictors as part of a merge mode or an advanced motion vector prediction (AMVP) mode.

Figure 15:
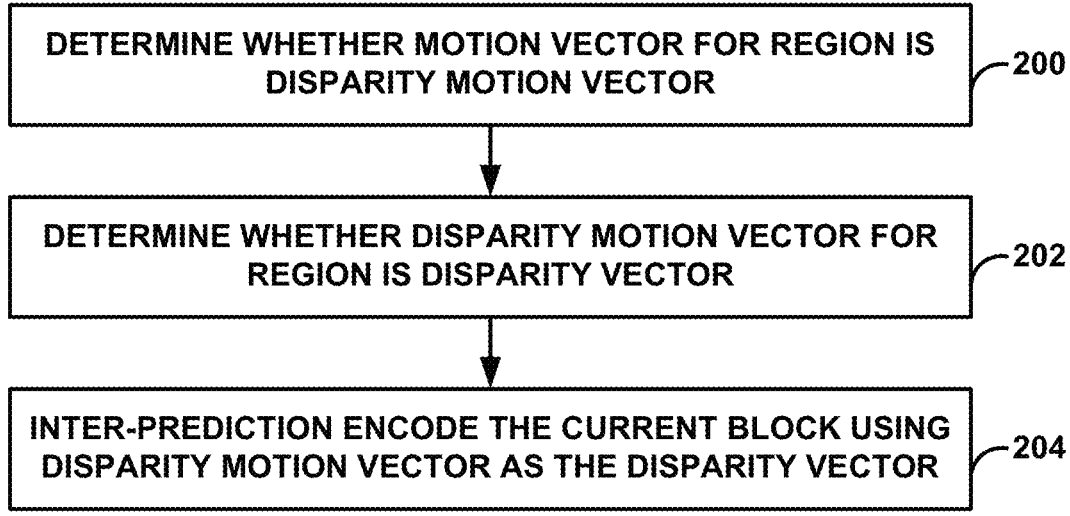
FIG. 15 is a flowchart illustrating an example operation of a video encoder in accordance with one or more techniques described in this disclosure.

FIG. 15 is a flowchart illustrating an example operation of a video encoder in accordance with one or more techniques described in this disclosure. One example of the video encoder is video encoder 20. In general, video encoder 20 may perform similar techniques as those described above in FIG. 14 for video decoder 30, with respect to determining a disparity vector for the current block.

For example, video encoder 20 may determine whether a motion vector for a region is a disparity motion vector (200). Video encoder 20 may determine whether the motion vector for a region is a disparity motion vector in a manner similar to that described above with respect to video decoder 30 in FIG. 14. Responsive to determining that the motion vector for the region in the picture is the disparity motion vector, video encoder 20 determines whether the disparity motion vector for the region is a disparity vector for the current block (202). There may be various ways in which video encoder 20 may determine whether the disparity motion vector for the region is the disparity vector for the current block, and may be similar to the manner in which video decoder 30 determines whether the disparity motion vector for the region is the disparity vector for the current block. Video encoder 20 inter-prediction encodes the current block (204). For example, video encoder 20 inter-prediction encodes using the disparity motion vector as the disparity vector for the current block if it is determined that the disparity motion vector for the region is the disparity vector for the current block (204). Inter-prediction encode refers to inter-prediction performed by video encoder 20, and video encoder 20 may inter-predict encode the current block in a manner similar to video decoder 30, but for purposes of encoding the video data. As described above, video decoder 30 may preform inter-prediction decoding for purposes of decoding the video data.

Figure 16:
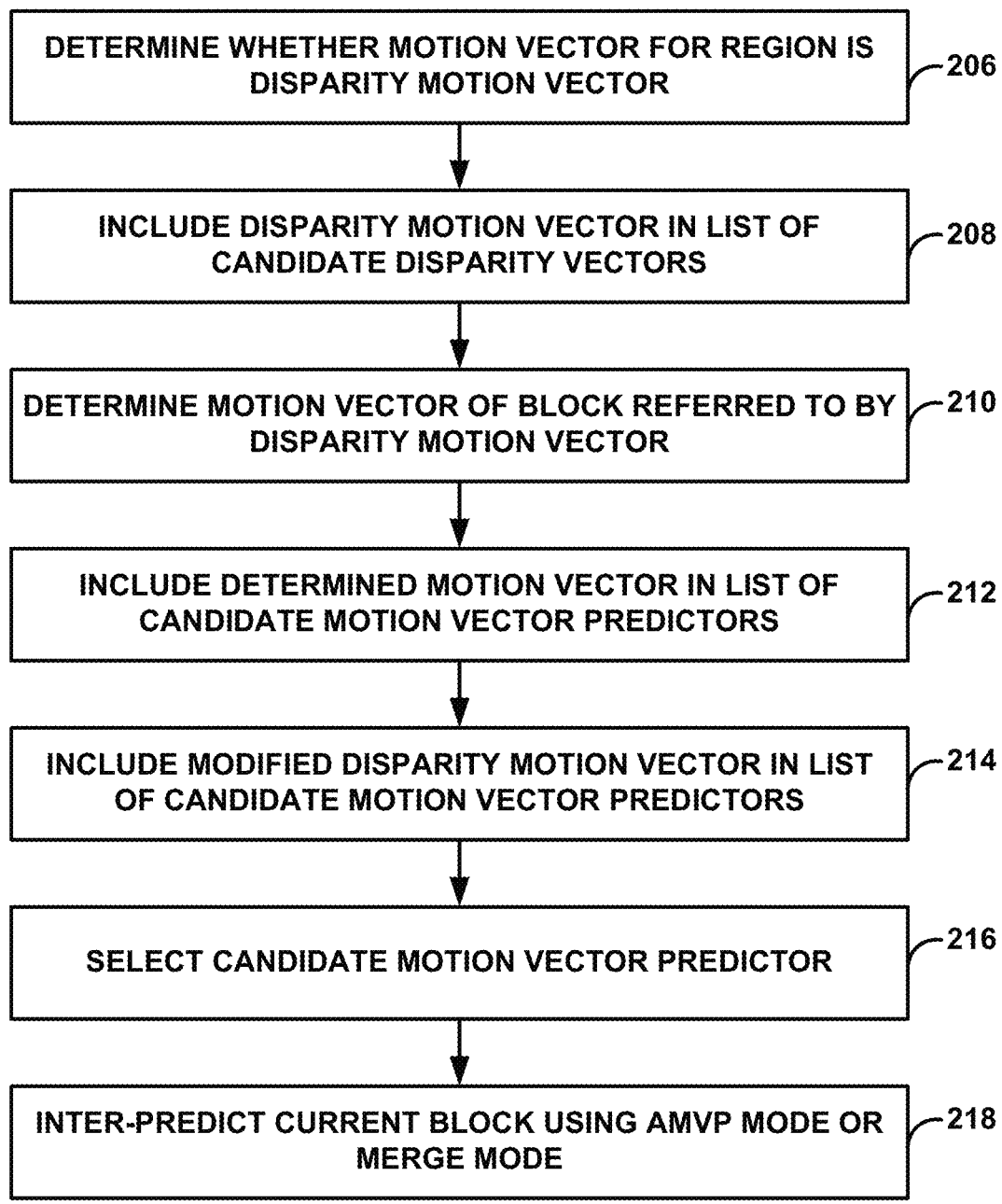
FIG. 16 is a flowchart illustrating an example operation of a video coder in accordance with one or more techniques described in this disclosure.

FIG. 16 is a flowchart illustrating an example operation of a video coder in accordance with one or more techniques described in this disclosure. Video encoder 20 and/or video decoder 30 may be configured to implement the example techniques illustrated in FIG. 16.

For example, the video coder determines whether a motion vector for a spatially or temporally neighboring region is a disparity motion vector (206). The spatially neighboring region (e.g., an 8×4 region that includes two 4×4 blocks) is in the same picture as the block to be predicted. The temporally neighboring region (e.g., a 16×16 region that includes sixteen 4×4 blocks) is in a picture other than the picture that includes the block to be predicted. In some examples, the video coder may determine whether a motion vector for region that spatially or temporally neighbors a spatially or temporally neighboring block is a disparity motion vector. The motion vector for the region represents a single motion vector for the plurality of blocks that are within the region.

Furthermore, for the temporally neighboring regions, the video coder may evaluate each picture in one or both reference picture lists for the current block (i.e., the constructed reference picture lists for the picture that includes the current block). For each picture, the video coder may determine whether the picture includes a temporally neighboring region that is inter-predicted with a disparity motion vector. In some examples, the video coder evaluates each picture in the reference the picture list in ascending order.

Also, the video coder evaluates pictures in RefPicList0 first or RefPicList1 first based on the value of the collocated_from_10_flag. In other examples, the video coder evaluates picture in RefPicList0 first, and then RefPicList1, or vice-versa, regardless of the value of collocated_from_10_flag.

In the example of FIG. 16, the video coder includes the disparity motion vector in a list of candidate disparity vectors (208). If the video coder selects this disparity motion vector from the list of candidate disparity vectors, then the video coder determines the motion vector of the block referred to by the disparity motion vector (210). In this example, the video coder includes the determined motion vector in a list of candidate motion vector predictors for the current block (212). In some examples, the video coder also includes a modified version of the disparity motion vector in the list of candidate motion vector predictors (e.g., the disparity motion vector with its y-component set equal to zero) (214).

In some cases, the video coder selects the candidate motion vector predictor based on a coded syntax element that indicates an index into the list of candidate motion vector predictors (216). The video coder then inter-predicts the current block using advanced motion vector prediction (AMVP) mode or merge mode (218).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

In some examples, the techniques are described with a device comprising a video decoder or a device comprising a video encoder. The device may be standalone device such as a wireless communication device. In some examples, the device may be microprocessor or an integrated circuit. In these examples, the microprocessor or the integrated circuit may include the video decoder or the video encoder, as applicable. In some examples, the video decoder and video encoder may be standalone microprocessors or integrated circuits.

Various examples have been described. These and other examples are within the scope of the following claims.

What is claimed is:

1. A method for decoding video data, the method comprising:
   determining that a motion vector for a region in a picture in a first view of a plurality of views of the video data is a disparity motion vector, wherein the region neighbors a current block to be predicted, the region includes one or more blocks, the motion vector for the region represents a single motion vector for the one or more blocks for one reference picture list, and the motion vector for the region refers to a picture in a second view of the video data that is different than the first view of the video data;
   responsive to determining that the motion vector for the region in the picture is the disparity motion vector, determining that the disparity motion vector for the region is a disparity vector for the current block of the video data; and
   inter-prediction decoding the current block, wherein the decoding uses the disparity motion vector for the region as the disparity vector for the current block.

2. The method of claim 1, wherein determining that the motion vector for the region in the picture in the first view is a disparity motion vector comprises determining that the motion vector for a spatially neighboring region that spatially neighbors the current block refers to the picture in the second view, and wherein the picture includes the spatially neighboring region and includes the current block.

3. The method of claim 2, wherein the spatially neighboring region comprises an 8×4 region that includes two 4×4 blocks.

4. The method of claim 1, wherein determining that the motion vector for the region in the picture in the first view is a disparity motion vector comprises determining that the motion vector for a temporally neighboring region that temporally neighbors the current block refers to the picture in the second view, and wherein the picture includes the temporally neighboring region and does not include the current block.

5. The method of claim 4, wherein the temporally neighboring region comprises a 16×16 region that includes sixteen 4×4 blocks.

6. The method of claim 1, wherein the current block comprises a first block, the region comprises a first region, and the disparity vector comprises a first disparity vector, the method further comprising:
determining that a second region that neighbors a second block is an implicitly disparity predicted region based on a disparity vector for the second region being derived from a disparity motion vector of a block that neighbors the second region;
responsive to determining that the second region is the implicitly disparity predicted region, determining that the disparity motion vector of the block that neighbors the second region is a second disparity vector for the second block; and
inter-prediction decoding the second block using the second disparity vector.

7. The method of claim 1, further comprising:
determining a block to which the disparity vector refers;
determining a motion vector for the block to which the disparity vector refers; and
including the motion vector for the block to which the disparity vector refers in a list of candidate motion vector predictors,
wherein inter-prediction decoding the current block comprises inter-prediction decoding the current block based on the motion vector for the block to which the disparity vector refers in response to the motion vector for the block to which the disparity vector refers being selected from the list of candidate motion vector predictors as part of a merge mode or an advanced motion vector prediction (AMVP) mode.

8. The method of claim 1, further comprising:
determining a block to which the disparity vector refers,
wherein inter-prediction decoding the current block comprises using residual information of the determined block to inter-predict residual information of the current block.

9. The method of claim 1, further comprising:
modifying the disparity motion vector; and
including the modified disparity motion vector in a list of candidate motion vector predictors for the current block.

10. The method of claim 9, wherein modifying the disparity motion vector comprises setting a y-component of the disparity motion vector equal to zero.

11. The method of claim 1, wherein the current block comprises a block of an instantaneous decoder refresh (IDR) or a clean random access (CRA) picture.

12. A method for encoding video data, the method comprising:
determining that a motion vector for a region in a picture in a first view of a plurality of views of the video data is a disparity motion vector, wherein the region neighbors a current block to be predicted, the region includes one or more blocks, the motion vector for the region represents a single motion vector for the one or more blocks for one reference picture list, and the motion vector for the region refers to a picture in a second view of the video data that is different than the first view of the video data;
responsive to determining that the motion vector for the region in the picture is the disparity motion vector, determining that the disparity motion vector for the region is a disparity vector for the current block of the video data; and
inter-prediction encoding the current block, wherein the encoding uses the disparity motion vector for the region as the disparity vector for the current block.

13. The method of claim 12, wherein determining that the motion vector for the region in the picture in the first view is a disparity motion vector comprises determining that the motion vector for a spatially neighboring region that spatially neighbors the current block refers to the picture in the second view, and wherein the picture includes the spatially neighboring region and includes the current block.

14. The method of claim 13, wherein the spatially neighboring region comprises an 8×4 region that includes two 4×4 blocks.

15. The method of claim 12, wherein determining that the motion vector for the region in the picture in the first view is a disparity motion vector comprises determining that the motion vector for a temporally neighboring region that temporally neighbors the current block refers to the picture in the second view, and wherein the picture includes the temporally neighboring region and does not include the current block.

16. The method of claim 15, wherein the temporally neighboring region comprises a 16×16 region that includes sixteen 4×4 blocks.

17. The method of claim 12, wherein the current block comprises a first block, the region comprises a first region, and the disparity vector comprises a first disparity vector, the method further comprising:
determining that a second region that neighbors a second block is an implicitly disparity predicted region based on a disparity vector for the second region being derived from a disparity motion vector of a block that neighbors the second region;
responsive to determining that the second region is the implicitly disparity predicted region, determining that the disparity motion vector of the block that neighbors the second region is a second disparity vector for the second block; and
inter-prediction encoding the second block using the second disparity vector.

18. The method of claim 12, further comprising:
determining a block to which the disparity vector refers,
wherein inter-prediction encoding the current block comprises using residual information of the determined block to inter-predict residual information of the current block.

19. The method of claim 12, further comprising:
modifying the disparity motion vector; and
including the modified disparity motion vector in a list of candidate motion vector predictors for the current block.

20. The method of claim 19, wherein modifying the disparity motion vector comprises setting a y-component of the disparity motion vector equal to zero.

21. The method of claim 12, wherein the current block is the current block of an instantaneous decoder refresh (IDR) or a clean random access (CRA) picture.

22. A device for decoding video data, the device comprising:
a memory unit configured to store the video data; and
a video decoder configured to:
determine that a motion vector for a region in a picture in a first view of a plurality of views of the video data is a disparity motion vector, wherein the region neighbors a current block to be predicted, the region includes one or more blocks, the motion vector for the region represents a single motion vector for the one or more blocks for one reference picture list, and the motion vector for the region refers to a picture in a second view of the video data that is different than the first view of the video data;
responsive to determining that the motion vector for the region in the picture is the disparity motion vector, determine that the disparity motion vector for the region is a disparity vector for the current block of the video data; and
inter-prediction decode the current block, wherein to decode the current block, the video decoder uses the disparity motion vector for the region as the disparity vector for the current block.

23. The device of claim 22, wherein, to determine that the motion vector for the region in the picture in the first view is a disparity motion vector, the video decoder is configured to determine that the motion vector for a spatially neighboring region that spatially neighbors the current block refers to the picture in second view, and wherein the picture includes the spatially neighboring region and includes the current block.

24. The device of claim 23, wherein the spatially neighboring region comprises an 8×4 region that includes two 4×4 blocks.

25. The device of claim 22, wherein, to determine that the motion vector for the region in the picture in the first view is a disparity motion vector, the video decoder is configured to determine that the motion vector for a temporally neighboring region that temporally neighbors the current block refers to the picture in the second view, and wherein the picture includes the temporally neighboring region and does not include the current block.

26. The device of claim 25, wherein the temporally neighboring region comprises a 16×16 region that includes sixteen 4×4 blocks.

27. The device of claim 22, wherein the current block comprises a first block, the region comprises a first region, and the disparity vector comprises a first disparity vector, and wherein the video decoder is configured to:
determine that a second region that neighbors a second block is an implicitly disparity predicted region based on a disparity vector for the second region being derived from a disparity motion vector of a block that neighbors the second region;
responsive to determining that the second region is the implicitly disparity predicted region, determine that the disparity motion vector of the block that neighbors the second region is a second disparity vector for the second block; and
inter-prediction decode the second block using the second disparity vector.

28. The device of claim 22, wherein the video decoder is configured to:
determine a block to which the disparity vector refers;
determine a motion vector for the block to which the disparity vector refers; and
include the motion vector for the block to which the disparity vector refers in a list of candidate motion vector predictors,
wherein, to inter-prediction decode the current block, the video decoder is configured to inter-prediction decode the current block based on the motion vector for the block to which the disparity vector refers in response to the motion vector for the block to which the disparity vector refers being selected from the list of candidate motion vector predictors as part of a merge mode or an advanced motion vector prediction (AMVP) mode.

29. The device of claim 22, wherein the video decoder is configured to:
determine a block to which the disparity vector refers,
wherein, to inter-prediction decode the current block, the video decoder is configured to use residual information of the determined block to inter-predict residual information of the current block.

30. The device of claim 22, wherein the video decoder is configured to:
modify the disparity motion vector; and
include the modified disparity motion vector in a list of candidate motion vector predictors for the current block.

31. The device of claim 30, wherein, to modify the disparity motion vector, the video decoder is configured to set a y-component of the disparity motion vector equal to zero.

32. The device of claim 22, wherein the current block is the current block of an instantaneous decoder refresh (IDR) or a clean random access (CRA) picture.

33. The device of claim 22, wherein the device comprises one of:
a wireless communication device;
a microprocessor; or
an integrated circuit.

34. A device for encoding video data, the device comprising:
a memory unit configured to store the video data; and
a video encoder configured to:
determine that a motion vector for a region in a picture in a first view of a plurality of views of the video data is a disparity motion vector, wherein the region neighbors a current block to be predicted, the region includes one or more blocks, the motion vector for the region represents a single motion vector for the one or more blocks for one reference picture list, and the motion vector for the region refers to a picture in a second view of the video data that is different than the first view of the video data;
responsive to determining that the motion vector for the region in the picture is the disparity motion vector, determine that the disparity motion vector for the region is a disparity vector for the current block of the video data; and
inter-prediction encode the current block, wherein to encode the current block, the video encoder uses the disparity motion vector for the region as the disparity vector for the current block.

35. The device of claim 34, wherein, to determine that the motion vector for the region in the picture in the first view is a disparity motion vector, the video encoder is configured to determine that the motion vector for a spatially neighboring region that spatially neighbors the current block refers to the picture in the second view, and wherein the picture includes the spatially neighboring region and includes the current block.

36. The device of claim 35, wherein the spatially neighboring region comprises an 8×4 region that includes two 4×4 blocks.

37. The device of claim 34, wherein, to determine that the motion vector for the region in the picture in the first view is a disparity motion vector, the video encoder is configured to determine that the motion vector for a temporally neighboring region that temporally neighbors the current block refers to the picture in the second view, and wherein the picture includes the temporally neighboring region and does not include the current block.

38. The device of claim 37, wherein the temporally neighboring region comprises a 16×16 region that includes sixteen 4×4 blocks.

39. The device of claim 34, wherein the current block comprises a first block, the region comprises a first region, and the disparity vector comprises a first disparity vector, and wherein the video encoder is configured to:
  determine that a second region that neighbors a second block is an implicitly disparity predicted region based on a disparity vector for the second region being derived from a disparity motion vector of a block that neighbors the second region;
  responsive to determining that the second region is the implicitly disparity predicted region, determine that the disparity motion vector of the block that neighbors the second region is a second disparity vector for the second block; and
  inter-prediction encode the second block using the second disparity vector.

40. The device of claim 34, wherein the video encoder is configured to:
  determine a block to which the disparity vector refers,
  wherein, to inter-prediction encode the current block, the video encoder is configured to use residual information of the determined block to inter-predict residual information of the current block.

41. The device of claim 34, wherein the video encoder is configured to:
  modify the disparity motion vector; and
  include the modified disparity motion vector in a list of candidate motion vector predictors for the current block.

42. The device of claim 41, wherein, to modify the disparity motion vector, the video encoder is configured to set a y-component of the disparity motion vector equal to zero.

43. The device of claim 34, wherein the current block is the current block of an instantaneous decoder refresh (IDR) or a clean random access (CRA) picture.

44. A device for decoding video data, the device comprising:
  means for determining that a motion vector for a region in a picture in a first view of a plurality of views of the video data is a disparity motion vector, wherein the region neighbors a current block to be predicted, the region includes one or more blocks, the motion vector for the region represents a single motion vector for the one or more blocks for one reference picture list, and the motion vector for the region refers to a picture in a second view of the video data that is different than the first view of the video data;
  responsive to determining that the motion vector for the region in the picture is the disparity motion vector, means for determining that the disparity motion vector for the region is a disparity vector for the current block of the video data; and
  means for inter-prediction decoding the current block, wherein the means for inter-prediction decoding uses the disparity motion vector for the region as the disparity vector for the current block.

45. The device of claim 44, wherein the means for determining that the motion vector for the region in the picture in the first view is a disparity motion vector comprises means for determining that the motion vector for a spatially neighboring region that spatially neighbors the current block refers to the picture in the second view, and wherein the picture includes the spatially neighboring region and includes the current block.

46. The device of claim 45, wherein the spatially neighboring region comprises an 8×4 region that includes two 4×4 blocks.

47. The device of claim 44, wherein the means for determining that the motion vector for the region in the picture in the first view is a disparity motion vector comprises means for determining that the motion vector for a temporally neighboring region that temporally neighbors the current block refers to the picture in the second view, and wherein the picture includes the temporally neighboring region and does not include the current block.

48. The device of claim 47, wherein the temporally neighboring region comprises a 16×16 region that includes sixteen 4×4 blocks.

49. A device for encoding video data, the device comprising:
  means for determining that a motion vector for a region in a picture in a first view of a plurality of views of the video data is a disparity motion vector, wherein the region neighbors a current block to be predicted, the region includes one or more blocks, the motion vector for the region represents a single motion vector for the one or more blocks for one reference picture list, and the motion vector for the region refers to a picture in a second view of the video data that is different than the first view of the video data;
  responsive to determining that the motion vector for the region in the picture is the disparity motion vector, means for determining that the disparity motion vector for the region is a disparity vector for the current block of the video data; and
  means for inter-prediction encoding the current block, wherein the means for inter-prediction encoding uses the disparity motion vector for the region as the disparity vector for the current block.

50. The device of claim 49, wherein the means for determining that the motion vector for the region in the picture in the first view is a disparity motion vector comprises means for determining that the motion vector for a spatially neighboring region that spatially neighbors the current block refers to the picture in the second view, and wherein the picture includes the spatially neighboring region and includes the current block.

51. The device of claim 50, wherein the spatially neighboring region comprises an 8×4 region that includes two 4×4 blocks.

52. The device of claim 49, wherein determining that the motion vector for the region in the picture in the first view is a disparity motion vector comprises determining that the motion vector for a temporally neighboring region that temporally neighbors the current block refers to the picture in the second view, and wherein the picture includes the temporally neighboring region and does not include the current block.

53. The device of claim 52, wherein the temporally neighboring region comprises a 16×16 region that includes sixteen 4×4 blocks.

54. A non-transitory computer-readable storage medium having instructions stored thereon that when executed cause one or more processors to:
- determine that a motion vector for a region in a picture in a first view of a plurality of views of the video data is a disparity motion vector, wherein the region neighbors a current block to be predicted, the region includes one or more blocks, the motion vector for the region represents a single motion vector for the one or more blocks for one reference picture list, and the motion vector for the region refers to a picture in a second view of the video data that is different than the first view of the video data;
- responsive to determining that the motion vector for the region in the picture is the disparity motion vector, determine that the disparity motion vector for the region is a disparity vector for the current block of the video data; and
- inter-prediction decode the current block, wherein the instructions to that cause the one or more processors to decode comprise instructions that cause the one or more processors to use the disparity motion vector for the region as the disparity vector for the current block.

55. A non-transitory computer-readable storage medium having instructions stored thereon that when executed cause one or more processors to:
- determine that a motion vector for a region in a picture in a first view of a plurality of views of the video data is a disparity motion vector, wherein the region neighbors a current block to be predicted, the region includes one or more blocks, the motion vector for the region represents a single motion vector for the one or more blocks for one reference picture list, and the motion vector for the region refers to a picture in a second view of the video data that is different than the first view of the video data;
- responsive to determining that the motion vector for the region in the picture is the disparity motion vector, determine that the disparity motion vector for the region is a disparity vector for the current block of the video data; and
- inter-prediction encode the current block, wherein the instructions that cause the one or more processors to encode comprise instructions that cause the one or more processors to use the disparity motion vector for the region as the disparity vector for the current block.

56. The method of claim 1, the method being executable on a wireless communication device, wherein the device comprises:
- a receiver configured to receive the video data;
- a memory configured to store the received video data; and
- a processor configured to execute instructions to process the video data stored in the memory.

57. The method of claim 56, wherein the wireless communication device is a cellular telephone and the video data is received by the receiver and modulated according to a cellular communication standard.

58. The device of claim 22, wherein the device is a wireless communication device, the device further comprising:
- a receiver configured to receive the video data,
- wherein the memory unit is configured store the received video data.

59. The device of claim 58, wherein the wireless communication device is a cellular telephone and the video data is received by the receiver and modulated according to a cellular communication standard.

* * * * *